United States Patent
Sharma Banjade et al.

(10) Patent No.: US 12,509,071 B2
(45) Date of Patent: Dec. 30, 2025

(54) VULNERABLE ROAD USER SAFETY TECHNOLOGIES BASED ON RESPONSIBILITY SENSITIVE SAFETY

(71) Applicant: Intel Corporation, Santa Clara, CA (US)

(72) Inventors: Vesh Raj Sharma Banjade, Portland, OR (US); Kathiravetpillai Sivanesan, Portland, OR (US); Ignacio J. Alvarez, Portland, OR (US); Satish C. Jha, Portland, OR (US); Maria Soledad Elli, Hillsboro, OR (US); Leonardo Gomes Baltar, Munich (DE); Arvind Merwaday, Hillsboro, OR (US); S M Iftekharul Alam, Hillsboro, OR (US); Hao Feng, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 17/641,977

(22) PCT Filed: Sep. 25, 2020

(86) PCT No.: PCT/US2020/052909
§ 371 (c)(1),
(2) Date: Mar. 10, 2022

(87) PCT Pub. No.: WO2021/118675
PCT Pub. Date: Jun. 17, 2021

(65) Prior Publication Data
US 2022/0388505 A1 Dec. 8, 2022

Related U.S. Application Data

(60) Provisional application No. 62/947,426, filed on Dec. 12, 2019, provisional application No. 62/947,417, filed on Dec. 12, 2019.

(51) Int. Cl.
*B60W 30/095* (2012.01)
*B60W 30/085* (2012.01)
*B60W 60/00* (2020.01)

(52) U.S. Cl.
CPC ...... *B60W 30/0956* (2013.01); *B60W 30/085* (2013.01); *B60W 60/0015* (2020.02); *B60W 2554/4049* (2020.02)

(58) Field of Classification Search
CPC ........... B60W 30/0956; B60W 30/085; B60W 60/0015; B60W 2554/4049; G08G 1/005;
(Continued)

(56) References Cited

U.S. PATENT DOCUMENTS 10,235,882 B1 3/2019 Aoude et al.
2011/0246156 A1 10/2011 Zecha et al.
(Continued)

FOREIGN PATENT DOCUMENTS

CN 103927904 7/2014
CN 104210489 A 12/2014
(Continued)

OTHER PUBLICATIONS

Machine translation: WO-2016124368-A1 (Year: 2016).*
(Continued)

*Primary Examiner* — Anne Marie Antonucci
*Assistant Examiner* — Connor L Knight
(74) *Attorney, Agent, or Firm* — Schwegman Lundberg & Woessner, P.A.

(57) ABSTRACT

Disclosed embodiments include technologies for improving safety mechanisms in computer assisted and/or automated driving (CA/AD) vehicles for protecting vulnerable road users (VRUs). Embodiments include various mechanisms to enable early Responsibility Sensitive Safety (RSS) checks for the CA/AD vehicles driving policy to protect in-danger
(Continued)

VRUs. Embodiments also include controlled forwarding mechanisms to notify other CA/AD vehicles and roadside infrastructure when a potentially dangerous situation is detected. Other embodiments are described and/or claimed.

30 Claims, 31 Drawing Sheets

(58) Field of Classification Search
CPC ....... G08G 1/096725; G08G 1/096775; G08G 1/096783; G08G 1/162; G08G 1/164; G08G 1/166; G08G 1/163; H04W 4/40
See application file for complete search history.

(56) References Cited

U.S. PATENT DOCUMENTS

| | | | |
|---|---|---|---|
| 2015/0035685 A1 | 2/2015 | Strickland et al. | |
| 2017/0140229 A1* | 5/2017 | Ogata | B60W 30/0956 |
| 2017/0166123 A1 | 6/2017 | Bahgat et al. | |
| 2017/0327035 A1 | 11/2017 | Keiser | |
| 2018/0162387 A1* | 6/2018 | Sung | B60W 30/09 |
| 2018/0165527 A1* | 6/2018 | Park | G06V 20/58 |
| 2018/0222475 A1 | 8/2018 | Andersson et al. | |
| 2018/0233048 A1 | 8/2018 | Andersson et al. | |
| 2019/0111921 A1 | 4/2019 | Hehn et al. | |
| 2019/0179323 A1* | 6/2019 | Ewert | G08G 1/166 |
| 2019/0225232 A1* | 7/2019 | Blau | G05D 1/0088 |
| 2019/0286137 A1* | 9/2019 | Matsunaga | G05D 1/0221 |
| 2019/0325751 A1 | 10/2019 | Altintas et al. | |
| 2019/0325754 A1 | 10/2019 | Aoude et al. | |
| 2021/0166564 A1* | 6/2021 | Takaki | G08G 1/166 |
| 2022/0101732 A1* | 3/2022 | Saur | G08G 1/163 |
| 2024/0083424 A1* | 3/2024 | Edo Ros | B60T 7/22 |

FOREIGN PATENT DOCUMENTS

| | | |
|---|---|---|
| CN | 104882025 | 9/2015 |
| CN | 104900089 | 9/2015 |
| CN | 104210489 B | 6/2017 |
| CN | 107886772 | 4/2018 |
| CN | 109035865 A | 12/2018 |
| CN | 109318894 | 2/2019 |
| CN | 109584631 | 4/2019 |
| CN | 109671297 A | 4/2019 |
| CN | 109841088 | 6/2019 |
| CN | 114730527 | 7/2022 |
| EP | 4073780 | 10/2022 |
| WO | WO-2016124368 A1 * | 8/2016 |
| WO | 2017137987 | 8/2017 |
| WO | WO 2019-213763 A1 | 11/2019 |
| WO | 2021118675 | 6/2021 |

OTHER PUBLICATIONS

International Search Report and Written Opinion mailed Jan. 12, 2021 for International Patent Application No. PCT/US2020/052909, 13 pages.

"European Application Serial No. 20898994.7, Response to Communication pursuant to Rules 161(2) and 162 EPC filed Jan. 23, 2023", 5 pgs.

"Chinese Application Serial No. 202080078860.0, Response filed Jun. 17, 2024 to Decision of Rejection mailed Mar. 27, 2024", w English claims, 19 pgs.

"European Application Serial No. 20898994.7, Extended European Search Report mailed Mar. 15, 2024", 12 pgs.

"International Application Serial No. PCT US2020 052909, International Preliminary Report on Patentability mailed Jun. 23, 2022", 9 pgs.

"Chinese Application Serial No. 202080078860.0, Decision of Rejection mailed Mar. 27, 2024", W English Translation, 16 pgs.

"Chinese Application Serial No. 202080078860.0, Office Action mailed Sep. 6, 2024", W English Translation, 49 pgs.

"European Application Serial No. 20898994.7, Response filed Oct. 4, 2024 to Extended European Search Report mailed Mar. 15, 2024", 13 pgs.

"Chinese Application Serial No. 202080078860.0, Response filed Oct. 23, 2024 to Office Action mailed Sep. 6, 2024", w current English claims, 31 pgs.

"Chinese Application Serial No. 202080078860.0, Office Action mailed Nov. 18, 2024", w English translation, 93 pgs.

"European Application Serial No. 20898994.7, Response filed Jul. 8, 2025 to Communication Pursuant to Article 94(3) EPC mailed Mar. 13, 2025", 21 pgs.

"Chinese Application Serial No. 202080078860.0, Decision of Rejection mailed Jan. 26, 2025", w English translation, 55 pgs.

"European Application Serial No. 20898994.7, Communication Pursuant to Article 94(3) EPC mailed Mar. 13, 2025", 7 pgs.

* cited by examiner

1101: | VRU ID | VRU profile type | Location | Speed | Heading (angle/direction) | VRU Time Feature Data |

1102: | VRU ID | Estimated VRU profile type | Estimated VRU Location | Estimated VRU Speed | Estimated VRU Heading (angle/direction) | VRU Time Feature Data | Vehicle/VRU ITS-S Trajectory Interception Indicator |

Figure 11

VULNERABLE ROAD USER SAFETY TECHNOLOGIES BASED ON RESPONSIBILITY SENSITIVE SAFETY

RELATED APPLICATIONS

The present application is a national stage entry under 35 U.S.C. § 371 of Int'l App. No. PCT/US2020/052909, filed on Sep. 25, 2020, which claims priority to U.S. Provisional App. No. 62/947,417 filed Dec. 12, 2019 and U.S. Provisional App. No. 62/947,426 filed Dec. 12, 2019, the contents of each of which is hereby incorporated by reference in their entireties.

TECHNICAL FIELD

Embodiments described herein generally relate to edge computing, network communication, and communication system implementations, and in particular, to connected and computer-assisted (CA)/autonomous driving (AD) vehicles, Internet of Vehicles (IoV), Internet of Things (IoT) technologies, and Intelligent Transportation Systems.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band. Existing RATs do not have mechanisms to coexist with one another and are usually not interoperable with one another.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 11 illustrates example VRU broadcast packet formats according to various embodiments.

DETAILED DESCRIPTION

Figure 1:
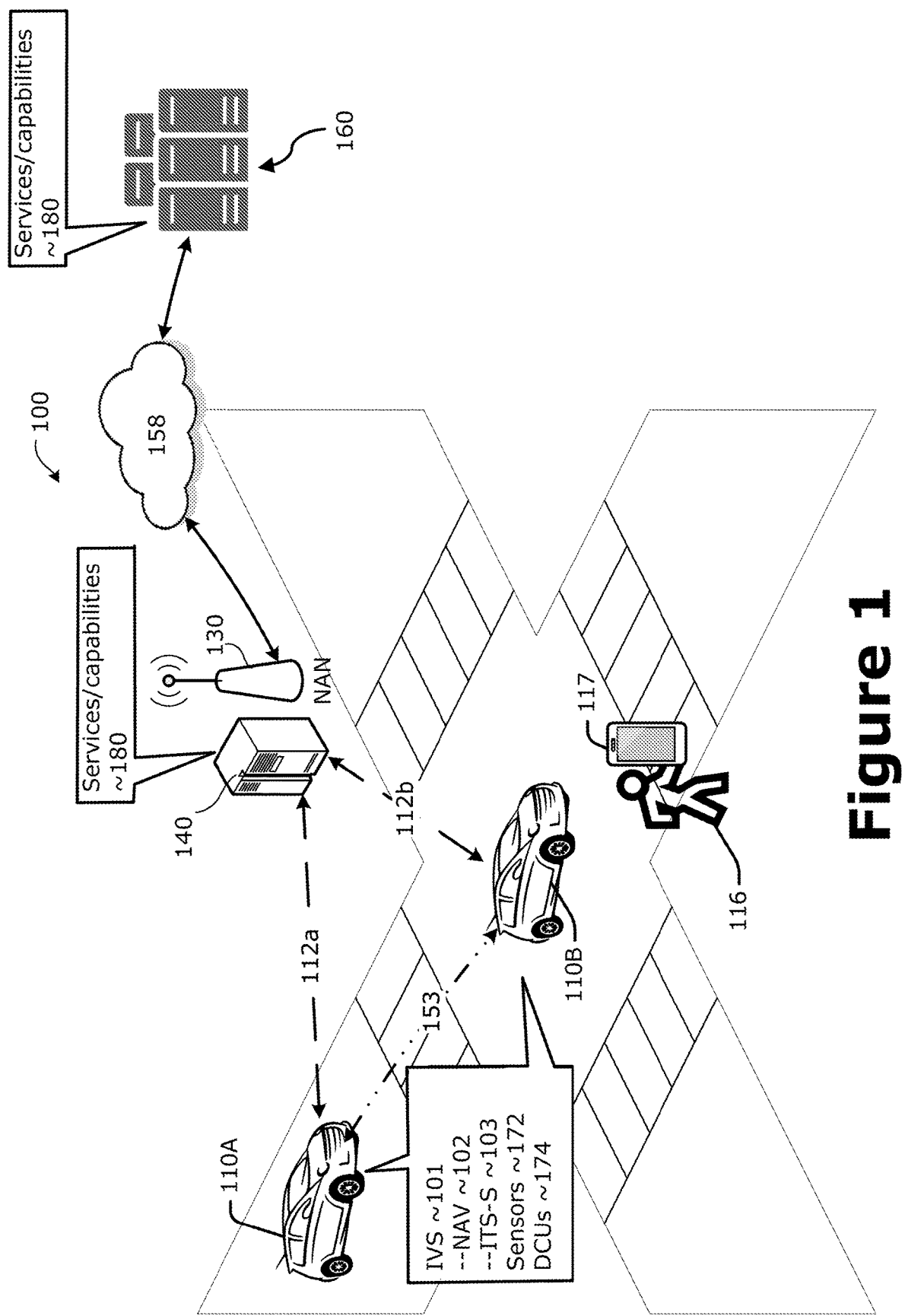
FIG. 1 illustrates an operative arrangement in which various embodiments may be practiced.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

The Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X applications can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, etc.), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like.

One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, etc.). Elements of ITS are standardized in various standardization organizations, both on an international level and on regional levels. Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since the present embodiments are applicable to any number of different RATs (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies.

FIG. 1 illustrates an overview of an environment 100 for incorporating and using the embodiments of the present disclosure. As shown, for the illustrated embodiments, the example environment includes vehicles 110A and 10B (collectively "vehicle 110"). Vehicles 110 includes an engine, transmission, axles, wheels and so forth (not shown). The vehicles 110 may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 110 shown by FIG. 1 may represent motor vehicles of varying makes, models, trim, etc.

For illustrative purposes, the following description is provided for deployment scenarios including vehicles 110 in a 2D freeway/highway/roadway environment wherein the vehicles 110 are automobiles. However, the embodiments described herein are also applicable to other types of vehicles, such as trucks, busses, motorboats, motorcycles, electric personal transporters, and/or any other motorized devices capable of transporting people or goods. Also, embodiments described herein are applicable to social networking between vehicles of different vehicle types. The embodiments described herein may also be applicable to 3D deployment scenarios where some or all of the vehicles 110 are implemented as flying objects, such as aircraft, drones, UAVs, and/or to any other like motorized devices.

For illustrative purposes, the following description is provided for example embodiments where the vehicles 110 include in-vehicle systems (IVS) 101, which are discussed in more detail infra. However, the vehicles 110 could include additional or alternative types of computing devices/systems such as smartphones, tablets, wearables, laptops, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable to perform the various embodiments discussed herein. Vehicles 110 including a computing system (e.g., IVS 101) as well as the vehicles referenced throughout the present disclosure, may be referred to as vehicle user equipment (vUE) 110, vehicle stations 110, vehicle ITS stations (V-ITS-S) 110, computer assisted (CA)/autonomous driving (AD) vehicles 110, and/or the like.

Each vehicle 110 includes an in-vehicle system (IVS) 101, one or more sensors 172, and one or more driving control units (DCUs) 174. The IVS 100 includes a number of vehicle computing hardware subsystems and/or Applications including, for example, various hardware and software elements to implement the ITS architecture of FIG. 20. The vehicles 110 may employ one or more V2X RATs, which allow the vehicles 110 to communicate directly with one another and with infrastructure equipment (e.g., network access node (NAN) 130). The V2X RATs may refer to 3GPP cellular V2X RAT (e.g., LTE, 5G/NR, and beyond), a WLAN V2X (W-V2X) RAT (e.g., DSRC in the USA or ITS-G5 in the EU), and/or some other RAT such as those discussed herein. Some or all of the vehicles 110 may include positioning circuitry to (coarsely) determine their respective geolocations and communicate their current position with the NAN 130 in a secure and reliable manner. This allows the vehicles 110 to synchronize with one another and/or the NAN 130. Additionally, some or all of the vehicles 110 may be computer-assisted or autonomous driving (CA/AD) vehicles, which may include artificial intelligence (AI) and/or robotics to assist vehicle operation.

Figure 22:
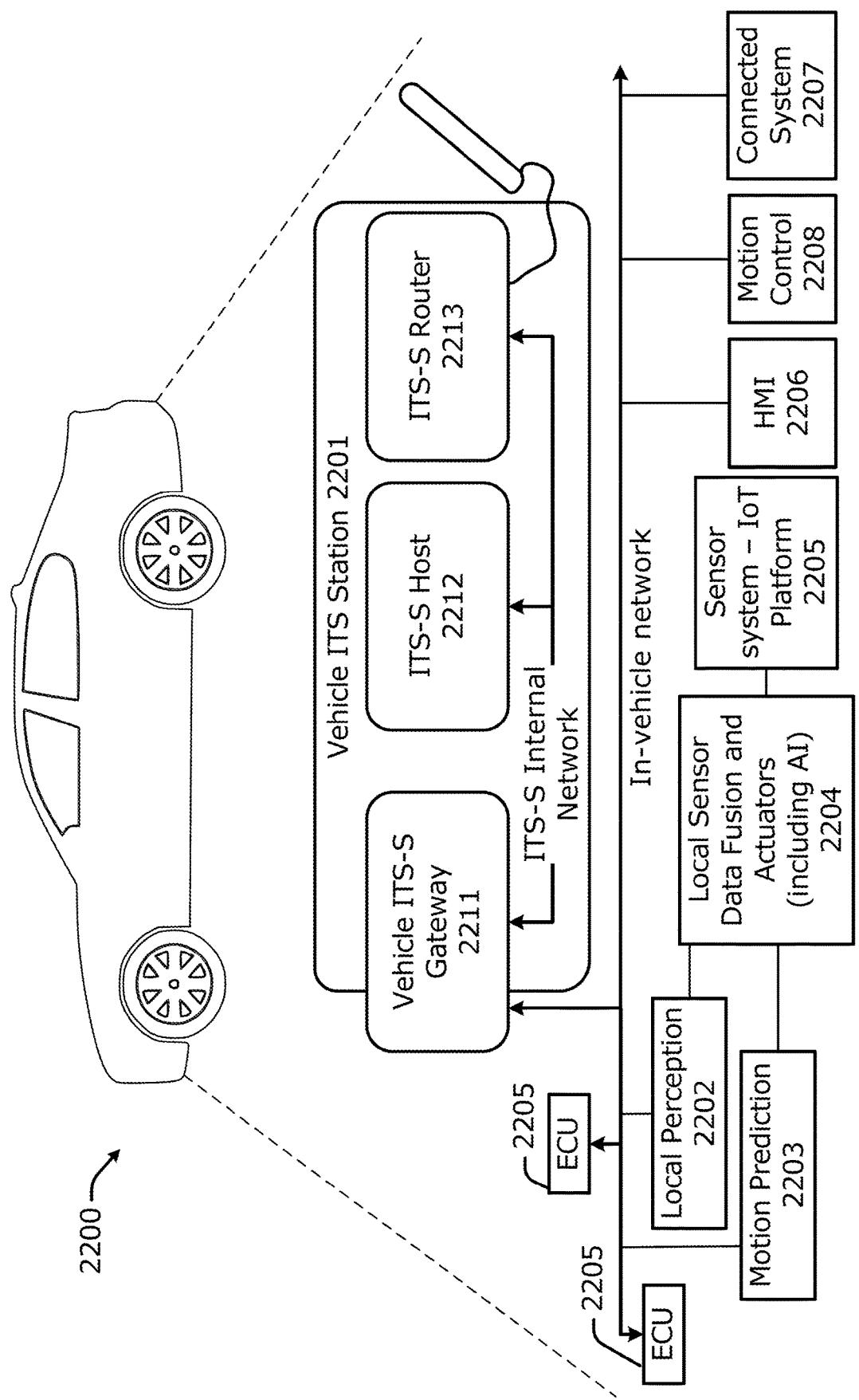
FIG. 22 depicts an example vehicle ITS station (V-ITS-S) in a vehicle system according to various embodiments.

The IVS 101 includes the ITS-S 103, which may be the same or similar to the ITS-S 2201 of FIG. 22. The IVS 101 may be, or may include, Upgradeable Vehicular Compute Systems (UVCS) such as those discussed infra. As discussed herein, the ITS-S 103 (or the underlying V2X RAT circuitry on which the ITS-S 103 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

Except for the UVCS technology of the present disclosure, IVS 101 and CA/AD vehicle 110 otherwise may be any one of a number of in-vehicle systems and CA/AD vehicles, from computer-assisted to partially or fully autonomous vehicles. Additionally, the IVS 101 and CA/AD vehicle 110 may include other components/subsystems not shown by FIG. 1 such as the elements shown and described throughout the present disclosure. These and other aspects of the underlying UVCS technology used to implement IVS 101 will be further described with references to remaining FIGS. 25-28.

In addition to the functionality discussed herein, the ITS-S 2201 (or the underlying V2X RAT circuitry on which the ITS-S 2201 operates) is capable of measuring various signals or determining/identifying various signal/channel characteristics. Signal measurement may be performed for cell selection, handover, network attachment, testing, and/or other purposes. The measurements/characteristics collected by the ITS-S 2201 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 130 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215 v16.1.0 (2020-04), IEEE 802.11, Part 11: "Wireless LAN Medium Access Control (MAC) and Physical Layer (PHY) specifications, IEEE Std.", and/or the like. The same or similar measurements may be measured or collected by the NAN 130.

The subsystems/applications may also include instrument cluster subsystems, front-seat and/or back-seat infotainment subsystems and/or other like media subsystems, a navigation subsystem (NAV) 102, a vehicle status subsystem/application, a HUD subsystem, an EMA subsystem, and so forth. The NAV 102 may be configurable or operable to provide navigation guidance or control, depending on whether vehicle 110 is a computer-assisted vehicle, partially or fully autonomous driving vehicle. NAV 102 may be configured with computer vision to recognize stationary or moving objects (e.g., a pedestrian, another vehicle, or some other moving object) in an area surrounding vehicle 110, as it travels enroute to its destination. The NAV 102 may be configurable or operable to recognize stationary or moving objects in the area surrounding vehicle 110, and in response, make its decision in guiding or controlling DCUs of vehicle 110, based at least in part on sensor data collected by sensors 172.

The DCUs 174 include hardware elements that control various systems of the vehicles 110, such as the operation of the engine, the transmission, steering, braking, etc. DCUs 174 are embedded systems or other like computer devices that control a corresponding system of a vehicle 110. The DCUs 174 may each have the same or similar components as devices/systems of FIG. 3074 discussed infra, or may be some other suitable microcontroller or other like processor device, memory device(s), communications interfaces, and the like. Individual DCUs 174 are capable of communicating with one or more sensors 172 and actuators (e.g., actuators 3074 of FIG. 30). The sensors 172 are hardware elements configurable or operable to detect an environment surrounding the vehicles 110 and/or changes in the environment. The sensors 172 are configurable or operable to provide various sensor data to the DCUs 174 and/or one or more AI agents to enable the DCUs 174 and/or one or more AI agents to control respective control systems of the vehicles 110. Some or all of the sensors 172 may be the same or similar as the sensor circuitry 3072 of FIG. 30. Further, each vehicle 110 is provided with the RSS embodiments of the present disclosure. In particular, the IVS 101 may include or implement a facilities layer and operate one or more facilities within the facilities layer.

IVS 101, on its own or in response to user interactions, communicates or interacts with one or more vehicles 110 via interface 153, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, etc.). Other technologies could be used, such as Bluetooth/Bluetooth Low Energy (BLE) or the like. In various embodiments, the vehicles 110 may exchange ITS protocol data units (PDUs) or other messages of the example embodiments with one another over the interface 153.

IVS 101, on its own or in response to user interactions, communicates or interacts with one or more remote/cloud servers 160 via NAN 130 over interface 112 and over network 158. The NAN 130 is arranged to provide network connectivity to the vehicles 110 via respective interfaces 112 between the NAN 130 and the individual vehicles 110. The NAN 130 is, or includes, an ITS-S, and may be a roadside ITS-S (R-ITS-S). The NAN 130 is a network element that is part of an access network that provides network connectivity to the end-user devices (e.g., V-ITS-Ss 110 and/or VRU ITS-Ss 117). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 130. This virtualized framework allows the freed-up processor cores of the NAN 130 to perform other virtualized applications, such as virtualized applications for the VRU/V-ITS-S embodiments discussed herein.

Environment 100 also includes VRU 116, which includes a VRU ITS-S 117. The VRU 116 is a non-motorized road users as well as L class of vehicles (e.g., mopeds, motorcycles, segways, etc.), as defined in Annex I of EU regulation 168/2013 (see e.g., International Organization for Standardization (ISO) D., "Road vehicles—Vehicle dynamics and road-holding ability—Vocabulary", ISO 8855 (2013) (hereinafter "[IS08855]")). A VRU 116 is an actor that interacts with a VRU system 117 in a given use case and behavior scenario. For example, if the VRU 116 is equipped with a personal device, then the VRU 116 can directly interact via the personal device with other ITS-Stations and/or other VRUs 116 having VRU devices 117. If the VRU 116 is not equipped with a device, then the VRU 116 interacts indirectly, as the VRU 116 is detected by another ITS-Station in the VRU system 117 via its sensing devices such as sensors and/or other components. However, such VRUs 116 cannot detect other VRUs 116 (e.g., a bicycle).

A VRU 116 can be equipped with a portable device (e.g., device 117). The term "VRU" may be used to refer to both a VRU 116 and its VRU device 117 unless the context dictates otherwise. The VRU device 117 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 117) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, etc.) or an IoT device (e.g., traffic control devices) used by a VRU 116 integrating ITS-S technology, and as such, the VRU ITS-S 117 may include or refer to a "VRU device," "VRU equipment," and/or "VRU system".

The VRU systems considered in the present document are Cooperative Intelligent Transport Systems (C-ITS) that comprise at least one Vulnerable Road User (VRU) and one ITS-Station with a VRU application. The ITS-S can be a Vehicle ITS-Station or a Road side ITS-Station that is processing the VRU application logic based on the services provided by the lower communication layers (Facilities, Networking & Transport and Access layer (see e.g., ETSI EN 302 665 V1.1.1 (2010-09)), related hardware components, other in-station services and sensor sub-systems. A VRU system may be extended with other VRUs, other ITS-S and other road users involved in a scenario such as vehicles, motorcycles, bikes, and pedestrians. VRUs may be equipped with ITS-S or with different technologies (e.g., IoT) that enable them to send or receive an alert. The VRU system considered is thus a heterogeneous system. A definition of a VRU system is used to identify the system components that actively participate in a use case and behavior scenario. The active system components are equipped with ITS-Stations, while all other components are passive and form part of the environment of the VRU system.

The VRU ITS-S 117 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS stations, for example cars, trucks, buses, road-side stations or central stations. These applications aim at providing VRU-relevant information to actors such as humans directly or to automated systems. VRU applications can increase the awareness of vulnerable road users, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

In general, there are four types of VRU equipment 117 including unequipment VRUs (VRU 116 does not have a device); VRU-Tx (a VRU 116 equipped with an ITS-S 117 having only a transmission (Tx) but no reception (Rx) capabilities that broadcasts awareness messages or beacons about the VRU 116); VRU-Rx (a VRU 116 equipped with an ITS-S 117 having only an Rx (but no Tx) capabilities that receives broadcasted awareness messages or beacons about the other VRUs 116 or other non-VRU ITS-Ss); and VRU-St (a VRU 116 equipped with an ITS-S 117 that includes the VRU-Tx and VRU-Rx functionality). The use cases and behavior scenarios consider a wide set of configurations of VRU systems 117 based on the equipment of the VRU 116 and the presence or absence of V-ITS-S 117 and/or R-ITS-S 130 with a VRU application. Examples of the various VRU system configurations are shown by Table 2 of [TR103300-3].

The number of VRUs 116 operating in a given area can get very high. In some cases, the VRU 116 can be combined with a VRU vehicle (e.g., rider on a bicycle or the like). In order to reduce the amount of communication and associated resource usage (e.g., spectrum requirements), VRUs 116 may be grouped together into one or more VRU clusters. A VRU cluster is a set of two or more VRUs 116 (e.g., pedestrians) such that the VRUs 116 move in a coherent manner, for example, with coherent velocity or direction and within a VRU bounding box. VRUs 116 with VRU Profile 3 (e.g., motorcyclists) are usually not involved in the VRU clustering. The use of a bicycle or motorcycle will significantly change the behavior and parameters set of the VRU using this non-VRU object (or VRU vehicle such as a "bicycle"/"motorcycle"). A combination of a VRU 116 and a non-VRU object is called a "combined VRU." A coherent cluster velocity refers to the velocity range of VRUs 116 in a cluster such that the differences in speed and heading between any of the VRUs in a cluster are below a predefined threshold. A VRU Bounding box is a rectangular area containing all the VRUs 116 in a VRU cluster such that all the VRUs in the bounding box make contact with the surface at approximately the same elevation.

VRU clusters can be homogeneous VRU clusters (e.g., a group of pedestrians) or heterogeneous VRU clusters (e.g., groups of pedestrians and bicycles with human operators).

These clusters are considered as a single object/entity. The parameters of the VRU cluster are communicated using VRU Awareness Messages (VAMs), where only the cluster head continuously transmits VAMs. The VAMs contain an optional field that indicates whether the VRU 116 is leading a cluster, which is not present for an individual VRUs (e.g., other VRUs in the cluster should not transmit VAM or should transmit VAM with very long periodicity). The leading VRU also indicates in the VAM whether it is a homogeneous cluster or heterogeneous, the latter one being of any combination of VRUs. The VAM may also indicate whether the VRU cluster is heterogeneous and/or homogeneous, which could provide useful information about trajectory and behaviors prediction when the cluster is disbanded.

The Radio Access Technologies (RATs) employed by the NAN 130, the V-ITS-Ss 110, and the VRU ITS-S 117 may include one or more V2X RATs, which allow the V-ITS-Ss 110 to communicate directly with one another, with infrastructure equipment (e.g., NAN 130), and with VRU devices 117. In the example of FIG. 1, any number of V2X RATs may be used for V2X communication. In an example, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 112$a$ and the WLAN V2X RAT may utilize an air interface 112$b$. The access layer for the ITS-G5 interface is outlined in ETSI EN 302 663 V1.3.1 (2020-01) (hereinafter "[EN302663]") and describes the access layer of the ITS-S reference architecture 2000. The ITS-G5 access layer comprises IEEE 802.11-2016 (hereinafter "[IEEE80211]") and IEEE 802.2 Logical Link Control (LLC) (hereinafter "[IEEE8022]") protocols. The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03). In embodiments, the NAN 130 or an edge compute node 140 may provide one or more services/capabilities 180.

In V2X scenarios, a V-ITS-Ss 110 or a NAN 130 may be or act as a RSU or roadside ITS-S (R-ITS-S), which refers to any transportation infrastructure entity used for V2X communications. In this example, the RSU 130 may be a stationary RSU, such as an gNB/eNB-type RSU or other like infrastructure, or relatively stationary UE. In other embodiments, the RSU 130 may be a mobile RSU or a UE-type RSU, which may be implemented by a vehicle (e.g., V-ITS-Ss 110), pedestrian, or some other device with such capabilities. In these cases, mobility issues can be managed in order to ensure a proper radio coverage of the translation entities.

In an example implementation, RSU 130 is a computing device coupled with radio frequency circuitry located on a roadside that provides connectivity support to passing V-ITS-Ss 110. The RSU 130 may also include internal data storage circuitry to store intersection map geometry, traffic statistics, media, as well as applications/software to sense and control ongoing vehicular and pedestrian traffic. The RSU 130 provides various services/capabilities 180 such as, for example, very low latency communications required for high speed events, such as crash avoidance, traffic warnings, and the like. Additionally or alternatively, the RSU 130 may provide other services/capabilities 180 such as, for example, cellular/WLAN communications services. In some implementations, the components of the RSU 130 may be packaged in a weatherproof enclosure suitable for outdoor installation, and may include a network interface controller to provide a wired connection (e.g., Ethernet) to a traffic signal controller and/or a backhaul network. Further, RSU 130 may include wired or wireless interfaces to communicate with other RSUs 130 (not shown by FIG. 1)

In arrangement 100, V-ITS-S 110$a$ may be equipped with a first V2X RAT communication system (e.g., C-V2X) whereas V-ITS-S 110$b$ may be equipped with a second V2X RAT communication system (e.g., W-V2X which may be DSRC, ITS-G5, or the like). In other embodiments, the V-ITS-S 110$a$ and/or V-ITS-S 110$b$ may each be employed with one or more V2X RAT communication systems. In these embodiments, the RSU 130 may provide V2X RAT translation services among one or more services/capabilities 180 so that individual V-ITS-Ss 110 may communicate with one another even when the V-ITS-Ss 110 implement different V2X RATs. According to various embodiments, the RSU 130 (or edge compute node 140) may provide VRU services among the one or more services/capabilities 180 wherein the RSU 130 shares CPMs, MCMs, VAMs DENMs, CAMs, etc., with V-ITS-Ss 110 and/or VRUs for VRU safety purposes including RSS purposes. The V-ITS-Ss 110 may also share such messages with each other, with RSU 130, and/or with VRUs. These messages may include the various data elements and/or data fields as discussed herein.

In this example, the NAN 130 may be a stationary RSU, such as an gNB/eNB-type RSU or other like infrastructure. In other embodiments, the NAN 130 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 130 that enables the connections 112 may be referred to as a "RAN node" or the like. The RAN node 130 may comprise ground stations (e.g., terrestrial access points) or satellite stations providing coverage within a geographic area (e.g., a cell). The RAN node 130 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 130 is embodied as a NodeB, evolved NodeB (eNB), or a next generation NodeB (gNB), one or more relay nodes, distributed units, or Road Side Unites (RSUs). Any other type of NANs can be used. Additionally, the RAN node 130 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc.

The network 158 may represent a network such as the Internet, a wireless local area network (WLAN), or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 158 and/or access technologies may include cellular technology such as LTE, MuLTEfire, and/or NR/5G (e.g., as provided by Radio Access Network (RAN) node 130), WLAN (e.g., WiFi®) technologies (e.g., as provided by an access point (AP) 130, and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The remote/cloud servers 160 may represent one or more application servers, a cloud computing architecture/platform that provides cloud computing services, and/or some other remote infrastructure. The remote/cloud servers 160 may include any one of a number of services and capabilities 180 such as, for example, ITS-related applications and services, driving assistance (e.g., mapping/navigation), content provision (e.g., multi-media infotainment streaming), and/or the like.

Additionally, the NAN 130 is co-located with an edge compute node 140 (or a collection of edge compute nodes 140), which may provide any number of services/capabilities 180 to vehicles 110 such as ITS services/applications, driving assistance, and/or content provision services 180. The edge compute node 140 may include or be part of an edge network or "edge cloud." The edge compute node 140 may also be referred to as an "edge host 140," "edge server 140," or "compute platforms 140." The edge compute nodes 140 may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Servlets, servers, and/or other like computation abstractions. The edge compute node 140 may be implemented in a data center or cloud installation; a designated edge node server, an enterprise server, a roadside server, a telecom central office; or a local or peer at-the-edge device being served consuming edge services. The edge compute node 140 may provide any number of driving assistance and/or content provision services 180 to vehicles 110. The edge compute node 140 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 140 and/or edge computing network/cloud include Multi-Access Edge Computing (MEC), Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

1. VRU Safety Based on RSS Check for Autonomous Vehicle Embodiments

A study conducted by the World Health Organization (WHO) shows about 20 to 50 million people are involved in road accidents every year caused by human errors, with more than 500,000 of the victims being low-mobility, high-physical-impact-vulnerable users of the road such as pedestrians, cyclists, scooters, etc. (see e.g., P. Sewalkar et al., *Vehicle-to-Pedestrian Communication for Vulnerable Road Users: Survey, Design Considerations, and Challenges*, Sensors (Basel, Switzerland), 19(2), 358, doi:10.3390/s19020358 (2019); World Health Organization, *Road traffic injuries*, (7 Dec. 2018), available at: https://www.who.int/news-room/fact-sheets/detail/road-traffic-injuries; ETSI TR 103 300-1 v2.1.1 (2019 December) (hereinafter "[TR103300-3]"), and SAE-J2735, *Dedicated Short Range Communications (DSRC) Message Set Dictionary* (January 2016) (hereinafter "[SAEJ2735]"). Such users are referred to as "vulnerable road users" or "VRUs," which refers to both physical entities (e.g., pedestrians) and/or user devices (e.g., mobile stations and the like). It has been estimated that the chances of pedestrian getting killed or injured in a collision is 284 times more likely than a motorist (see e.g., Fagnant et al., *Preparing a nation for autonomous vehicles: opportunities, barriers and policy recommendations*, Transportation Research Part A: Policy and Practice, vol. 77, pgs. 167-181 (July 2015)). This trend is likely to increase given the abuse of smartphones around sidewalks, during biking, etc. Computer-assisted (CA) vehicles and vehicles with autonomous driving (AD) capabilities are expected to reduce such fatalities, especially by eliminating the human-error element in driving (see e.g., Robyn D. Robertson, *Pedestrians: What Do We Know?*, Traffic Injury Research Foundation (TIRF), Ottawa, Ontario Canada (November 2015)). However, to date CA/AD vehicles can do very little about detection, let alone correction of human-error at VRUs' end even though it is equipped with a sophisticated sensing technology suite including sensors such as cameras, LIDAR, RADAR, as well as computing and mapping technologies (see e.g., *Intel Circuit News, Intel-Mobileye Graphic Explainers*, (August 2018) available at: https://newsroom.intel.com/wp-content/uploads/sites/11/2018/08/intel-mobileye-graphic-explainers-one-pager.pdf). Although a VRU may be within the field of view (FoV) of a CA/AD vehicle (viewable or detectable with camera, LIDAR, RADAR, etc.), for a significant amount of time, some VRUs may also be hidden from direct FoV of CA/AD vehicle sensors.

Figure 2:
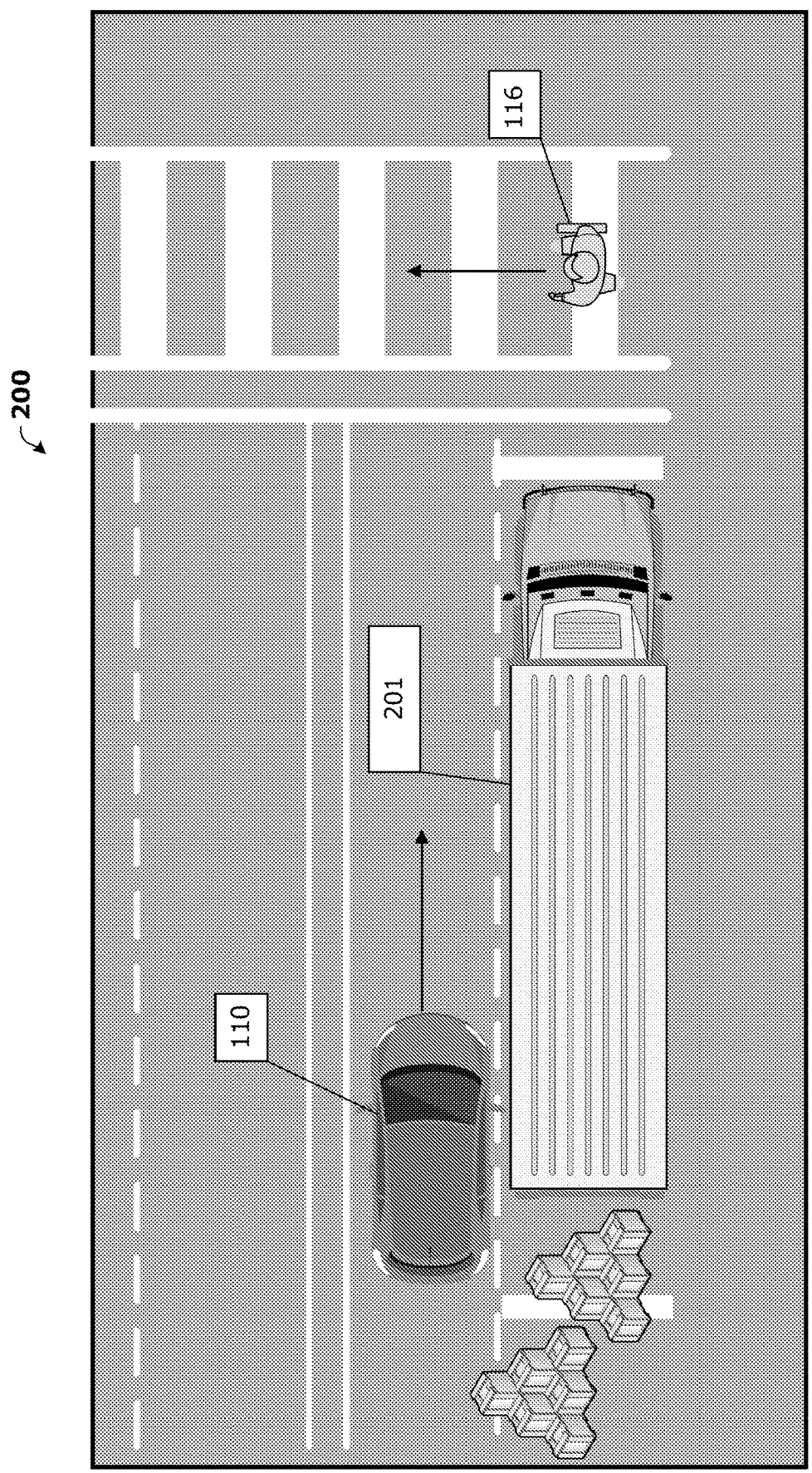
FIGS. 2 and 3 illustrate example vulnerable road user (VRU) life-threatening scenarios.
Figure 3:
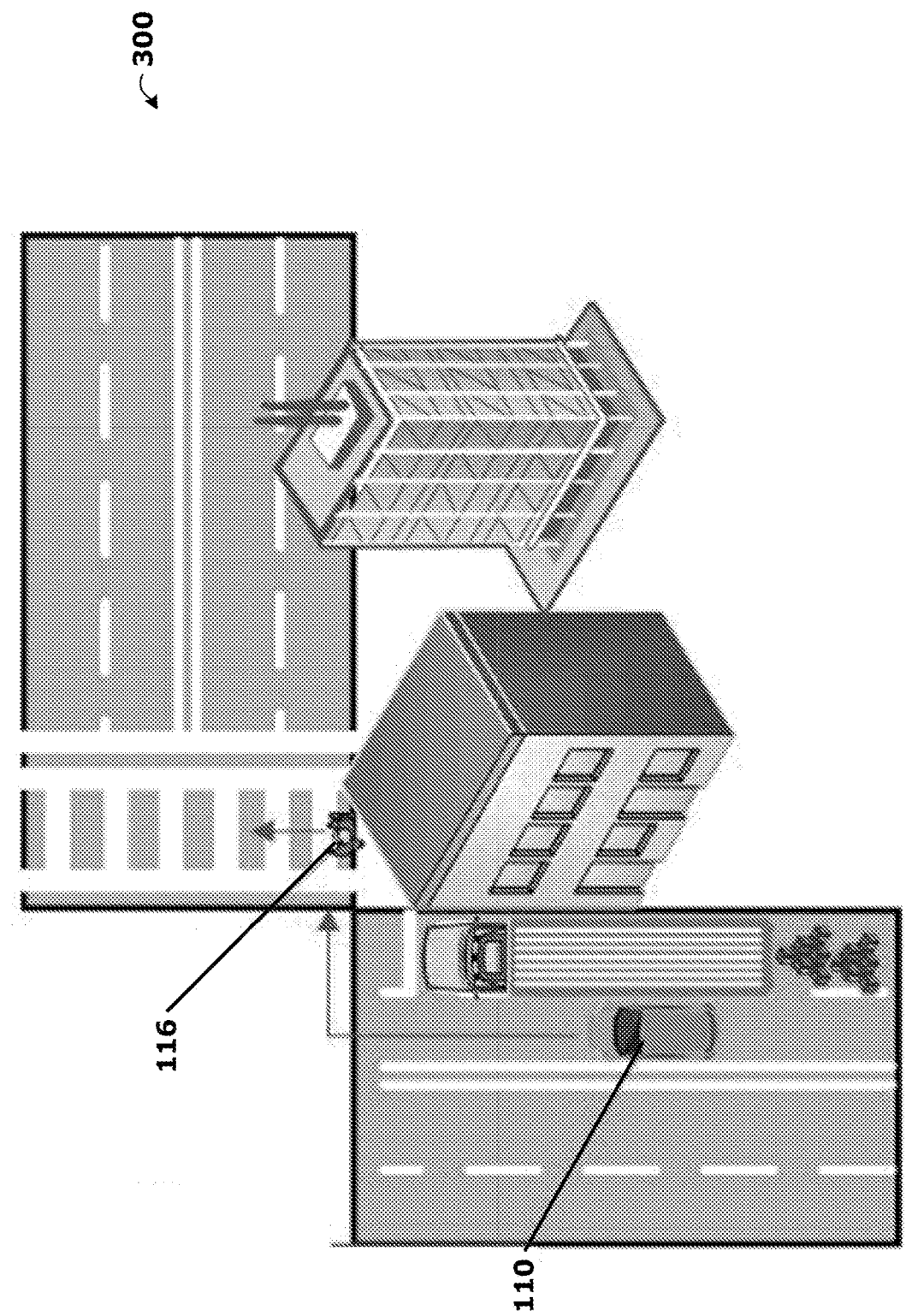
Figure 4:
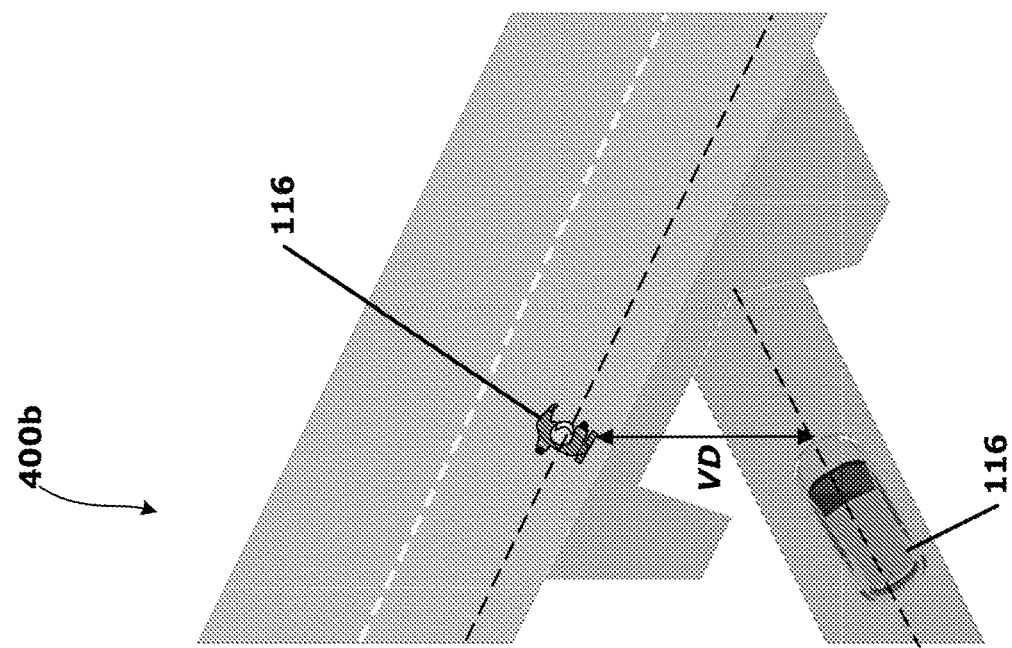
FIGS. 4 and 5 illustrate example scenarios demonstrating Responsibility Sensitive Safety (RSS) criteria according to various embodiments.
Figure 4:
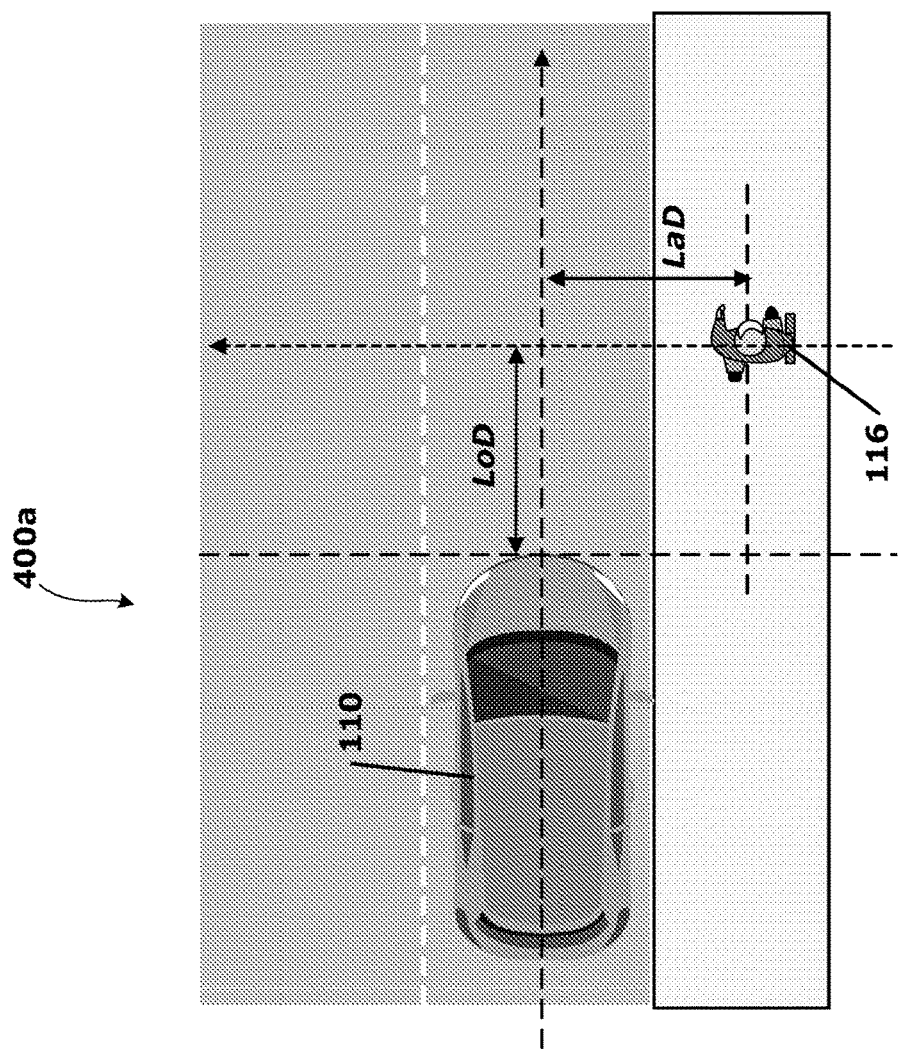

For instance, the example scenarios illustrated by FIGS. 2 and 3 highlight example scenarios 200 and 300, respectively, where a VRU 116 is in a life-threatening situation when it highly probable to be struck by a vehicle 110 because of an insufficient sensory time and/or braking distance for the vehicle's 110 sensor and control systems to respond.

FIG. 2 shows an example scenario 200 where a VRU 116 is starting to cross a road via a crosswalk and a V-ITS-S 110 is approaching a crosswalk. In FIG. 2, both the VRU 116 and V-ITS-S 110 are in each other's blind spots due to an obstructed view from the truck 201. FIG. 3 shows an example scenario where a VRU 116 starts to cross the road at a crosswalk and a V-ITS-S 110 approaching the intersection. In this example, both the 116 and V-ITS-S 110 are heavily blinded from each other due to large obstacles or other vehicles, such as parked truck unloading goods or large buildings occluding the direct view.

As shown by FIGS. 2 and 3, a VRU 116 is crossing a street with visual/sensory obstruction from V-ITS-S 110 (e.g., large truck parked near the crossing) or obstructions due to buildings or other vehicles when turning into a street where a pedestrian VRU 116 is about to cross the road. In both examples, the V-ITS-S 110 and VRU 116 do not have a direct FoV between them. Another example may involve a bicyclist VRU 116 speeding through an intersection on its end-of-yellow or red light. Another example may involve a car turning into a street with building blocking the direct view of a bicyclist VRU 116 (see e.g., FIG. 3). Another example may involve a distracted pedestrian VRU 116 (looking at its smartphone, playing game or watching video) turning into a street crossing suddenly with a V-ITS-S 110 approaching such VRU 116. The safety of such VRUs 116 is crucial and the ability of the V-ITS-S 110 to address such situation needs an urgent attention. To address the aforementioned problems, the embodiments herein enable early RSS checks on planned trajectory for potential collisions with VRUs 116.

The present disclosure provides detection, localization, tracking (DLT) embodiments to accurately detect, localize and track the VRU 116. These embodiments include behavioral model building and updating comprising location, heading (e.g., angular direction) and speed of the VRU in collaboration with the infrastructure equipment (e.g., RSUs/R-ITS-Ss 130), and/or edge networks (e.g., MEC hosts/servers). This mechanism can serve as a redundant perception method at the V-ITS-S 110 for advancing the VRU awareness, localization and tracking capability at the V-ITS-S 110.

The present disclosure provides VRU notification embodiments for VRU 116 protection. The VRU notification embodiments include an Active Mechanism and a Passive Mechanism. The Active Mechanism is used when the VRU 116 (or VRU ITS-S is 117) actively participating in a safety enabling mechanism. The active mechanism may be used for communication-capable VRU ITS-Ss 117 (e.g., V2X-capable VRU ITS-Ss 117) including Tx only capable VRU ITS-Ss 117; Rx only capable VRU ITS-Ss 117, and TX/RX capable VRU ITS-Ss 117. The Passive Mechanism is used when a VRU 116 (or VRU ITS-S is 117) is not actively participating in a safety enabling mechanism. The passive mechanism may be used for communications between an ego V-ITS-S 110 and other V-ITS-S 110 and communications between ego V-ITS-S 110 and other nearby VRU ITS-Ss 117 with communication capabilities. Here, "nearby" may refer to elements/entities that are proximate or within a communications range of the ego V-ITS-S 110 or ego VRU ITS-Ss 117.

Previous efforts to protect VRUs 116 utilize on-board AV sensors (see e.g., Ferranti et al., "SafeVRU: A Research Platform for the Interaction of Self-Driving Vehicles with Vulnerable Road Users," Proceedings of the 30th IEEE Intelligent Vehicles Symposium, Paris, France, pp. 1660-1666 (2019)), V2X communications (see e.g., J. Anaya et al., "Vulnerable Road Users Detection using V2X Communications," Proceedings of the 2015 IEEE 18$^{th}$ International Conference on Intelligent Transportation Systems, pages 107-112 (15-18 Sep 2015)), and stereovision cameras on infrastructure equipment (see e.g., S. Köhler et al., "Autonomous evasive maneuvers triggered by infrastructure-based detection of pedestrian intentions," 2013 IEEE Intelligent Vehicles Symposium (IV), Gold Coast, QLD, pg. 519-526 (2013)). However, none of these solutions address the issue of how to enable accurate DLT of the VRUs 116 especially when the conditions are not suitable to rely only on-board sensors, cameras, LIDAR, RADAR. All the aforementioned solutions would fail to detect the VRU 116 in time and take necessary maneuvers at the AV or at the VRU 116 to avoid the VRU 116 getting hit especially when there is no direct field of vision between V-ITS-S 110 and VRUs 116. Currently, there are no solutions that exist to enable VRU protection for the V-ITS-S 110 based on DLT and subsequent actions based on communications message exchange for collaboration with the infrastructure equipment and edge compute nodes, other V-ITS-Ss 110, and/or other VRUs as well as with the VRU 116 itself.

The present disclosure discusses methodologies to detect VRUs 116, track their position and movements, predict their trajectory, and control actions at both at the V-ITS-S and/or VRUs 116 to prevent or reduce the likelihood vehicular accidents involving VRUs 116. To address these dangerous situations and ensure VRU safety, the embodiments herein expand the FoV of a V-ITS-S 110 to address cases where a VRU 116 may be occluded from the V-ITS-S's 110 FoV. In these embodiments, the V-ITS-S builds and updates a VRU behavioral model based on, for example, location, heading (angular direction), speed, and features unique to the VRU 116. The VRU 116 features may be described or indicated by a VRU profile, a unique ID, time-feature data, and/or other like data structures and data items. In these ways, the embodiments provide V-ITS-Ss 110 with VRU 116 DLT capabilities to help enable early RSS checks for the V-ITS-S's 110 driving policy to protect the in-danger VRU 116.

Embodiments also include two types of communications mechanisms to exchange and update the behavioral model collaboratively with other nearby V-ITS-Ss 110 or R-ITS-Ss 130 deployed in the vicinity of the VRU 116 and/or V-ITS-S 110. The term "NAN," "RSU," or "infrastructure equipment," as used throughout the present disclosure, may refer to various types of infrastructure equipment including RSUs, gNBs, eNBs, relay stations, access points, and/or the like, as well as edge compute nodes that may or may not be co-located with infrastructure equipment even though such terms refer to different types of devices/systems. As such, the terms NAN, RSU, edge node, and infrastructure equipment may be used interchangeably throughout the present disclosure.

The communications mechanisms include an active mechanism and a passive mechanism. For the active communication mechanism, the VRU 116 is assumed to have V2X or similar communications capabilities and both the V-ITS-S(s) 110 and VRU(s) 116 receive notification(s) regarding the possible dangerous situation for the VRU 116. For the passive communication mechanism, the VRU is assumed to not have any suitable communications capabilities and only V-ITS-S(s) 110 are notified in time to early trigger an RSS check towards an object (e.g., a VRU 116 in the examples discussed herein) it cannot see and take necessary V-ITS-S control actions.

The control actions may encompass a variety of interventions that can be undertaken by a V-ITS-S 110 and/or VRU 116 to prevent, reduce the likelihood of, or delay the occurrence of a potentially dangerous situation from taking place. Examples of VRU 116 control actions may include notifying the VRU of the potentially dangerous situation that is about (or likely) to take place using, for example, audio, visual, and/or haptic feedback mechanisms, changing the state of the VRU 116 to provide or execute such a notification (e.g., transitioning the device from an inactive mode to an active mode or the like), and/or otherwise controlling the VRU 116 to indicate or express the likelihood of a dangerous scenario. Examples of V-ITS-S control actions include controlling the vehicle (or various subsystems of the V-ITS-S 110) to perform evasive maneuvers such as braking (e.g., stopping or deceleration), changing speed (e.g., acceleration and/or deceleration), and/or longitudinal and/or lateral movements (e.g., land changes, swerving, and the like). When applied to aerial systems, the evasive maneuvers may include 6DoF movements such as translational movements (e.g., surge (X-axis), sway (Y-axis), and heave (Z-axis)) as well as rotational movements (e.g., roll (X-axis), pitch (Y-axis), and yaw (Z-axis)). The active mechanisms may include communicating and/or executing one or more VRU control actions and one or more V-ITS-Ss control actions, and the passive mechanisms at least include communicating and/or executing one or more V-ITS-Ss control actions. V-ITS-Ss 110

1.1. Responsibility Sensitive Safety (RSS) Aspects

Responsibility Sensitive Safety (RSS) is a rigorous mathematical model that formalizes an interpretation of the Duty of Care from Tort law, which states that an individual should exercise "reasonable care" while performing acts that could harm others (see e.g., Shalev-Shwartz et al., "On a Formal Model of Safe and Scalable Self-driving Cars," Mobileye, arXiv preprint arXiv:1708.06374 (21 Aug. 2017) (updated version: (27 Oct. 2018)) (hereinafter "[Shalev1]")). RSS is a rigorous mathematical model formalizing an interpretation of the law which is applicable to self-driving cars (see e.g., [Shalev1]).

The RSS safety model is a technology-neutral formal mathematical approach to a safety concept for decision-making component of an CA/AD vehicle (e.g., including V-ITS-Ss 110). RSS formalizes human notions of safe driving, using a set of mathematical formulas and logical rules that are transparent and verifiable. These rules define the common-sense behavioral characteristics that humans would characterize as leading to safe driving. The goal is that the CA/AD vehicle should drive carefully enough so that it will not be the cause of an accident, and cautiously enough so that it can compensate for the mistakes of others. By and large, RSS is constructed by formalizing the following 5 "common sense" rules: (1) do not hit someone from behind; (2) do not cut-in recklessly; (3) right-of-way is given, not taken; (4) be careful of areas with limited visibility; and (5) if you can avoid an accident without causing one, you must do it (see e.g., [Shalev1]). To realize these common sense rules, the RSS framework comprehensively defines and parameterizes lateral distances (LaD), longitudinal distances (LoD), and/or vertical distances (VD) for safety, and proper response inclusive of compensating the mistakes of others, as well as cautiousness with respect to occlusions. For purposes of the present disclosure, the LaDs, LoDs, and/or VDs are measured between a reference point for a VRU 116 and a V-ITS-S 110.

RSS operates as a separate layer from ML/AI-based decision-making agents. RSS deterministically defines decisions that are safe, enabling CA/AD vehicles to make cautious but assertive maneuvers that are within a precisely defined safety envelope—some that otherwise would have been thrown out under ML/AI-based decision models that are often too-conservative. This allows CA/AD vehicles to drive naturalistically alongside human drivers.

The RSS layer continuously monitors the current state of the environment and the state of the vehicle itself, calculates a safety envelope (e.g., LaD, LoD, and/or VD safety distances/thresholds), and performs an appropriate response in case of violation of the safety envelope. If the LaD, LoD, and/or VD safety distances are violated, the situation is considered to be "dangerous" and the RSS framework provides an appropriate reaction (control action) that should bring the vehicle back to a safe state.

RSS also encompasses the need for protection of the pedestrians or other non-motorized users as a priority. In this regard, the embodiments herein help further re-iterate the effectiveness of the RSS in handling the corner cases of the VRU 116 protection as discussed previously with respect to FIGS. 2-3. Additionally, the various embodiments herein may be integrated to further improve the likelihood of achievement and maintenance of the common sense rules proposed in the RSS framework.

In order to address the problem of reliably protecting the VRUs, very highly reliable system for accurate DLT and notification about such VRUs 116 to V-ITS-Ss 110 and/or the VRUs 116 about such closely approaching V-ITS-S(s) 110. When applied to scenarios such as the corner scenarios of FIGS. 2-3, the embodiments herein could serve as the typical corner cases when an RSS check is to be performed based on additional input from the surrounding R-ITS-S(s) 130, V-ITS-S(s) 110, or even VRU(s) 116 for early notification based control triggering for timely maneuvering of the V-ITS-S(s) 110.

The example embodiments herein are discussed in the context of addressing the cases when a VRU 116 may cross or enter a road, or a V-ITS-S 110 trajectory while being present at an unsafe longitudinal and lateral distances, thus leading to a potential collision with the VRU 116 by the V-ITS-S 110 (see e.g., [Shalev1]); however, the embodiments herein may be applicable to any other type of potentially dangerous scenario.

The present disclosure provides criteria to help RSS check in a safe manner for an AV approaching a potentially unsafe VRU 116. The RS S criteria can be explained in terms of three parameters shown and described with respect to scenarios 400a and 400b in FIG. 400a, which are as follows: (i) Lateral Distance (LaD) and Minimum Safe Lateral Distance (MSLaD), (ii) Longitudinal Distance (LoD) and Minimum Safe Longitudinal Distance (MSLoD), and (iii) Vertical Distance (VD) and Minimum Safe Vertical Distance (MSVD). In some embodiments, the MSLaD, MSLoD, and MSVD may be part of the RSS envelope.

LaD is the estimated distance of the VRU 116 from the ego-V-ITS-S 110 and VRU 116 perpendicular to the direction of heading as shown by scenario 400a. MSLaD is the minimum lateral separation of the VRU 116 from the ego-V-ITS-S 110 and VRU 116 considered to be safe.

The LoD is the estimated distance of the VRU 116 from the ego-vehicle and VRU 116 along the direction of heading as shown by scenario 400a. The MSLoD is the minimum longitudinal separation of the VRU 116 from the ego-V-ITS-S 110 and VRU 116 for considered to be safe.

The VD is the estimated distance in vertical direction (height) with respect to the ego-V-ITS-S 110 and VRU 116 as shown by scenario 400a. The MSVD is the minimum vertical separation of the VRU 116 from the ego-V-ITS-S 110 and VRU 116 considered to be safe.

Furthermore, the violation condition for the safe distance between a VRU 116 and V-ITS-S 110 in terms of the LaD, LoD, and VD can be expressed as shown by equation 0.

$$\text{LaD} < \text{MSLaD} \text{ and } \text{LoD} < \text{MSLoD} \text{ and } \text{VD} < \text{MSVD} \qquad (0)$$

Figure 5:
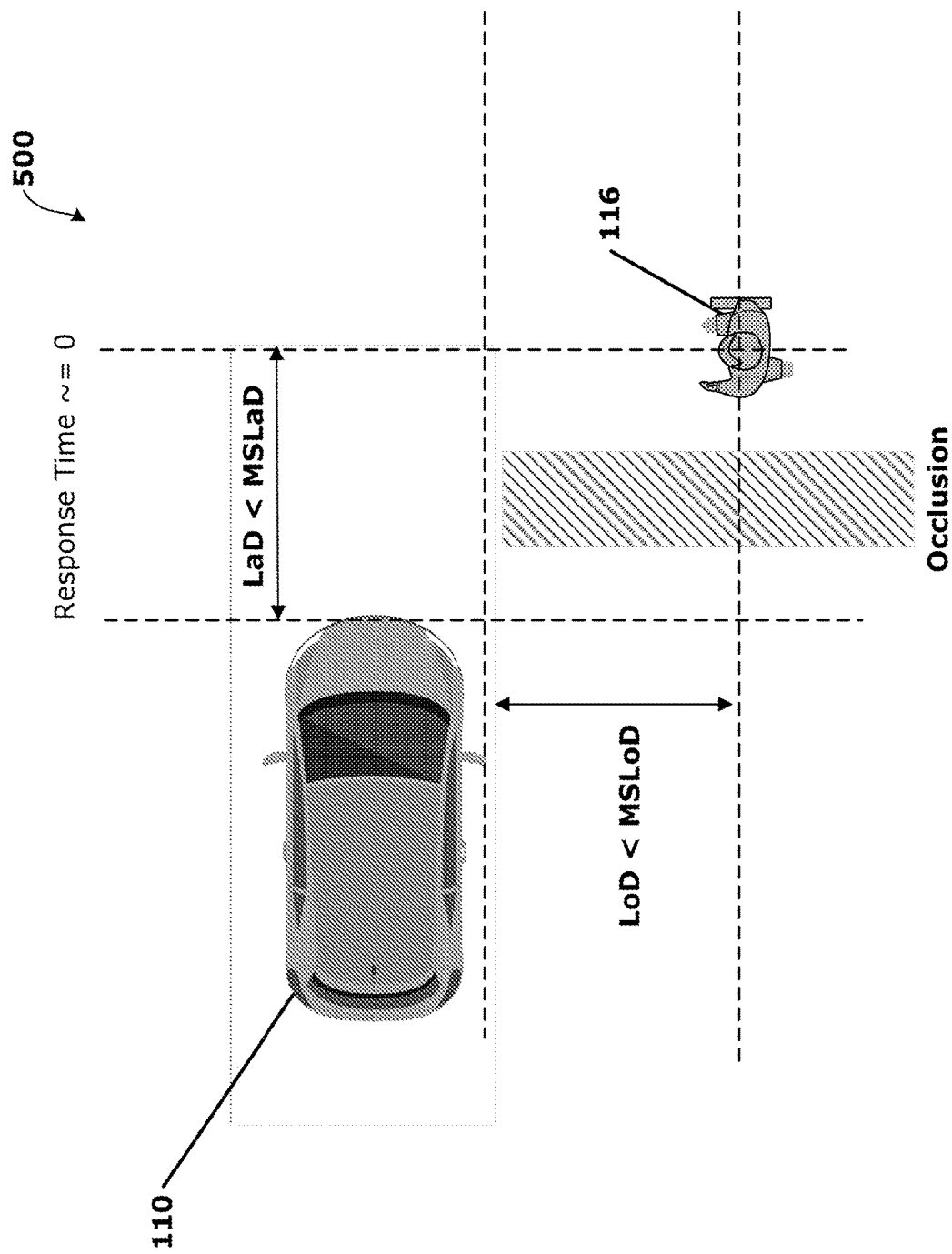

FIG. 5 shows an example scenario 500 where a VRU 116 is dangerously close to the V-ITS-S 110 where the V-ITS-S 110 has a very short response time (almost zero) and very short braking time due to (e.g., occluded) sudden appearance of a VRU 116 such that the LoD between the V-ITS-S 110 and the VRU 116 is within the MSLoD, the LaD between V-ITS-S 110 and the VRU 116 is within the MSLaD, and the VD between the V-ITS-S 110 and the VRU 116 is within the MSVD. Both the VRU 116 and V-ITS-S 110 could be occluded from each other due to, for example, large obstacles or other vehicles (e.g., a parked truck unloading goods, a building, a geographic feature, and/or the like). Furthermore, since the VRU 116 and the V-ITS-S 110 are on the same road surface, and hence the same vertical plane, the VD between the V-ITS-S 110 and VRU 116 is also within the MSVD. In this example, the LoD is within the MSLoD, the LaD is within the MSLaD, and the VD is within the MSVD from the approaching V-ITS-S 110 because both V-ITS-S 110 and VRU 116 are in the same plane. Thus, in this example, all three parameters MSLaD, MSLoD, and MSVD are violated by LaD, LoD and MSVD, respectively. This situation could arise with or without implementation of the embodiments discussed herein. For such cases, there is a tradeoff between ensuring the safety of the VRU 116 (e.g., with hard braking) and guaranteeing comfort to the passengers onboard the V-ITS-S 110.

1.2. VRU Early Detection Embodiments

Embodiments herein include techniques of early detection of VRUs 116 and notification to the V-ITS-S(s) 110 and/or to the VRU(s) 116 followed by triggering early RSS checks at the V-ITS-S(s) 110, which are earlier than existing safety mechanisms, so that it would incorporate the occluded VRU 116 in the safety envelope calculations, thus increasing the safety assurances of not causing an accident with the surrounding VRUs 116. Additionally, such embodiments can also ensure in-vehicle passenger comfort level while safety is maintained. To this end, embodiments also include mechanisms for detection of such dangerous situations with an approaching V-ITS-S(s) 110 and message exchange protocol leading to generation of warning notification to the VRU ITS-S 117, V-ITS-S 110, and neighboring R-ITS-S 130, V-ITS-S(s) 110, and/or VRU ITS-S 117. The active mechanism embodiments, assuming a VRU ITS-S 117 has communication capability, involve two-way or one-way communication between both ego VRU ITS-S 117 and ego V-ITS-S(s) 110 (VRU to V-ITS-S and/or V-ITS-S to VRU) as well as between ego VRU ITS-S 117, nearby R-ITS-S 130, and ego V-ITS-S(s) 110 (VRU ITS-S 117 to R-ITS-S to V-ITS-S and V-ITS-S to R-ITS-S to VRU ITS-S 117).

Figure 6:
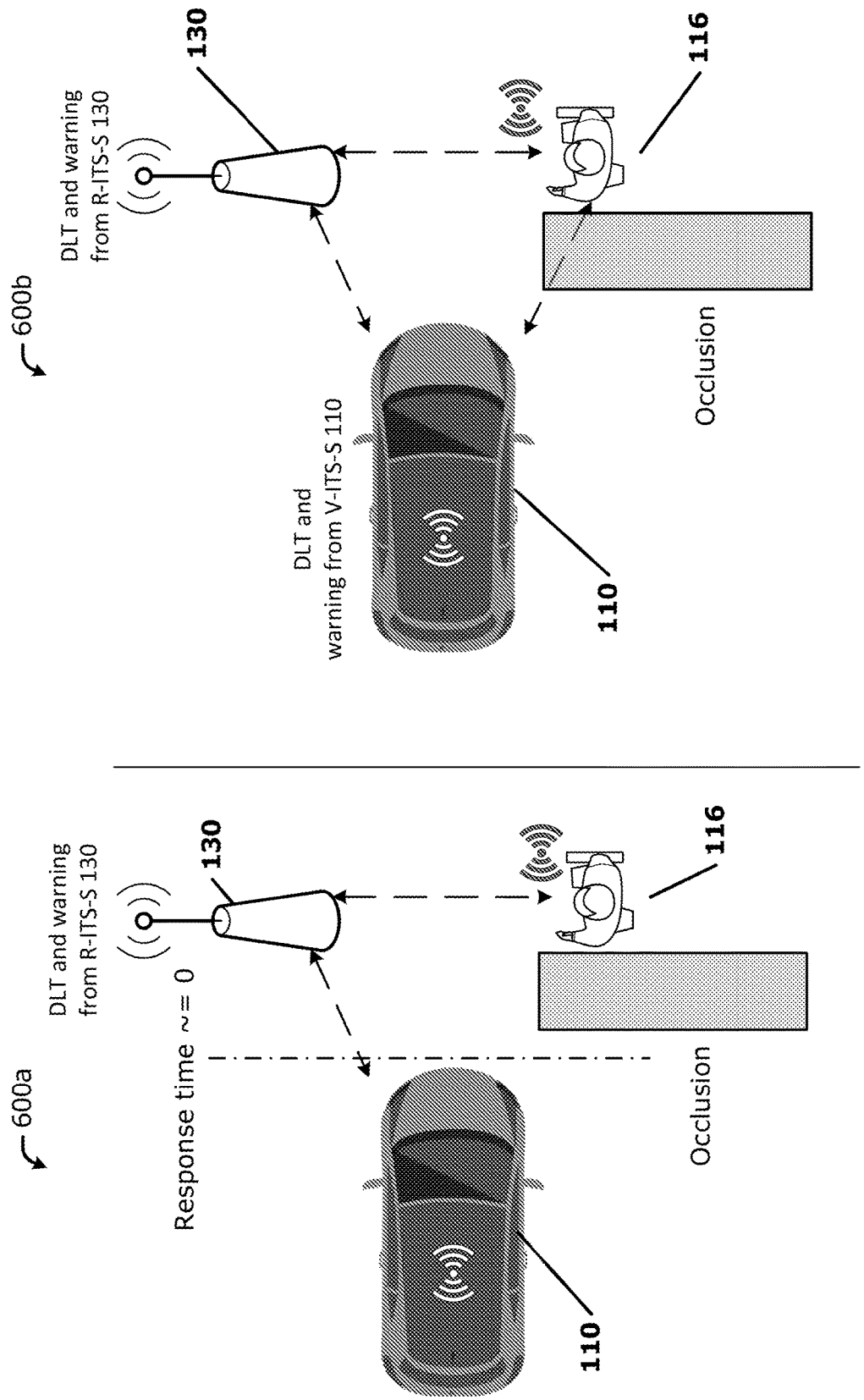
FIG. 6 illustrates an example of active mechanism embodiments.

FIG. 6 shows example scenarios 600a and 600b of the various embodiments discussed herein. The Active Mechanism example shown by FIG. 6 requires communication capability at the VRU ITS-S 117. Scenarios 600a and 600b are shown in which the FoV at the V-ITS-S 110 are increased for DLT and warning/notification to both V-ITS-S 110 and/or VRU ITS-S 117 (e.g., based on message exchanges).

In scenario 600a, the VRU 116 does not have direct communications capability with the V-ITS-S(s) 110 but only with the RSU-V-ITS-S 110. In scenario 600b of FIG. 6, the VRU ITS-S 117 has direct communications capability both with the V-ITS-S 110 and the R-ITS-S 130.

Figure 7:
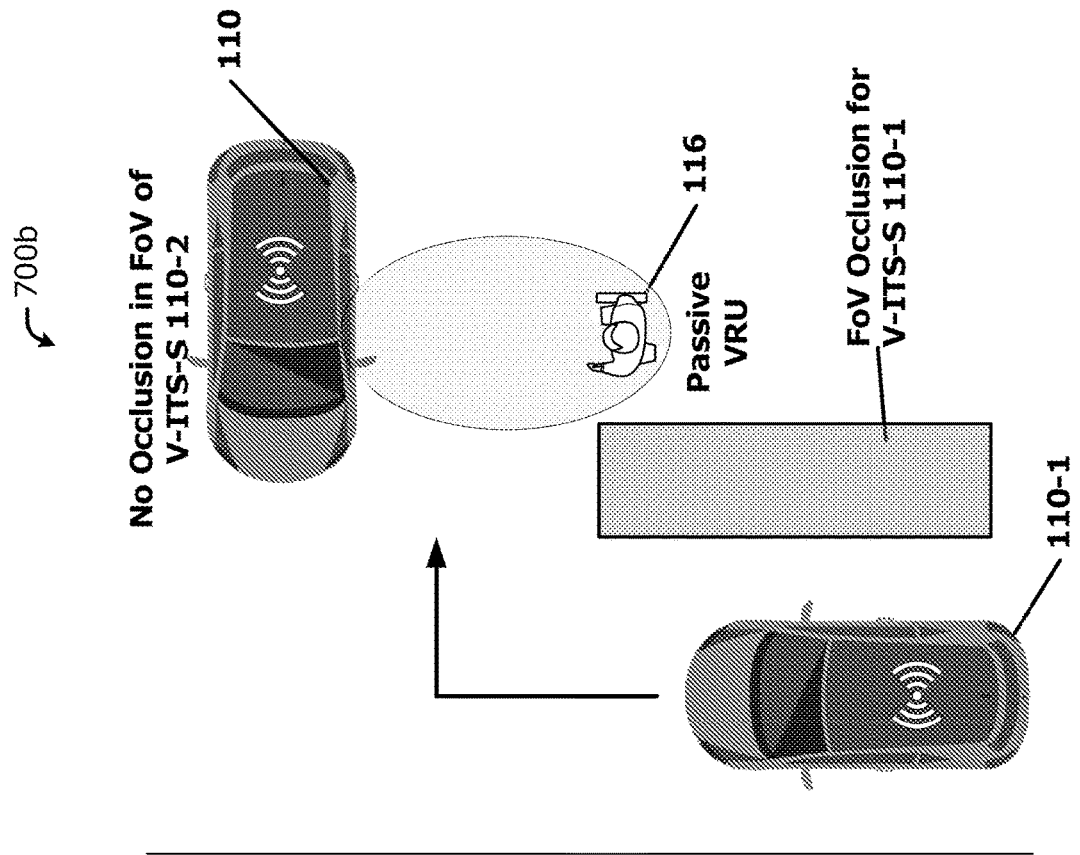
FIG. 7 illustrates an example of passive mechanism embodiments.
Figure 7:
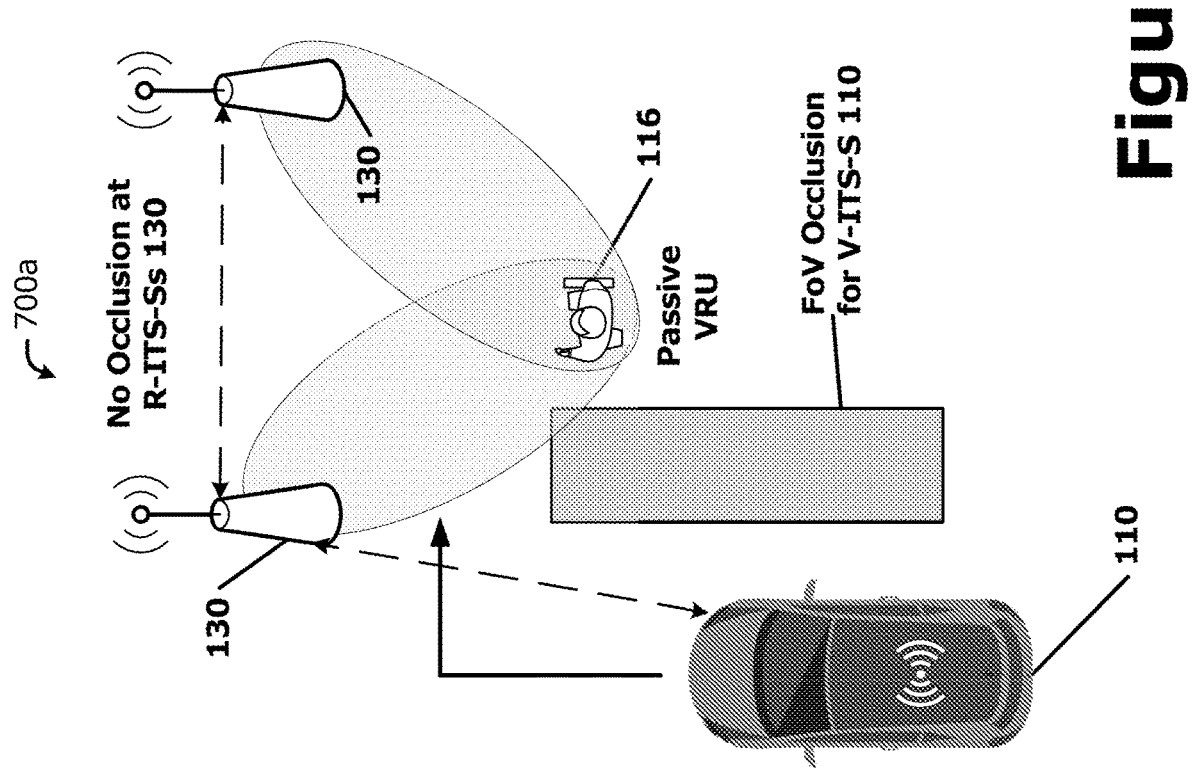

The passive mechanism, assuming VRU 116 does not have any suitable communications capability, involves two-way/one-way between ego V-ITS-S(s) 110 and R-ITS-S 130 or between ego V-ITS-S(s) 110 and nearby RSUs, other V-ITS-S(s) 110 or even other VRUs. Examples of these embodiments are shown by FIG. 7. The example Passive Mechanism does not require any communication capability at the VRU. In the example of FIG. 7, inter-V-ITS-S 110 as well as inter-RSU-V-ITS-S 110 collaboration mechanisms are shown to increase the FoV of the V-ITS-S 110 for DLT and notification/warning to V-ITS-S 110 based on message exchanges.

The active and passive mechanisms may utilize any suitable RAT at the V-ITS-S 110, the VRU, and/or the R-ITS-S 130 including D2D, V2X, and/or sidelink RATs based on, for example, 3GPP C-V2X (e.g., 4G/LTE and/or 5G/NR), IEEE 802.11p (ITS-G5/DSRC), and/or some other RAT or communication technology.

1.3. VRU Safety Architecture Embodiments

Figure 8:
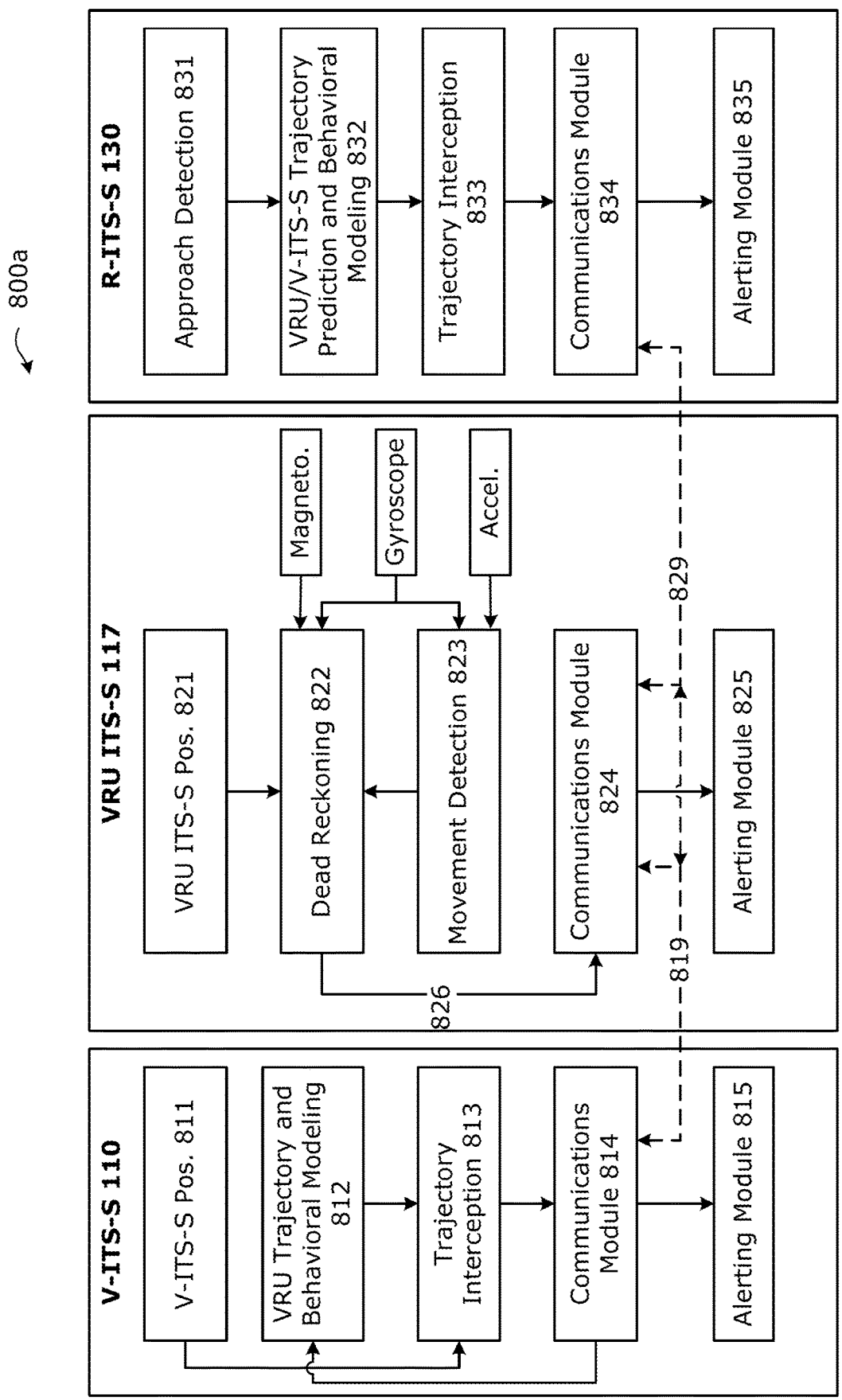
FIG. 8 illustrates an example VRU safety architecture according to various embodiments.

FIG. 8 shows an example VRU safety architecture 800 according to various embodiments. The VRU safety architecture 800 provides message exchanges to assist with detection, localization, tracking, and alerting, as well as behavioral model download/upload from/to the V-ITS-S 110 and the R-ITS-S 130 subsystems. The VRU safety architecture 800 shows the internal modules/components of the V-ITS-S 110, VRU 116, and R-ITS-S 130 subsystems. The various subsystems depicted by FIG. 8 may be the same or similar as the components depicted by FIGS. 20, 2206, 2306, 2406, and/or depicted by any other figure herein and/or otherwise described herein.

The V-ITS-S subsystem 110 includes V-ITS-S positioning circuitry 811, which is configurable or operable to determine the position/location coordinates (e.g., GPS/D-GPS coordinates or the like) of the V-ITS-S 110. The V-ITS-S positioning circuitry 811 may be the same or similar as the positioning circuitry 3045 of FIG. 30.

The V-ITS-S subsystem 110 also includes VRU Trajectory Prediction and Behavioral Modeling circuitry 812, which is configurable or operable to predict the VRU's 116 trajectory and movement behaviors. The VRU trajectory and movement behavior predictions/models may be based at least in part on information obtained from the VRU ITS-S Subsystem 117 via the message exchange 819. The message exchange 819 is used to communicate information to help with Detection, Localization, Tracking, and Alerting according to the embodiments discussed herein. Embodiments for determining these predictions are discussed in more detail infra.

The V-ITS-S subsystem 110 also includes trajectory interception circuitry 813, which is configurable or operable to predict the VRU's 116 trajectory and movement behaviors. The VRU trajectory and movement detect V-ITS-S to VRU trajectory interception. The V-ITS-S to VRU trajectory interception influences the RSS check. In addition to the example embodiments discussed infra, this may include various aspects of the collision risk analysis as discussed infra with respect to FIG. 20.

Figure 30:
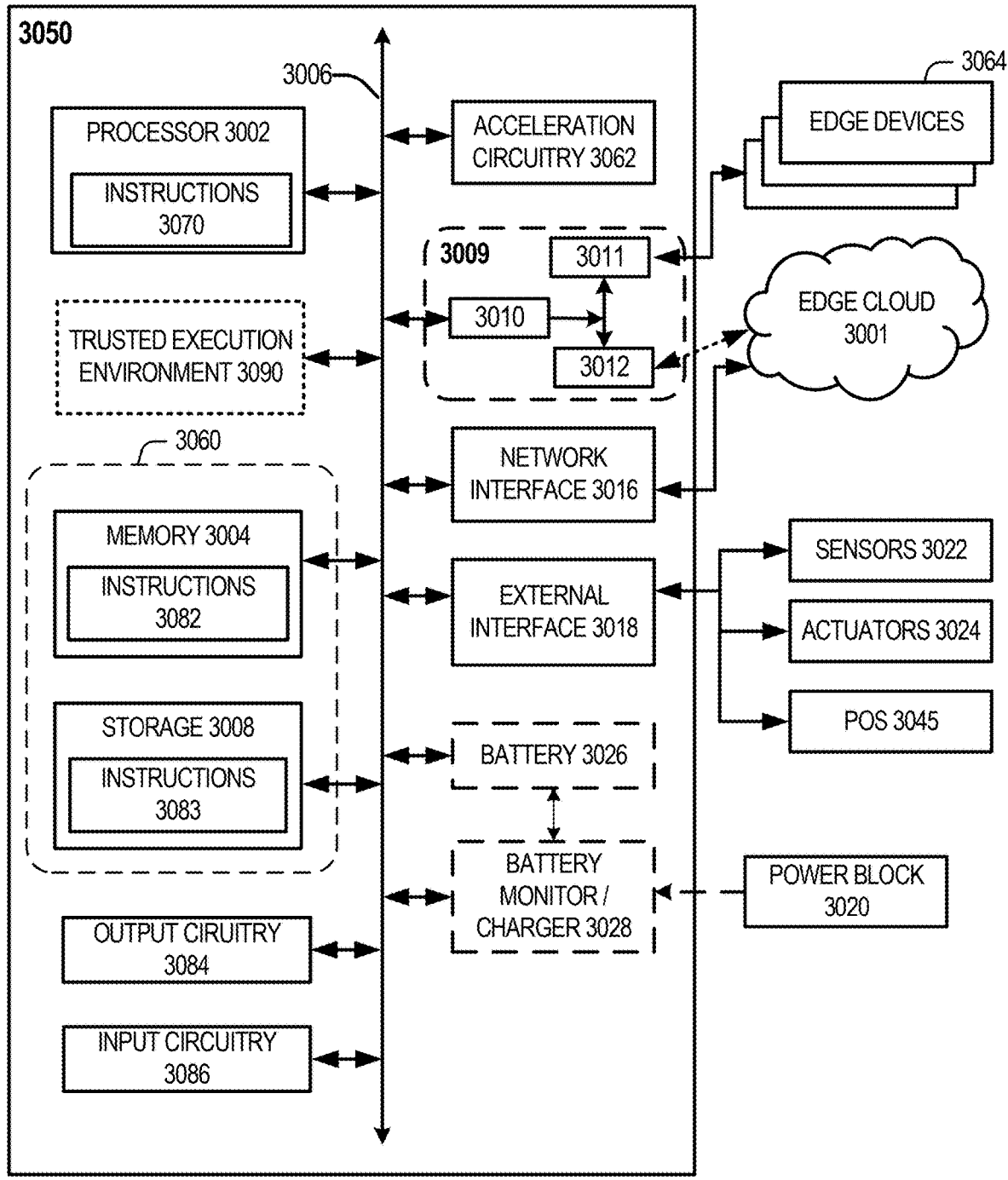

The communication module 814 may be the same or similar to the communication circuitry 3009 of FIG. 30, and is used for message exchanges 819 and/or 829. The alerting module 815 may include various output devices and/or applications used to provide user alerts regarding VRU RSS including one or more visual alerts, audio alerts, and/or physical alerts. For example, the audio alerts may include outputting sirens or other auditory signals; the visual alerts may include flashing lights/LEDs of the device, push notifications, SMS/MMS messages, Over-the-Top (OTT) messages, and/or the like; and the physical alerts may include haptic feedback, device (mechanical) state changes, or the like. The alerts may include any combination of alert types, which may be output in any pattern or sequence. Additionally or alternatively, the combination of alert types and/or pattern/sequence of alerts may be based on the severity of the alert, which is discussed in more detail infra. Additionally or alternatively, the alerting module 815 may cause send or otherwise cause alerts to be generated and output by the VRU device 117 (e.g., sending/pushing a push notification and/or other alerts to the VRU device 117).

The VRU ITS-S Subsystem 117 includes VRU ITS-S positioning circuitry 821, which is used to determine the position/location coordinates (e.g., GPS/D-GPS coordinates or the like) of the VRU 116, and provides the position/location data to the dead reckoning module 822. The VRU ITS-S positioning circuitry 821 may be the same or similar as the positioning circuitry 3045 of FIG. 30. The movement detection module 823 obtains sensor data input from one or more sensors (e.g., the gyroscope and accelerometer) to track motions of the VRU 116 and/or determine or estimate a particular activity (e.g., biking, running) of the VRU 116. This information is provided to the dead reckoning module 822 to aid the dead reckoning module 822 in the heading intention or orientation of the VRU 116.

The dead reckoning module 822 is configurable or operable to determine or estimate the VRU 116 position, location, speed, heading/angular-direction (approach), and behavioral features of the VRU 116. The dead reckoning module 822 performs this estimation based on sensor data obtained from the positioning circuitry 821, one or more sensors (e.g., magnetometer (compass) and gyroscope (axial orientation and angular velocity)), and movement detection module 823. The outcome of the dead reckoning module 822 indicate or include predicted/estimated feature data (or simply "features") 826. The features 826 include, for example, Location, Speed, Heading/Angular direction (approach), and Behavioral features of the VRU 116/VRU ITS-S 117. The features 826 may be provided to the communications module features 824 for the message exchanges 819 and 829 to help Detection, Localization, Tracking, and Alerting.

The communication module 824 may be the same or similar to the communication circuitry 3009 of FIG. 30, and is used for message exchanges 819 and/or 829. The alerting module 825 may include various output devices and/or applications used to provide user alerts regarding VRU RSS, for example, physical alerts (e.g., haptic feedback), audio alerts (e.g., sirens, etc.), and visual alerts (e.g., flashing lights, push notifications, emergency alerts, etc.).

The R-ITS-S Subsystem 130 includes an approach detection module 831 that is configurable or operable to determine, estimate, or predict the Location, Heading, and Speed of VRUs 116 and V-ITS-Ss 110 using various data from various devices/components such as, for example, GPS data, image capture devices (e.g., high definition (HD) cameras), motion detection devices (e.g., radar, LiDAR, etc.), Geo-Map data, and/or the like. The trajectory interception module 833 is configurable or operable to detect and/or predict the VRU—V-ITS-S trajectory interception and/or potential conflict point (and TTC) in a same or similar manner as the trajectory interception module 813.

Figure 29:
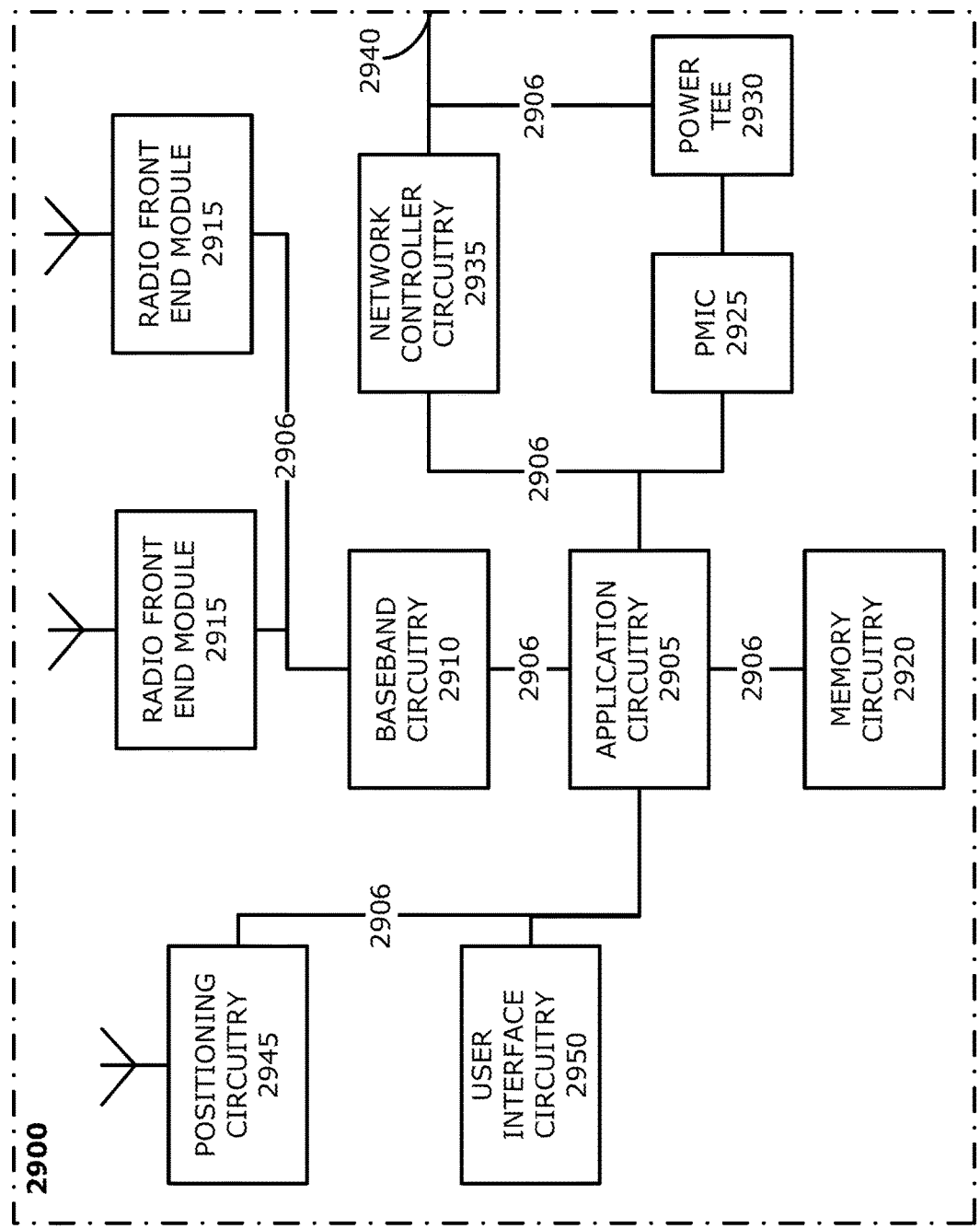
FIGS. 29 and 30 depict example components of various compute nodes in edge computing system(s).

The communication module 834 may be the same or similar to the communication circuitry of FIG. 29 (e.g., the RFEM FIG. 2915 and/or baseband circuitry FIG. 2910), and is used for message exchanges 819 and/or 829. The alerting module 835 may include various output devices and/or applications used to provide user alerts regarding VRU RSS, for example, causing the VRU device 117 and/or the V-ITS-S 110 to output audio alerts, visual alerts, physical alerts, and/or other alerts such as those discussed herein.

Although not shown by FIG. 8, the VRU safety architecture 800 could also include one or more other, non-ego VRU ITS-Ss 117, non-ego V-ITS-Ss 110, and/or non-ego R-ITS-Ss 130. These other ITS-Ss may be ITS-SS that are not in the dangerous situation with the ego VRU ITS-S 117. Here, an "ego" element/entity (e.g., where the element/entity is an VRU ITS-Ss 117, V-ITS-Ss 110, or R-ITS-Ss 130) is an element/entity being considered in a "first person" perspective, and in the context of the present disclosure, is the element/entity with/for whom the potential collision risk analysis and collision risk avoidance at both the V-ITS-S 110 and VRU-ITS-S 117 as well as non-VRU ITS-S is being analyzed.

1.4. VRU Protection Mechanisms

Figure 9A:
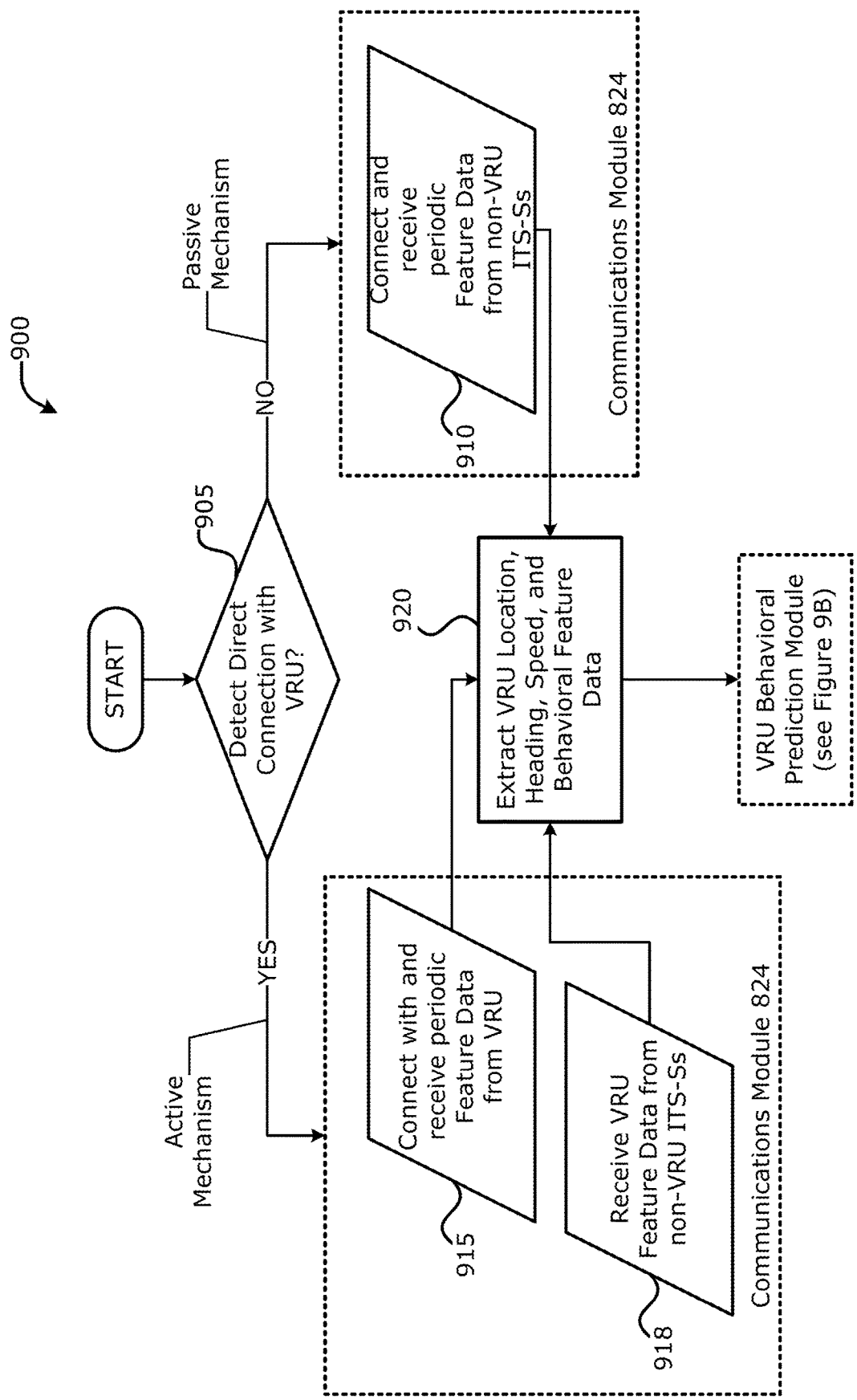
FIGS. 9A and 9B illustrate an example VRU safety procedure according to various embodiments.
Figure 9B:
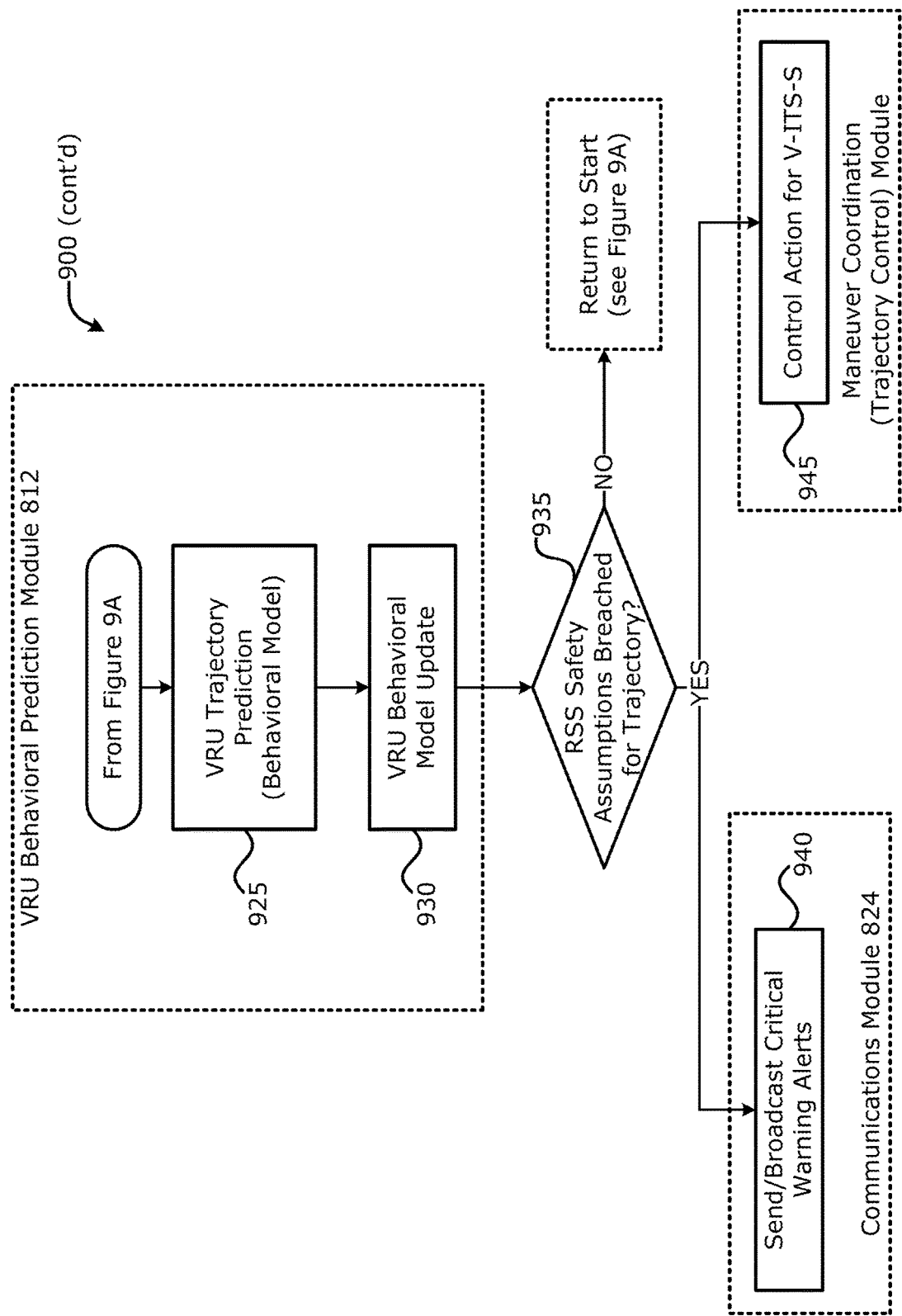

FIGS. 9A-9B show an example VRU safety procedure 900 for operating a VRU protection mechanism according to various embodiments. The procedure of FIGS. 9A-9B can be used for both the active and passive mechanisms discussed herein.

Procedure 900 begins at operation 905 (FIG. 9A) where a V-ITS-S 110 determines whether a direct connection with a VRU ITS-S 117 exists. If no connection with a VRU ITS-S 117 exists, then the V-ITS-S 110 proceeds to perform the passive mechanism, where at operation 910 the communications module 824 connects with one or more non-VRU ITS-Ss (e.g., other V-ITS-Ss 110, one or more R-ITS-Ss 130, or the like), and periodically receives feature data from the one or more non-VRU ITS-Ss. If a connection with a VRU ITS-S 117 exists, then the V-ITS-S 110 proceeds to perform the active mechanism, where at operation 915 the communications module 824 connects with the VRU ITS-S 117 to periodically receive feature data from the VRU ITS-S 117, and at operation 918 the communications module 824 connects with one or more non-VRU ITS-Ss (e.g., other V-ITS-Ss 110, one or more R-ITS-Ss 130, or the like), and periodically receives feature data from the one or more non-VRU ITS-Ss. The feature data received at operations 910, 915, and 918 may be the same or similar to the features 826, and may be received via message exchanges 819 and/or 829. After operation 910, 915, and/or 918, the V-ITS-S 110 proceeds to operation 920 to extract VRU Location, Heading, Speed, and Behavioral Feature Data from the feature data received at (during) operations 910 or 915 and 918.

Next, at operation 925 (FIG. 9B) the VRU Behavioral Prediction Module 812 predicts the VRU trajectory, and at operation 930 the VRU Behavioral Prediction Module 812 creates or updates the VRU behavioral model. At operation 935, the V-ITS-S 110 determines whether any of RSS safety assumptions are breached for the predicted VRU trajectory. Here, the RSS safety assumptions may refer to the RSS "5 common sense rules" discussed previously. If the RSS safety assumptions are breached for the predicted VRU trajectory, at operation 940 the communications module 824 transmits or broadcasts a critical warning alert to any nearby VRUs 116, V-ITS-Ss 110, and R-ITS-Ss 130. If the RSS safety assumptions are not breached for the predicted VRU trajectory, at operation 945 the maneuver coordination/trajectory control module (see e.g., FIG. 20) to trigger or control a control action for the V-ITS-S 110 (e.g., braking, lane change, update route, safely maneuver, evasive action, and/or the like). After performance of operation 940 or 945, procedure 900 may end or repeat as necessary.

1.5. Early Detection of Violation of V-ITS-S'S RSS Minimum Safe Distances Towards VRU One step in ensuring VRU 116 safety includes identifying/detecting, in real-time (or near real-time), the presence or absence of any VRUs in the trajectory of the V-ITS-S 110. The first problem at hand is to detect a VRU 116 within the vicinity of the V-ITS-S 110 and estimate its trajectory and speed. This step is used for performing an early RSS check, and to determine whether the basic assumptions that RSS makes with respect to the VRU 116 behavior are met or not. For example, if the RSS reasonable assumed speed for a possible occluded pedestrian is less than the current speed of the pedestrian around the corner, then the V-ITS-S 110 could cause an accident, as the calculation of the minimum distances (longitudinal and lateral) will be incorrect. Additionally, accurate VRU 116 detection capabilities at the V-ITS-S 110 (even in cases where VRU 116 is occluded from the V-ITS-S 110's direct FoV) is used to determine whether an update on the RSS assumptions or a proper response is needed or not.

1.5.1. Active Mechanism Embodiments

A task is to identify any VRU 116 (from ego V-ITS-S 110 perspective) that may have the potential to approach the vicinity and subsequently may cross its trajectory with that of the ego V-ITS-S 110. For the active mechanism (see e.g., FIG. 6), since the VRUs have TX only communication capabilities, RX only communication capabilities, or both Tx and RX communication capabilities, they can play a role to help the V-ITS-S 110 detect their presence. Three different embodiments may be used for the active mechanism from the perspective of a single VRU 116 safety. The same embodiments can be extended for multiple-VRU safety by employing, for example, clustering or other like concepts.

1.5.1.1. Active Mechanism Embodiment 1: VRU Equipped With Only TX Capability

In this embodiment, the VRU's communication capabilities are limited to TX only, and the VRU 116 acts as an informing entity. This embodiment may be used for scenarios where the VRU 116 is equipped with a low-power, low-complexity transmitter (e.g., a wearable device or the like).

In this embodiment, the VRU 116 transmits or broadcasts beacon signals every T ms. Example bounding values of T could be at least 1 ms (e.g., beacon Tx frequency 1000 Hz), which may be used, for example, when the VRU 116 wants to cross a busy urban intersection with a lot of occlusions between V-ITS-S 110 and VRU). In another example, bounding values of T could be at most 100 ms (e.g., beacon Tx frequency 1 Hz) may be used, for example, when the VRU 116 is crossing some rural intersection or less busy residential area intersection and/or is aware that the occlusions between the V-ITS-S 110 and the VRU 116 may be low but still is safer to indicate his/her presence in the possible V-ITS-S 110 trajectory.

The periodicity of the beacon signal can be configured by the VRU 116 itself, and partly depends upon the intensity of the traffic environment in the vicinity of the VRU. In other words, the beacon signal periodicity can be adjusted based on the amount of traffic in the environment and/or other contexts of the environment. Such periodic beaconing is broadcast by the VRU 116 in its vicinity to up to a distance R (e.g., not less than 50 m and not more than 300 m assuming the roads have 1R-ITS-S 130 deployed at least every R along the road), thus covering an area around the VRU 116 equal to $\pi R^2$ where the beacon is present.

The beacon may be listened to (a) by the V-ITS-S 110 due to direct COMM link between VRU 116 and V-ITS-S 110, and/or (b) by a nearby R-ITS-S 130 which happens to listen to the broadcast beacon from the VRU. In case (b), the R-ITS-S 130 would further broadcast/relay the information indicating the presence of the VRU 116 to the approaching ego V-ITS-S 110. In both cases (a) and (b), the following detection tests may apply.

The successful detection of such beacon message would serve for presence or absence of the VRU 116 in the vicinity. The detection problem at the V-ITS-S 110 could be formulated as a binary hypothesis testing problem of the form of equation 1.

Null hypothesis at VDU, $H_{0,av}$:VRU beacon signal absent Alternative hypothesis at VDU, $H_{1,av}$: VRU beacon signal present (1)

The received signal at the V-ITS-S 110 could thus be fed into, for instance, a blind (non-coherent) signal detector such as an energy detector which does not require any a-priori assumption on the signal to be detected. Alternatively, if some basic features of the VRU 116 beacon signal are known a-priori (e.g., autocorrelation), then, signal feature detectors such as the autocorrelation detector can be used to perform the hypothesis test to further minimize (than energy detector) the probability of miss-detection and probability of false alarm of the VRU 116 signal.

To this end, in some embodiments, the power of the received signal (e.g., RSSI or some other signal strength measurement) for non-coherent detectors (e.g., energy detector) or the amplitude of the autocorrelation peak (AP) for feature detectors (e.g., autocorrelation detector) can be readily used to estimate the radial distance of the VRU 116 from the V-ITS-S 110. The larger the RSSI or AP, the higher is the probability that the VRU 116 is in close vicinity of the V-ITS-S 110. As the measured RSSI or AP keeps on increasing, the V-ITS-S's 110 uncertainty in correctly detecting the VRU's presence keeps on decreasing. The RSSI or AP values at the receiving V-ITS-S 110 are directly determined by the coverage radial distance R of the broadcast message. The relationship is depicted by FIG. 9.

Figure 10:
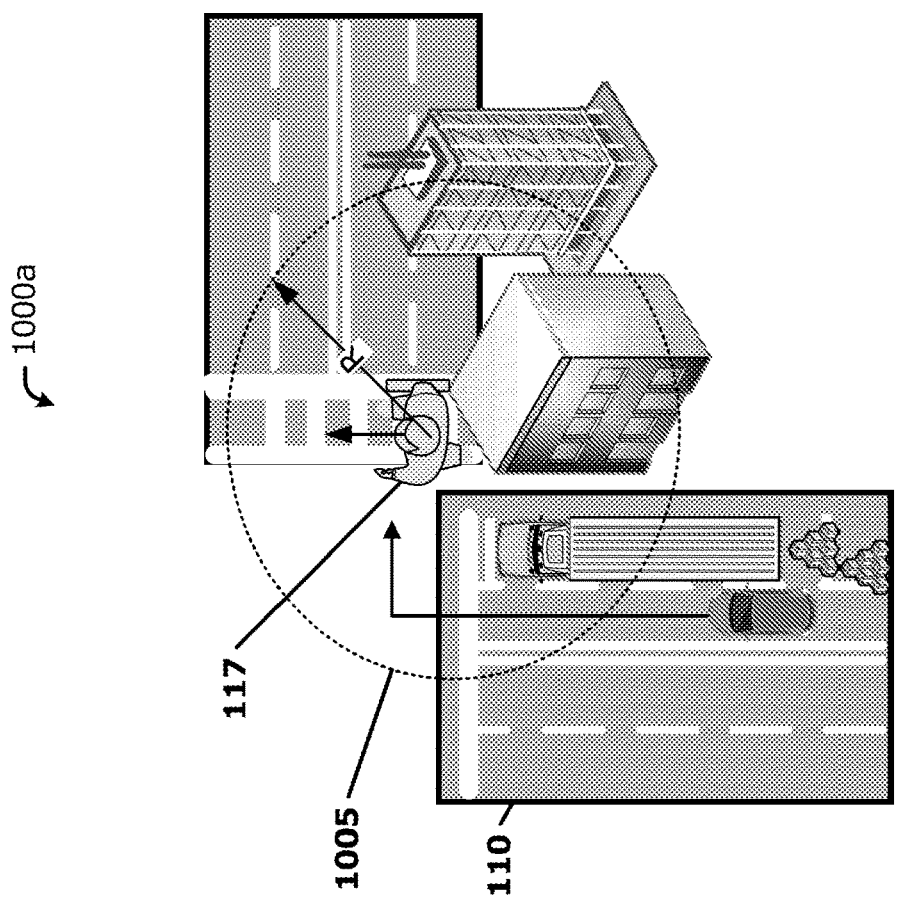
FIG. 10 illustrates an example of VRU detection mechanism according to various embodiments.
Figure 10:
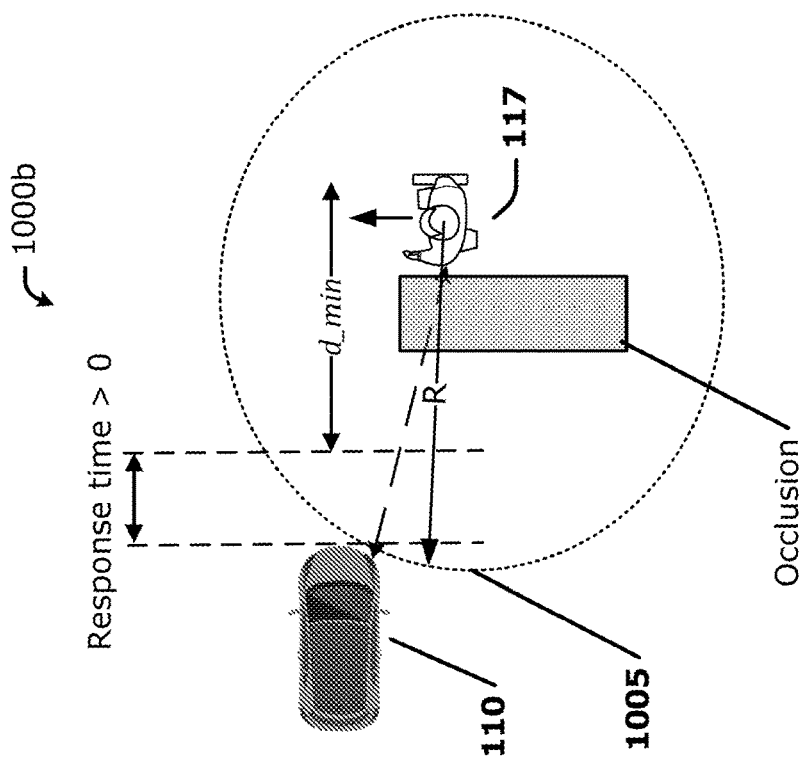

FIG. 10 shows examples of the VRU detection mechanism according to various embodiments. In FIG. 10, scenario 1000a corresponds to the scenario depicted by FIG. 3 and scenario 1000b corresponds to the scenario depicted by FIG. 5, where VRU beacon(s) broadcasted by the VRU ITS-S 117 can be overhead or otherwise received by a V-ITS-S 110 and/or a proximate or nearby R-ITS-S 130. In the scenarios 1000a and 1000b, the VRU ITS-S 117 has a VRU beacon broadcast region or coverage area 1005. This broadcast mechanism translates to having an increased response time at the V-ITS-S 110 in cases where a direct FoV is occluded (e.g., 1000b in FIG. 10). Alternatively, in case of out-of-range V-ITS-S 110, the message exchange occurs in relayed fashion where the nearby R-ITS-S 130 may act as relay (not shown in FIG. 10). Such beacon-based VRU detection mechanism eventually maps to increase in the response time, and consequently the braking distance, for the V-ITS-S 110 as the V-ITS-S 110 could listen to the beacon and, for example, trigger deceleration earlier than using other conventional techniques. Such early RSS check would help assure that the longitudinal and lateral distances between V-ITS-S 110 and VRU 116 are safe enough to ensure VRU 116 protection.

1.5.1.2. Active Mechanism Embodiment 2: VRU Equipped with Only RX Capability

In this embodiment, the VRU 116 is assumed to be equipped with a unidirectional COMM where it can only receive messages from either V-ITS-Ss 110, RSUs, or nearby VRUs 116, and the VRU 116 does not directly participate in aiding the V-ITS-S 110 or nearby R-ITS-S 130 to detect its presence. In this embodiment, RSU(s) in the vicinity of the VRU 116 may assist the V-ITS-S 110 by, for example, detecting the VRUs 116 via RADAR, LiDAR, motion detection, and/or computer vision (e.g., live HD-camera and the like), and reporting/notifying the detection decision to V-ITS-Ss 110 approaching and/or entering the coverage area of the RSU. Furthermore, for out-of-coverage V-ITS-Ss 110 (in terms of the RSU's transmission/broadcast range), the R-ITS-S 130 can still collaborate with neighboring R-ITS-Ss 130 to extend its notification coverage range via multi-hop wireless or non-wireless communication links. Similar to equation (1), the binary hypothesis testing problem for this case can be formulated at the R-ITS-S 130 based on feature detection (e.g., based on RADAR, LiDAR, and/or motion or vision-processing) as shown by equation 2.

Null hypothesis at RSU, $H_{0,rsu}$:VRU features absent
Alternative hypothesis at V-ITS-S, $H_{1,rsu}$:VRU features present     (2)

In embodiments, the R-ITS-S 130 can relay (single-hop or multi-hop) the detection decision via wireless (or non-wireless) COMM based collaboration between RSUs.

1.5.1.3. Active Mechanism Embodiment 3: VRU Equipped With Both TX and RX Capability This embodiment serves as a two-way detection capable mechanism where the V-ITS-S 110 can detect the presence/absence of the VRU, and the VRU 116 can detect the presence/absence of the approaching V-ITS-S 110.

One assumption here is that the VRU 116 is equipped with either non-low-power radio equipment (e.g., high-end, high-complexity device such as a smartphone or tablet computer) or low-power wake-up radio equipment (low-end, low-complexity device) that has TX/RX capability. This means that the VRU 116 should be able to operate in a handshaking message exchange. In the first round of the handshake, the VRU 116 can aid the approaching V-ITS-S 110 in early detection of its presence by transmitting a beacon $VRU_{beacon}$.

Based on detection of $VRU_{beacon}$, the V-ITS-S 110 can transmit/broadcast a response beacon message/signal ($VDU_{beacon}$) as part of the second part of the handshake. The response beacon message/signal ($VDU_{beacon}$) can be used to inform the ego VRU 116 and/or other R-ITS-S 130, other V-ITS-Ss 110, and/or other VRUs 116 about the VRU 116 presence. When the VRU 116 detects $VDU_{beacon}$, the VRU 116 may continue periodically transmitting broadcast messages (e.g., $VRU_{beacon}$) to indicate that it is still present in the potential path of the approaching V-ITS-S 110 as well as help the V-ITS-S 110 to localize and track the VRU 116 in the subsequent phases. Details on the usage of such handshaking in building and updating the VRU 116 localization/tracking is further explained infra.

The binary hypothesis testing problem for this case can be formulated at both the V-ITS-S 110 and RSU, separately as in equation (1) and equation (2). Non-coherent detection algorithm like energy detector or signal feature detection algorithm like the autocorrelation detector (assuming some a-priori knowledge of the beacon signal, which is possible in case of known underlying radio access technology used for the beacon) can be used at both the VRU 116 and V-ITS-S 110 to deduce the presence or absence of the V-ITS-S 110 signal.

1.5.2. Passive Mechanism Embodiments

The passive mechanism for VRU protection covers the cases where the VRU 116 is incapable of any communication or message exchange with the V-ITS-S 110 directly or indirectly with an R-ITS-S 130 (these scenarios could be considered to be a "worst case scenario"). The passive mechanism embodiment cover scenarios including, for example, children, elderly, disabled individuals, or even adults with no suitable radio equipment are the in-danger VRUs due to their occlusion from the detection range of the onboard V-ITS-S 110 sensors such as motion/vision-based, LiDAR, RADAR, etc.

To ensure VRU 116 safety in such situations, the passive mechanism leverages the communications links between the V-ITS-S 110 and any nearby R-ITS-Ss 130. In these embodiments, the R-ITS-Ss 130 aid the direct task of detection of VRUs in or approaching the V-ITS-S 110 trajectory, and then forward a VRU 116 presence/absence decision to the approaching V-ITS-S 110. These embodiments are somewhat similar to the active mechanism embodiment 3 where the R-ITS-S 130 in the vicinity of the threatened VRU 116 utilizes its on-board sensors to identify the presence/absence of VRUs 116 and then reports its decisions to the approaching ego V-ITS-S 110, as well as nearby RSUs, other V-ITS-S 110 s, and/or other VRUs to trigger early RSS rules check for the VRU 116 (see e.g., FIG. 7).

1.5.3. VRU Localization and Trajectory Prediction Behavioral Model

As alluded to previously, the communications module 814 of the VRU 116 and/or V-ITS-S 110 serves as an enabler for early detection, thus laying the foundation for eventually leading to early RSS check at the ego V-ITS-S 110. In addition to helping in real-time (or near real-time) detection of the ego VRU 116, the communications module 814 is subsequently responsible for providing additional input parameters or features for accurate trajectory/behavior prediction of the ego VRU 116. When the VRU's 116 presence is identified, mechanisms are used to localize, and track the ego VRU's 116 trajectory, which are discussed infra.

Figure 12:
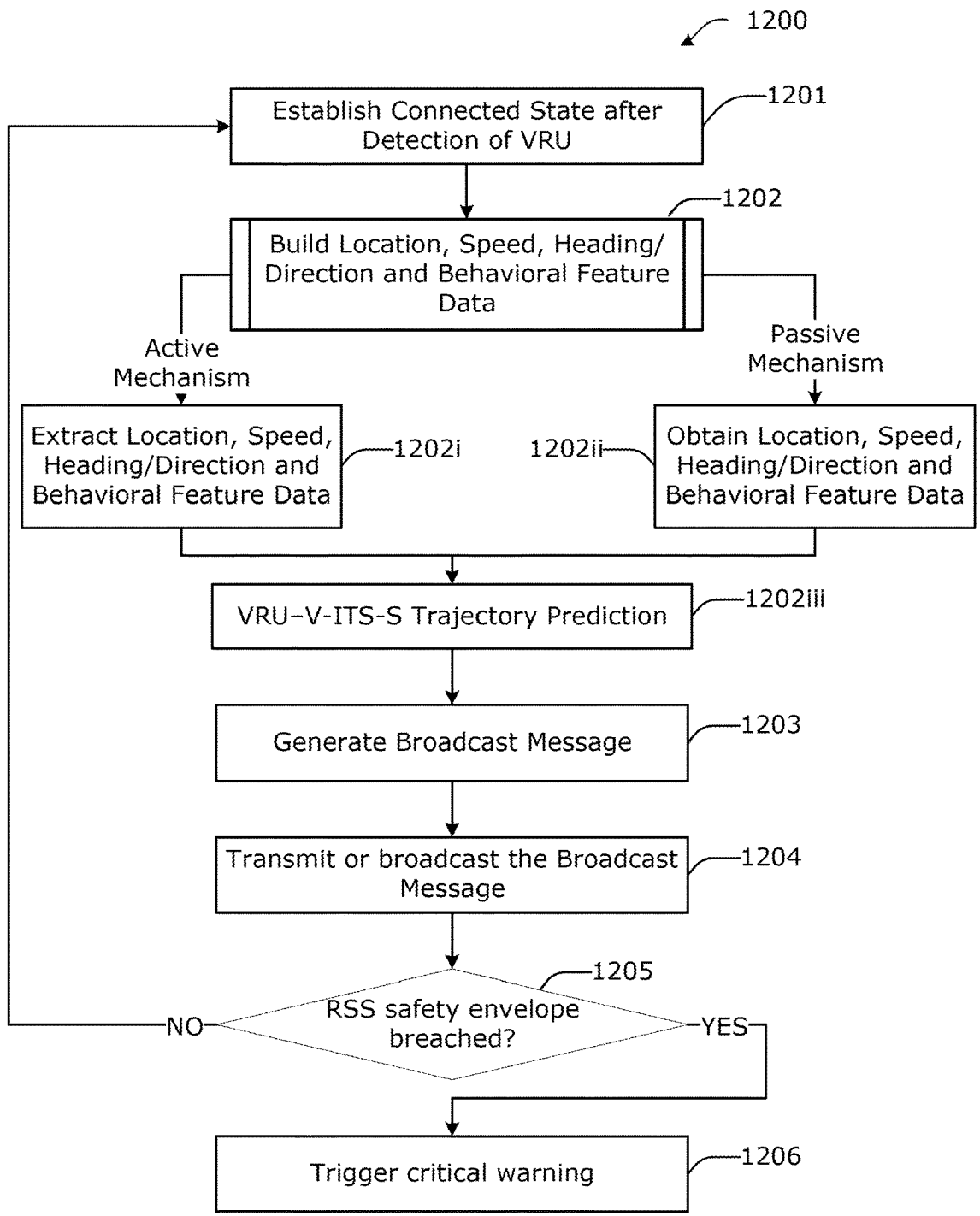
FIG. 12 illustrates an example process for practicing some embodiments discussed herein.

FIG. 12 shows an example process 1200 for localization and tracking VRUs 116 according to various embodiments. The steps of the following process 1200 apply to both active and passive mechanisms. For the active mechanism, the ego VRU 116 participates in the localization/trajectory prediction. For the passive mechanism, the ego VRU 116 does not participates in the localization/trajectory prediction procedure; rather, R-ITS-Ss 130 and/or other V2X capable nodes (not excluding other V-ITS-Ss 110 or VRUs 116) in the vicinity of the endangered VRU 116 participate in the procedure.

Process 1200 begins at step 1201 where establishment of connected state takes place after detection of the VRU 116. After the VRU 116 is detected by the ego V-ITS-S 110 either via direct communications link with the ego VRU 116 or via communications link between the ego V-ITS-S 110 and nearby R-ITS-Ss 130 with direct FoV of the VRU, (or other V-ITS-S 110 s or even VRUs with similar FoV as that of the RSU), the ego V-ITS-S 110 is assumed to get "Connected" to the VRU 116 in case of active mechanism or "Connected" to the nearby R-ITS-S 130 in case of passive mechanism. At such a connected state, the V-ITS-S 110 and the VRU 116 (active mechanism) or R-ITS-S 130 (passive mechanism) are ready for communication message exchange (e.g., messages exchanges 819 and 829).

At step 1202, Location, Speed, Heading/Direction, and Behavioral Feature Data Building takes place. For Active Mechanism embodiments, the VRU 116 is assumed to be equipped with the VRU 116 Device Module as depicted in FIG. 8. In these embodiments, the VRU system 117 utilizes its on-board positioning circuitry 821, dead reckoning module 822 (including input from various sensors such as a magnetometer, gyroscope, and accelerometer) and movement (motion) detection module 823 to extract the feature data itself. Thus, at step 1202*i*, the VRU 116 is able to extract its (a) current location (in x, y, z coordinates), (b) speed, (c) heading/direction (angle measured from the North-South axis) and (d) behavioral feature data. The behavioral feature data comprises the following:

- VRU profile: Class of VRU—whether it is pedestrian, bicycle, electric moped, Segway, etc. Such profiling aids in initial behavioral model building and time-evolved prediction/estimation of the VRU 116 trajectory.
- VRU ID: Unique VRU ID—Since each VRU 116 could possess a unique trait or behavior, any VRU 116 is assumed to have a unique identifier associated with itself
- Time-series feature/profile data: This includes timestamp (starts when the device is switched ON) and the corresponding statistical time-series evolution data regarding speed, heading/angle and its position (e.g., extracted/estimated by deploying Kalman Filter or Extended Kalman Filter; see e.g., passive mechanism embodiments discussed infra). This data is extracted from the dead reckoning module 822 (see e.g., passive mechanism embodiments discussed infra).

Except the VRU ID, the other behavioral feature data can get updated over time and thus serve as the key parameter input to trajectory prediction of the VRU 116.

For passive mechanism embodiments, the VRU 116 does not have any sophisticated on-board device(s) or any communication capabilities. In these embodiments, the V-ITS-S 110 is aided in the tracking process by one or more nearby R-ITS-Ss 130 and/or other V-ITS-Ss 110 at step 1202ii. As discussed with respect to FIGS. 8 and 24, the R-ITS-S 130 may include sensor circuitry such as live HD-camera, RADAR, LiDAR, and GNSS/INS module as well as GEO-MAP of the area (e.g., Road-book) where the VRU 116 is located. After the R-ITS-S 130 has already detected the VRU 116, the next step is to precisely localize it. For localization, the R-ITS-S 130 may collaboratively triangulate the endangered VRU 116 with other nearby R-ITS-Ss 130, V-ITS-Ss 110 or even other VRUs 116 which may be within its coverage area (e.g., communication/V2X service area, cellular coverage area, etc.) to precisely position/locate the VRU 116. Once the VRU 116 location is identified via the fusion of the various sensor data, the R-ITS-S 130 utilizes its sensor data in a same or similar manner as discussed previously with respect to the active mechanism embodiment to accurately estimate the trajectory of the VRU 116 including location, speed, heading/direction and as well starts building the behavioral model of the VRU 116—including VRU profile, VRU ID and time-series feature data.

Regarding the trajectory tracking and update, irrespective of the active or passive mechanisms, the mechanism at the ego VRU 116 to predict its trajectory can be summarized in the following steps. The steps are explained in close reference to the modular architecture presented in FIG. 8, which illustrates the modules and parameters involved in VRU 116 trajectory prediction either at ego VRU 116 and/or nearby RSUs.

The positioning circuitry 821 (e.g., GPS/DGPS receiver) of the ego VRU 116 device extracts its position coordinates and feeds the coordinates to the dead reckoning module 822. The dead reckoning module 822 obtains sensor data input from the positioning circuitry 821, one or more sensors (e.g., magnetometer (compass) and gyroscope (axial orientation and angular velocity)), and movement detection module 823 to estimate and correct the pedestrian position as well as (precisely) estimate the location, speed, heading/angular-direction and behavioral features of the VRU 116. The movement detection module 823 obtains sensor data input from one or more sensors (e.g., the gyroscope and accelerometer) and yields precise motion/activity tracking (e.g., biking, running) of the VRU 116 thus aiding the dead reckoning module 822 in the heading intention or orientation of the VRU 116. In terms of fusion of data, techniques such as Kalman Filtering, Extended Kalman Filtering, and/or any other sensor fusion technique (such as those discussed herein) may be used to combine the time series (sensor) data from the various sensors. Finally, the outcome of the module are Location, Speed, Heading/Angular direction and Behavioral features elaborated in step 1202i.

At step 1202(iii), VRU—V-ITS-S Trajectory Prediction is performed. For detection of possible interception of the V-ITS-S's 110 trajectory with that of the VRU, both of their position and trajectory have to be predicted at each time step. For active mechanism, the ego V-ITS-S 110 can get the input for ego VRU 116 trajectory directly from the ego VRU 116 and/or nearby collaborating R-ITS-Ss 130 whereas for passive mechanism, the V-ITS-S 110 would get the same from nearby R-ITS-Ss 130 (or other V-ITS-Ss 110 or other VRUs). Then, the task at the V-ITS-S 110 (in active mechanism) and R-ITS-S 130 (in active or passive mechanism) is to predict the real-time, highly precise position, heading, direction and behavior of the VRU. The prediction equation can be expressed, for example, in terms of the VRU 116 speed, geographical walking/cycling direction for prediction of the VRU 116 state from time step i to i+1. The time step directly depends upon the periodicity of the broadcast message T where, for instance, 1 ms≤T≤100 ms. However, with the assumption that the velocity of the VRU 116 does not change within the prediction period (between 1 time step to another), it is safe to assume a constant acceleration model for the VRU 116 position state and constant velocity model for the VRU 116 heading/direction. Then, the VRU 116 position and heading/direction evolution (with time) can be expressed in 2D (x, y) coordinates (for simplicity, the z coordinates are ignored) as shown by equation 3.

$$y(i+1) = y(i) + v_y \cdot dt + \frac{a_y}{2} \cdot dt^2 \quad (3)$$

$$x(i+1) = x(i) + v_x \cdot dt + \frac{a_x}{2} \cdot dt^2$$

$$v_y(i+1) = v_y(i) + a_y \cdot dt + 0 \cdot dt^2 = v_y(i) + a_y \cdot dt$$

$$v_x(i+1) = v_x(i) + a_x \cdot dt + 0 \cdot dt^2 = v_x(i) + a_x \cdot dt$$

$$\phi(i+1) = \phi(i) + 0 \cdot dt = \phi(i)$$

In equation 3, (x, y) are east/north coordinates, dt is time-step interval, $v_x$ and $v_y$ are velocities in the east/north directions, $a_x$ and $a_y$ are corresponding accelerations, and $\phi$ is the geographical heading direction (angle with respect to the reference axis, say north-south) of the VRU.

At step 1203, the broadcast message format is constructed (generated). The broadcast message format is generated and transmitted or broadcasted for reporting the ego VRU 116 Trajectory. This communication takes place between V-ITS-S 110, VRU 116, and R-ITS-S 130 for the active mechanism, and takes place between the V-ITS-S 110 and R-ITS-S 130 for the passive mechanism. For the active mechanism, in some embodiments, the ego VRU 116 broadcasts the early RSS rules awareness message to the ego V-ITS-S 110 directly as well as to the nearby R-ITS-Ss 130 or V-ITS-Ss 110 or other VRUs. An example message format 1101 for the VRU 116 broadcast packet for the Active Mechanism is depicted by FIG. 11. For the passive mechanism, the R-ITS-S 130 broadcasts the early RSS rules awareness message to the ego V-ITS-S 110 directly as well as to the nearby V-ITS-Ss 110, R-ITS-Ss 130 or other V-ITS-Ss 110. An example message format 1102 for the R-ITS-S 130 broadcast packet for the Passive Mechanism is depicted by FIG. 11. This packet format is also valid for V-ITS-S—VRU—R-ITS-S collaboration in the Active Mechanism embodiments. Current specifications and/or standards (e.g., ETSI standards) may define various containers as comprising a sequence of optional or mandatory data elements (DEs) and/or data frames (DFs). However, it should be understood that the requirements of any particular standard should not limit the embodiments discussed herein (such as those of FIG. 11), and as such, any combination of containers, DFs, DEs, values, actions, and/or features are possible in various embodiments, including any combination of containers, DFs, DEs, values, actions, and/or features that are strictly required to be followed in order to conform to such standards or any combination of containers, DFs, DEs, values, actions, and/or features strongly recommended and/or used with or in the presence/absence of optional elements.

At step 1204, the Broadcast Message is transmitted or broadcasted by the ego VRU 116, nearby R-ITS-Ss 130, nearby V-ITS-Ss 110, and/or nearby VRUs 116, and reception at the ego V-ITS-S 110. Here, "broadcast" refers to a transmission method used to send facilities layer messages to all endpoints within a specified communication range. As defined in CEN ISO/TS 17423, broadcast is one of the possible destination types that can be specified by an application without any reference to the type of access technology (or RAT). Following successful reception of the message, the receiver post-processing at the V-ITS-S 110 leads to extraction of the all the packet fields including VRU ID, profile type, location, speed, heading and time-feature data. The VRU ID, profile type and time-feature data thus provide the initial behavioral model of the VRU 116 helping to construct the behavioral VRU 116 trajectory. For the active mechanism, the ego V-ITS-S 110, based on the received data, estimates the VRU-V-ITS-S trajectory interception statistically. Whereas, for passive mechanism, this information comes directly in the broadcast packet from the R-ITS-S 130 by providing an estimated V-ITS-S 110 and/or VRU 116 Trajectory Interception Indicator. The higher the V-ITS-S 110 and/or VRU 116 Trajectory Interception Indicator value, the more likely V-ITS-S 110 is to trigger early RSS checks.

In some embodiments, after or during step 124, multiple instances of Step 1202 followed by Step 1203 could run (e.g., with time-granularity determined by the periodicity interval T) in terms of packet transmission and reception to aid in accurately building, predicting and updating the estimated VRU 116 trajectory (trajectory tracking) and as well as behavioral model.

At step 1205, the ego V-ITS-S 110 determines whether the RSS safety envelope's assumptions are breached or likely to be breached for its planned trajectory. If there's no breach, then it will go back to step 1201. If there's a breach, the method advances to step 1206.

Figure 13:
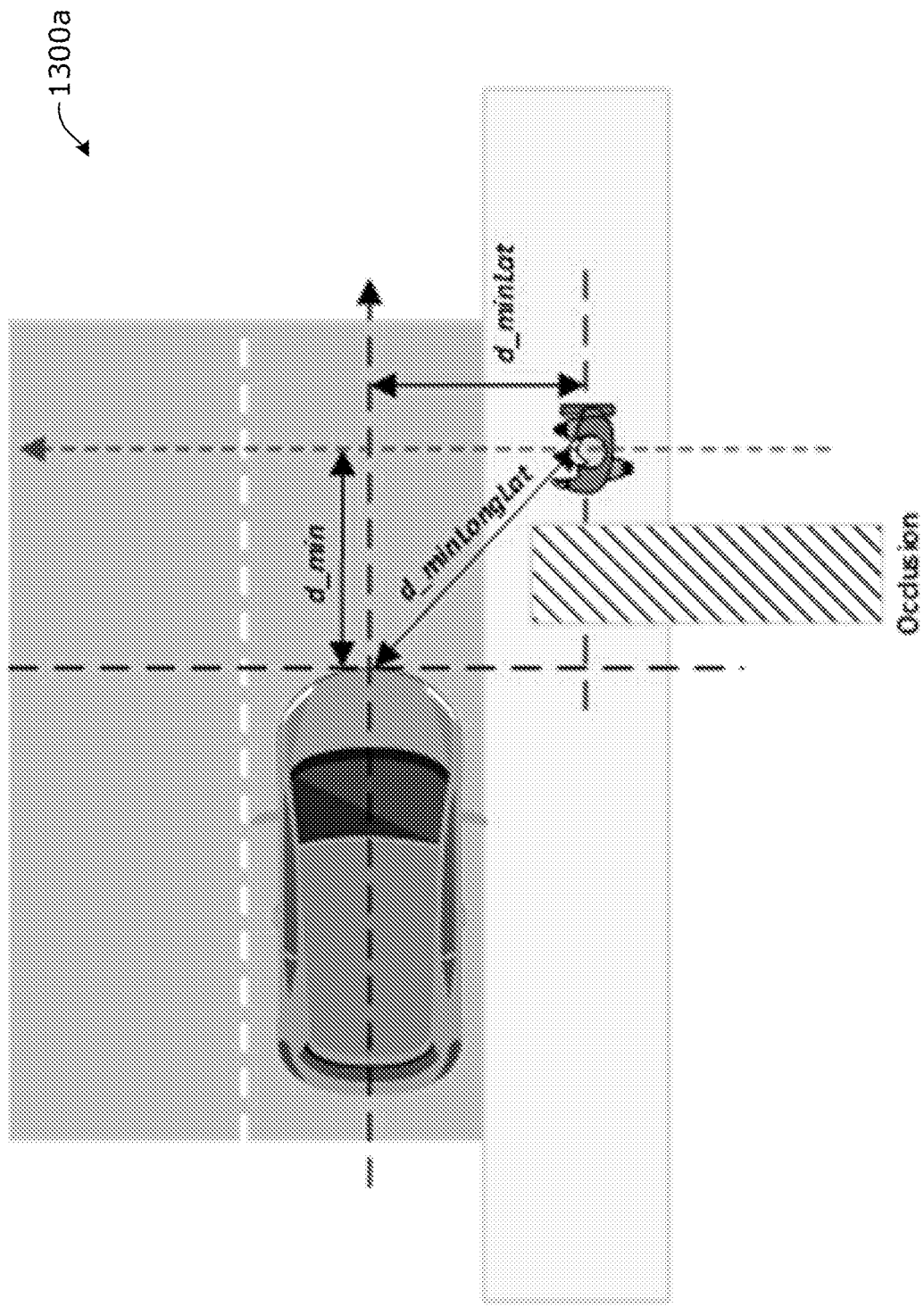
FIG. 13 illustrates a minimum safe distance example according to various embodiments.

At step 1206, the V-ITS-S 110 triggers a critical warning depending upon the severity of the likelihood of the breach of RSS rules assumption at step 1205. In some embodiments, the V-ITS-S 110 triggers its communications module 824 to send critical warning alert to in-range (e.g., within a broadcast region of the V-ITS-S's 110 communications module 824) R-ITS-S 130, to nearby V-ITS-Ss 110 or other VRUs 116 (e.g., in case of passive mechanism) and to the ego VRU 116 (e.g., in case of active mechanism). The warning alert could indicate one or more of the following alert severity classes depending upon the estimated trajectory interception and the distance between the V-ITS-S 110 and the VRU 116 defined as $d_{VITSS-VRU}$. We define $d_{minLongLat}$ as the minimum safe distance including MSLoD and MSLaD considerations as shown by FIG. 13, but also includes MSVD in other embodiments.

a. High Danger Alert (too close): Triggered when VRU is at an unsafe lateral, longitudinal and vertical distances from the approaching V-ITS-S 110 which translates to {LaD, LoD, VD} being equal to or less than the {MSLaD, MSLoD, MSVD}, respectively, wherein:

LaD<MSLaD and LoD<MSLoD and VD<MSVD.

b. Moderate Danger Alert: Triggered when the VRU is at an LaD from the V-ITS-S 110 of more than the MSLaD, at an LoD from the V-ITS-S 110 of more than the MSLoD, and at a VD of more than the MSVD wherein:

LaD>MSLaD and LoD>MSLoD and VD>MSVD.

c. Low Danger Alert: Triggered when the VRU is at a lateral, longitudinal and vertical distances (from V-ITS-S 110) that are much larger than the respective safety thresholds, wherein:

LaD>>MSLaD and LoD>>MSLoD and VD>>MSVD.

In one embodiment, the distances used for the moderate and low danger alerts may be some predetermined or configured value, which could be a constant value or adjusted based on environmental conditions, internal vehicle conditions, and/or other like conditions or parameters. Additionally or alternatively, the distances used for the moderate and low danger alerts may be based on a scaling factor or other predetermined or configured value, which is then applied to the MSLaD, MSLoD, and MSVD. For example, the distance used for the moderate danger alert may be X×MSD and the distance used for the low danger alert may be Y×MSD, where X and Y are numbers and MSD is one of the MSLaD, MSLoD, and MSVD, and where Y>X. The values of X and Y may be the same for each of the LaD, LoD, and VD, or each of the LaD, LoD, and VD may have different values for X and Y.

Following the input from the communications module 824, the Alerting Module 825 is triggered at step 1206. Several forms of warning alert mechanisms may be used to make the ego VRU 116 aware of the three levels of danger as follows.

Direct alert from ego V-ITS-S 110 to ego VRU 116: In case of active mechanism, some application(s) running on the VRU 116 device may be forced to produce pop up alerts or push notifications indicating the severity/danger class indication about the approaching danger V-ITS-S 110. Sounds and/or haptic feedback may additionally or alternatively be used. Additionally, this mechanism may include freezing various functionalities of the ego VRU 116 device such as interrupting the running video game app or music app at the VRU 116 device to seek the user's attention and display the incoming high danger alert.

Direct alert from ego VRU 116 to ego V-ITS-S 110: In case of active mechanism, some application running on the V-ITS-S 110 device may be forced to produce pop up alerts (along with the severity/danger class indication) about the interception of its trajectory with that of the endangered VRU 116 with sound and/or visuals to the passengers inside the V-ITS-S 110. More importantly, such alert message would trigger an immediate control action at the ego V-ITS-S 110 (see e.g., Step 1207).

Alert from ego V-ITS-S 110 to nearby R-ITS-Ss 130 or V-ITS-Ss 110 or other VRUs 110: In case of passive mechanism, the ego V-ITS-S 110 would send the warning alert message to the nearby R-ITS-Ss 130 or V-ITS-Ss 110 or even other VRUs ITS-Ss 117 that are in the vicinity of the ego VRU 116. This mechanism is useful to make the other users of the road aware of the oncoming ego V-ITS-S 110 posing a threat to the ego VRU. This mode of alerting for passive mechanism could also include flashing warning lights at the V-ITS-S 110 and/or the R-ITS-Ss 130 and sounding sirens or honking vigorously to make the passive VRU 116 aware of the oncoming potential danger.

At step 1207, one or more of the following control actions at the ego V-ITS-S 110 and/or ego VRU 116 may occur or be triggered. Possible physical reflex control action options at the ego V-ITS-S 110 may include one or more of the following control actions:

Safely changing lane after seeking and finding an alternative lane;

Safe Maneuvering to increase the lateral and longitudinal safe distance between ego V-ITS-S 110 and ego VRU;

Early deceleration and Braking to stop: depending upon the lateral/longitudinal safe distance between the ego V-ITS-S 110 and ego VRU, the ego V-ITS-S 110 may have to come to an abrupt stop with continuous (hard) deceleration; and/or Any other control action(s).

Possible physical reflex control action options at the ego VRU 116 may include one or more of the following control actions:

Stopping and waiting for the approaching V-ITS-S 110 to pass;

Stopping and/or reverting back on its trajectory if it is safe to do so;

Informing the ego V-ITS-S 110 about its presence (in active mechanism, when connected to the V-ITS-S 110) during the one or more communication message handshaking exchange—assuming there exists an application for two-way (bi-directional) communications via the application on the ego VRU 116 device (interfaced with that on the ego V-ITS-S 110);

Sudden abrupt actions in case the V-ITS-S 110 is too near—jumping away or running away; and/or Any other control action(s).

Following the above steps, the ego V-ITS-S 110/ego VRU 116 and nearby R-ITS-Ss 110, V-ITS-Ss 110, VRUs 116 devices (or VRU ITS-Ss 117) go back to the state at the beginning of Step 1201.

1.5.4. Example Implementations of the Early RSS Rules Check Related Messages to Coordinate Actions for VRU ITS-S and/or V-ITS-S This example Includes notifying VRU 116 and/or the V-ITS-S 110 so that one or the other can continue their intended action or change the course of action depending upon the right of way as well as criticality of situation. Table 1 shows an example message format definition and exchange process for cases where the VRU 116 has both Tx and Rx capabilities. The embodiments herein are related to the case of direct COMM message exchange between VRU 116 and V-ITS-S 110. However, since there could also be an R-ITS-S 130 in the vicinity of the VRU 116 to collaboratively help V-ITS-S 110 with the early RSS rules check, similar message exchange implementation can be readily extended to account for the 3-way message exchange between V-ITS-S 110, VRU 116 and R-ITS-S 130. Next, the example message exchange mechanism follows the message formats in SAE International, "Dedicated Short Range Communications (DSRC) Message Set Dictionary", J2735 201603 (Mar. 30, 2016) (hereinafter "[SAE J2735]").

Table 1

```
-- Facilities layer message formats
MessageTypes MESSAGE-ID-AND-TYPE ::= {
{ BasicSafetyMessage IDENTIFIED BY basicSafetyMessage } |
{ MapData IDENTIFIED BY mapData } |
{ SPAT IDENTIFIED BY signalPhaseAndTimingMessage } |
{ CommonSafetyRequest IDENTIFIED BY commonSafetyRequest } |
{ EmergencyVehicleAlert IDENTIFIED BY emergencyVehicleAlert } |
{ IntersectionCollision IDENTIFIED BY intersectionCollision } |
{ NMEAcorrections IDENTIFIED BY nmeaCorrections } |
{ ProbeDataManagement IDENTIFIED BY probeDataManagement } |
{ ProbeVehicleData IDENTIFIED BY probeVehicleData } |
{ RoadSideAlert IDENTIFIED BY roadSideAlert } |
{ RTCMcorrections IDENTIFIED BY rtcmCorrections } |
{ SignalRequestMessage IDENTIFIED BY signalRequestMessage } |
{ SignalStatusMessage IDENTIFIED BY signalStatusMessage } |
{ TravelerInformation IDENTIFIED BY travelerInformation } |
{ PersonalSafetyMessage IDENTIFIED BY personalSafetyMessage } |
{ RSSvruDetectLocalizeTrackMessage IDENTIFIED BY rssvrudetectlocalizetrackmessage
    } |
{ RSSvruDetectLocalizeTrackMessageRSU IDENTIFIED BY
rssvrudetectlocalizerackmessagersu   } |
{ RSSavAlertForActionMessage IDENTIFIED BY rssavalertforactionmessage    } |
{ RSSvruAlertForActionMessage IDENTIFIED BY rssvrualertforactionmessage } |
{ TestMessage02 IDENTIFIED BY testMessage02 } |
{ TestMessage03 IDENTIFIED BY testMessage03 } |
{ TestMessage04 IDENTIFIED BY testMessage04 } |
{ TestMessage05 IDENTIFIED BY testMessage05 } |
{ TestMessage06 IDENTIFIED BY testMessage06 } |
{ TestMessage07 IDENTIFIED BY testMessage07 } |
{ TestMessage08 IDENTIFIED BY testMessage08 } |
{ TestMessage09 IDENTIFIED BY testMessage09 } |
{ TestMessage10 IDENTIFIED BY testMessage10 } |
{ TestMessage11 IDENTIFIED BY testMessage11 } |
{ TestMessage12 IDENTIFIED BY testMessage12 } |
```

```
{ TestMessage13 IDENTIFIED BY testMessage13 } |
{ TestMessage14 IDENTIFIED BY testMessage14 } |
{ TestMessage15 IDENTIFIED BY testMessage15 },
...
}
RSSvruDetectLocalizeTrackMessage ::= SEQUENCE {
  vruid             VRUtemporaryID,
  vruprofiletype             VRUprofileType,
  vruloc             VRUlocation,
  vruspeed             VRUspeed,
  vruheading             VRUheading,
  vruMsgCnt             VRUmsgCount,
  vruMsgeStamp             vruDSecond, -- (0-65535) units of milliseconds
  rssMAXaccelSet AccelerationSet4Way OPTIONAL, -- RSS maximum acceleration
  rssMAXdecelSet AccelerationSet4Way OPTIONAL, -- RSS maximum deceleration
  responseTime Responsetime100ms OPTIONAL,
  ...
}
Responsetime100ms ::= INTEGER(0..100)
  -- Maximum possible response time is 100*100ms = 10 seconds
RSSvruDetectLocalizeTrackMessageRSU ::= SEQUENCE {
  endangeredvruid             endangeredVRUassignedTemporaryID,
  estimatedruprofiletype             estimatedVRUprofileType,
  estimatedvruloc             estimatedVRUlocation,
  estimatedvruspeed             VRUspeed,
  estimatedvruheading             VRUheading,
  rsummsgCnt             RSUmsgCount,
  avvrutrajectoryinterceptionindicator             avVRUtrajectoryInterceptionIndicator,
  rsumsgStamp             rsuDSecond, -- (0-65535) units of
milliseconds
}
RSSavAlertForActionMessage ::= SEQUENCE { -- message from nearby RSU and/or VRU
itself to ego AV
  vruid             VRUtemporaryID,
  avalertmsgCnt             AValertMsgCount,
  avalerttimestamp             AValertDSecond, -- (0-65535) units of milliseconds
  rssalerttype             AVvruAlertType,
  ...
}
AVvruAlertType ::= ENUMERATED {
  highdanger             (0),             -- severe danger to VRU (d_av-vru <= d_min)
  mediumdanger             (1),             -- moderate danger to VRU (d_av-vru > d_min)
  lowdanger             (2),             -- low danger to VRU (d_av-vru >> d_min)
}
RSSvruAlertForActionMessage ::= SEQUENCE { -- message from nearby RSU and/or ego AV
to ego VRU
  vruid VRUtemporaryID,
  vrualertmsgCnt             vrualertMsgCount,
  vrualerttimestamp             VRUalertDSecond, -- (0-65535) units of milliseconds
  rssalerttype VRUavAlertType,
  ...
}
VRUavAlertType ::= ENUMERATED {
  highdanger             (0), -- real danger from approaching AV (d_av-vru <= d_min)
  mediumdanger             (1), -- moderate danger from approaching AV (d_av-vru > d_min)
  lowdanger             (2), -- low danger from appraoching AV (d_av-vru >> d_min)
}
TimeToIntersect ::= INTEGER (0..30000)
--time to reach the intersecting points of paths in ms
StartLaneChange ::= INTEGER (0..65535)
--Starting the lane change in ms
LaneChangeAllowd ::= BOOLEAN
-- true : lane change allowed and safe
-- false: lane change is not allowed and unsafe
```

1.6. Additional Aspects Relevant to the Example Embodiments

1.6.1. Early RSS Rules Check for VRU Safety Embodiments

In the active mechanism embodiments, the VRU participates or collaborates with the V-ITS-S 110 directly or indirectly. The active mechanism applies with small variation in passive mechanism where the role of ego VRU is replaced by nearby R-ITS-S 130 which has the ego VRU within its FoV.

The embodiments provide high reliability/precision based DLT of such VRUs followed by wireless message exchange to protect the VRU. Particularly, due to the inherent multipath and scattering propagation of the radio waves through streets and urban canyons, radio communication can reach the V-ITS-S 110 far ahead of the potential crash with VRU especially in cases when the VRU is occluded from the V-ITS-S 110. Thus, this communication mechanism would expand the Field of Vision (FoV) of the V-ITS-S 110 by utilizing on the visual feature model/parameters exchange between V-ITS-Ss 110 and the RSUs. Followed by this, for VRUs present within $d_{min}$ distance from the V-ITS-S 110 and an estimated trajectory that intersects with the one from the V-ITS-S 110, embodiments herein use of two-way communications to notify the VRU as well as increase the reliability of triggering RSS rules check at the V-ITS-S 110 of the potentially dangerous situation for the VRU. In case of occluded VRU, the V-ITS-S's 110 onboard HD cameras, sensors, LIDARs, etc. will not work and thus R-ITS-Ss 130 would use broadcast transmissions from VRU to DLT the VRU continuously. The message contains the VRU's feature data containing: location, heading and intention based on the sensors and gyroscopes at the VRU.

The embodiments provide communication mechanisms/protocols to determine whether VRU's trajectory would potentially intersect with the V-ITS-S's 110 predicted trajectory. The protocol should be able to (i) detect the VRU and alert or wake it up if present (ii) establish a direct or non-direct communications (V-ITS-S 110 to VRU 116 or V-ITS-S 110 to V-ITS-S 130 to VRU 116) (iii) exchange messages to build and update behavioral model for VRUs location, heading and intention (iv) estimate with very high reliability/accuracy whether the V-ITS-S's 110 trajectory would intersect with the VRU's trajectory (v) enable RSS rules check (feeding in this information to trigger early RSS rules check and related control commands) to maneuver the vehicle or stop it.

The embodiments exploit radio message exchange to detect position once to wake up the VRU receiver. Following a wake up protocol, based on the processing of the received feature data, accurate behavioral model that can describe VRUs future trajectory can be built. Following this process, frequent RSS checks on planned trajectories will help better protect the VRUs.

The embodiments provide redundant notification to VRU for enhanced reliability of message exchange as well as to ensure that the safety critical warning/notification reaches VRU in time: (i) Directly: V-ITS-S 110 to VRU 116 (ii) Relayed by RSU: V-ITS-S 110 to R-ITS-S 130 to VRU 116 (iii) Relayed by another V-ITS-S 110: V-ITS-S 110-2 to V-ITS-S 110-1 to VRU 116 (see FIG. 7).

For the case of notification of VRU 116 with non-communication capability, this case can still leverage the embodiments herein except that the VRU would not exchange any messages with the V-ITS-S 110 or the MEC/RSU. The above discussed embodiments except the ones involving message exchange with VRU are applicable for DLT of the potentially threatened VRU. On the other hand, for notifying the threatened VRU, one or more of the following options for non-communications based alert mechanisms can be used as follows: continuous emergency honking or siren at the V-ITS-S 110; continuous emergency siren and/or red light flashing at the RSUs; and continuous emergency honking or siren at the nearby V-ITS-Ss 110.

The various embodiments herein can be extended to handle scenarios involving multiple VRUs, multiple V-ITS-Ss 110, and/or multiple RSUs.

1.6.2. Additional Aspects of the Active and Passive Mechanisms

The embodiments include two types of VRU detection mechanisms: Active (leveraging on communications capability at VRU device) and Passive (no communications capability at VRU device). Two variations on the active type of mechanism may be as follows.

The VRU device is online and active: these embodiments allow the R-ITS-S 130 to accurately track and identify dangerous situations and then notify the VRUs using, for instance, SMS message, a unicast warning message, or some other suitable and/or to-be-defined protocol/message scheme.

The VRU device is at sleep mode (low-power mode): These embodiments utilize a low-power wakeup radio at the VRU devices. The wakeup radio is always ON and wakes up the main VRU radio only if a wake-up or warning message is received (say, from the R-ITS-S 130 or the V-ITS-S 110 directly). The always ON wakeup radio also helps with the positioning and ranging to aid the R-ITS-S 130 in accurate positioning and tracking of the VRU.

For the Active Mechanism, the VRU protection system includes a reliable two-way (or even one) way notification system between VRUs and V-ITS-Ss 110. The active mechanism embodiments may be extended or enhanced according to one or more of the following embodiments.

Using infrastructure equipment (e.g., RSUs, edge compute nodes, sensory arrays, etc.) available near the road for collaborative detection/tracking of VRU (e.g., precise localization of VRU) and issuance of control triggering message as well as the actions at the V-ITS-S 110 leveraging the sensors, communication module 824 (e.g., modem circuitry, etc.) and other components/elements at the V-ITS-S 110.

The issuance of warning-alert messaging protocol at the VRU to provide the critical warning/alert mechanism utilizing low-power, low-complexity sensors, tracking device(s), and/or communication unit at the VRU. Such embodiments apply to scenarios where the VRU is actively using a VRU device (e.g., smartphone, tablet, wearable, etc.) and scenarios when the VRU is not actively using or possessing, for example, the VRU device (e.g., smartphone, tablet, wearable, etc.). In some embodiments, different types of control actions may be used depending on whether or not the VRU is actively using a VRU device.

Embodiments also include an active collaborative techniques, for both active and passive mechanisms for VRU protection, as follows:

Passive collaboration mechanisms include V-ITS-S 110 to R-ITS-S 130 (or edge node 140) communications, but may not involve the VRU's 116 participation. In these embodiments, DLT of VRUs 116 based on V-ITS-S 110 to R-ITS-S 130 (or edge node 140), and issuance of commands for the V-ITS-Ss 110 based on which the V-ITS-Ss 110 would take control actions. V-ITS-Ss 110 collaborating with multiple R-ITS-Ss 130 or edge nodes 140.

Passive collaboration Mechanisms, which do not involve the VRU's 116 participation but do include V-ITS-S 110 to V-ITS-S 110 communications. In these embodiments, DLT of VRUs 116 based on V-ITS-S 110 to V-ITS-S 110 and issuance of commands for the V-ITS-Ss 110 based on which the V-ITS-Ss 110 would take control actions Multiple V-ITS-Ss 110 are collaborating with direct mode of communications or via R-ITS-S 130 (or edge node 140).

Active collaboration Mechanisms involving the VRU's 116 direct participation including V-ITS-S 110 to VRU 116 direct communications. In these embodiments, the VRU 116 broadcasts/transmits self-location message (e.g., indicating a status and/or "Hello, I'm here"), which can be listened to by the approaching V-ITS-Ss 110 the vicinity VRU's 116 (e.g., within some predefined distance based on radio conditions and capabilities and/or as discussed previously) and can be used to avoid collision. The state information of the VRU 116 such as position, heading, direction, speed could be broadcast to the approaching V-ITS-Ss 110 to maintain an up-to-date state of the VRU 116 ready for broadcasting to the V-ITS-S 110 approaching the vicinity of the VRU 116.

2. VRU Safety Enhancements Towards Vision Zero

In 1997, the Swedish Parliament introduced a "Vision Zero" policy that requires reducing fatalities and serious injuries to zero by 2020 (see e.g., Shalev-Shwartz et al., Vision Zero: on a Provable Method for Eliminating Roadway Accidents without Compromising Traffic Throughput, Mobileye, arXiv preprint arXiv:1901.05022 (9 Dec. 2018) (hereinafter "[Shalev2]")). Safety of VRUs 116 such as pedestrians, children, cyclists, etc., constitutes a major factor in achieving 'Vision Zero' policy. The present disclosure includes embodiments to enhance safety for VRUs.

As discussed in [Shalev2], most of the existing Advanced Driving Assistant Systems (ADAS) has focus on emergency solutions like Forward Collision Warning (FCW), Automatic Emergency Braking (AEB), and the like. ADAS solutions can reduce traffic accidents with injuries and fatalities. However, such traffic accidents have not been eliminated because AEB and FCW are post-event emergency systems rather than a preventive systems.

Newer solutions focus on preventative measures, such as preventive collision avoidance systems, are promising to substantially reduce fatalities and serious injuries, at a reasonable cost, while sustaining the usefulness and throughput of the road system. Preventative measures usually need close coordination among vehicles, VRUs, infrastructure, and back-end systems (e.g., core network, cloud, server farm or datacenter, or the like) over one or more communication networks.

Various embodiments include VRU safety enhancements including coordination among vehicle stations (e.g., CA/AD vehicles, Autonomous Vehicles (AVs), UVCS, and/or the like), VRUs, infrastructure, and back-end systems, and including preventative measures along with emergency measures. In various embodiments, vehicles are detected and warned or prevented from entering dangerous situations with VRUs 116 at an earliest available time in a coordinated/collective manner. In various embodiments, messages including Potential-Dangerous-Situation-VRU-Perception-Info DE(s)/IE(s) are exchanged with VRUs 116 and among various vehicles in an extended proximity around the location indicated by one or more Potential-Dangerous-Situation-VRU-Perception DE(s)/IE(s), timely providing opportunity for preventive planning and actions. In various embodiments, coordinated preventative measures are performed by vehicles and VRUs 116 within the informed extended proximity. FIG. 1 (infra) shows an example procedure for enhancing VRU safety, according to various embodiments.

Some existing solutions for enhancing VRU safety include basic procedures to exchange VRU messages such as ITS CAS and ITS CPS as discussed in ETSI TS 103 324 V0.0.13 (2019-10),] 3GPP TR 22.886 v16.2.0 (Dec. 21, 2018), and 3GPP TR 22.885 v14.0.0 (Dec. 21, 2015). However, these existing solutions on VRU safety are mostly focused on post-emergency solutions and may need additional mechanisms to provide more preventative measures to enhance VRU safety.

For example, Potential-Dangerous-Situation-VRU-Perception-Info may need to be exchanged beyond direct communication range (1-hop). In DSRC, if a 1-hop range is about 150 m, it may not be sufficient for preventative measures. Preventative measures may need coordination among bigger area requiring forwarding/relaying of Potential-Dangerous-Situation-VRU-Perception-Info over more than 1-hop (e.g., forwarding to multi-hops at facility layer—above Radio access layer to avoid radio access standard change). If all 1-hop neighbors forward Potential-Dangerous-Situation-VRU-Perception-Info received from a node to increase reception range of 'Potential-Dangerous-Situation-VRU-Perception-Info', it may create unnecessary redundant flooding—wasting radio resources at the access layer which may be unacceptable. This may eventually make the DCC algorithm running at radio access layer to delay or even drop transmission of facility layer V2X message (carrying 'Potential-Dangerous-Situation-VRU-Perception-Info' and other info). Furthermore, resource-constrained VRU devices may run in power saving mode to conserve energy at radio access layer and there may not be a coordination between higher/Facility layer and radio access layer of VRU. As a result, VRUs 116 may fail to receive VAM(s) such as message(s) carrying 'Potential-Dangerous-Situation-VRU-Perception-Info' from the infrastructure or other vUEs in timely manner. Additional mechanisms, such as a mechanism at facility layer without requiring radio access layer standard change, may be needed to ensure timely delivery of VAMs to VRUs.

According to various embodiments, vehicle stations and road infrastructure are equipped with sensors to detect VRUs 116 and other road environment objects (sometimes referred to as "perceptions"). Vehicle stations also coordinate to share their perception to achieve more robust and extended collective perception in the proximity at facility layer (above radio access layer). We proposed controlled forwarding mechanisms to forward 'Potential-Dangerous-Situation-VRU-Perception-Info' beyond direct communication range (1-hop) once such situation is detected, so that coordinated preventative measures by proximate vehicle stations in bigger areas can be taken.

The preventative measures (control actions) may encompass a variety of interventions that can be undertaken by a station (e.g., vehicle station or personal/pedestrian station) to prevent, reduce the likelihood of, or delay the occurrence of a potentially dangerous situation from taking place. Examples of VRU control actions may include notifying the VRU of the potentially dangerous situation that is about (or likely) to take place (including audio, visual and/or haptic feedback mechanisms), changing the state of the VRU to provide or execute such a notification (e.g., transitioning the device from an inactive mode to an active mode or the like), and/or otherwise controlling the VRU 116 to indicate or express the likelihood of a dangerous scenario. Examples of vehicle station control actions include controlling the vehicle station (or various subsystems of the vehicle station) to perform evasive maneuvers such as braking (e.g., stopping or deceleration), changing speed (e.g., acceleration and/or deceleration), and/or longitudinal and/or lateral movements (e.g., land changes, swerving, and the like). When applied to aerial systems, the evasive maneuvers may include 6DoF movements such as translational movements (e.g., surge (X-axis), sway (Y-axis), and heave (Z-axis)) as well as rotational movements (e.g., roll (X-axis), pitch (Y-axis), and yaw (Z-axis)). The active mechanisms may include communicating and/or executing one or more VRU control actions and one or more vehicle station control actions, and the passive mechanisms at least include communicating and/or executing one or more vehicle station control actions Preventative measures of the example embodiments coordinate maneuvers among proximate vehicle stations (such as Scoped-RSS based Preventative Measures) once vehicle stations and/or infrastructure detect a situation indicating the possibility of VRUs 116 getting in dangerous situation immediately or in the near future. In Scoped-RSS based Preventative measures, proximate vehicle stations may coordinate at the facility layer and adopt a coordinated/collective Scoped-RSS configuration where a Scoped-RSS configuration is for a specific geographic areas (Geo-Areas) and for a specified amount of time. Once V-ITS-Ss 110 are out of the scope of the Scoped-RSS, they resume their normal RSS configuration.

Geo-Area are specified by geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter a which is the distance between the center point and the short side of the rectangle (perpendicular bisector of the short side, a parameter b which is the distance between the center point and the long side of the rectangle (perpendicular bisector of the long side, and a parameter θ which is the azimuth angle of the long side of the rectangle. The elliptical Geo-Area is defined by an elliptical shape with a point A that represents the center of the rectangle and a parameter a which is the length of the long semi-axis, a parameter b which is the length of the short semi-axis, and a parameter θ which is the azimuth angle of the long semi-axis. An ITS-S can use a function F to determine whether a point P(x,y) is located inside, outside, at the center, or at the border of a geographical area. The function F(x, y) assumes the canonical form of the geometric shapes: The Cartesian coordinate system has its origin in the center of the shape. Its abscissa is parallel to the long side of the shapes. Point P is defined relative to this coordinate system. The various properties and other aspects of function F(x, y) are discussed in ETSI EN 302 931 v1.1.1 (2011-07).

The various embodiments discussed herein may be implemented without requiring radio access layer standard and/or implementation changes. Any potential situation detection indicating possibility of VRUs 116 entering a dangerous situation is also shared with VRUs 116 by sending a V2X communication message, referred to herein as a "VRU associated message" or "VAM". The VAM includes a 'Potential-Dangerous-Situation-VRU-Perception-Info' DE/IE. VAMs can be included in, or otherwise based on an existing V2X message or a new type of V2X message. Vehicle stations may receive infrastructure help for effective and timely transmission of VAMs to one or more VRUs.

In the following discussion, it is assumed that there are no battery constraints for V-ITS-S 110 V2X communications, and it is assumed that VRUs 116 may have battery constraints. Additionally, some VRUs 116 may run power/battery saving schemes at their respective radio access layers such as 3GPP DRX as discussed in 3GPP TS 38.321 v15.7.0 (Sep. 27, 2019), 3GPP TS 38.331 v15.7.0 (Sep. 27, 2019), 3GPP TS 36.321 v15.7.0 (Sep. 26, 2019), 3GPP TS 36.331 v15.7.0 (Sep. 27, 2019), and/or other like standards or specifications. In various embodiments, infrastructure and/or volunteer/leader vehicle station assisted embodiments (e.g., a mechanism at facility layer without requiring radio access layer standard/implementation changes) to ensure that VAMs are timely conveyed to the VRUs 116 running device power saving scheme(s).

Safety of VRUs 116 is expected to be one of the critical hindrances in adoption of CA/AD vehicles and AVs on public roads. The embodiments discussed herein will bolster existing vehicle station capabilities and RSS framework by ensuring safety of vulnerable road users on the road, which should assist in achieving vision zero goals.

In embodiments, various V2X stations (including V-ITS-Ss 110 and R-ITS-Ss 130) coordinate to share their perception and detect potential VRU danger situations. Once a potential VRU danger situation is detected, proximate vehicle stations in a broader Geo-Area are informed (e.g., using the 'Potential-Dangerous-Situation-VRU-Perception-Info' DE/IE) at an earliest possible time, and the vehicle stations perform one or more coordinated preventative measures to handle the detected VRU danger situation rather than depending only on emergency measures. In embodiments, VRUs 116 are also notified about such situations at the earliest possible moment to avoid potential injuries or fatalities.

Informing VRUs 116 may be challenging when resource-constrained VRUs 116 run power saving mechanisms (e.g., a power saving mode without aligned sleep-wake schedule) at their respective radio access layers and there is no coordination between the Radio Access layers and higher layers (e.g., the facilities layer). The embodiments discussed herein tackle this problem and ensure timely transmission of the 'Potential-Dangerous-Situation-VRU-Perception-Info' indicator to relevant VRUs 116 through V2X links with minimal network overhead and without requiring radio access layer changes.

Some embodiments include communication-efficient forwarding of 'Potential-Dangerous-Situation-VRU-Perception-Info' messages (indicating potential dangerous situations involving VRUs) in a bigger geo-area, because preventative measures may mandate for multiple vehicles (possibly within multi-hop communication range) to take preventative action(s).

When a potential dangerous situation perception (e.g., a potential dangerous situation those involving a VRU) is detected and exchanged in the proximity of the detecting station, preventative measures/actions are performed to enhance VRU safety and/or to achieve 'Vision Zero' goal. Embodiments include a Scoped-RSS (RSS with defined and limited scope in time and Geo-Area) based preventative measures/actions for this purpose. In Scoped-RSS based Preventive Measure, proximate vehicle stations may coordinate at facility layer and adopt a Scoped-RSS configuration where Scoped-RSS configuration is for given Geo-area(s) and for a limited time. Once vehicle stations are out of the scope of the Scoped-RSS, the vehicle stations resume their normal RSS configuration.

Informing VRUs 116 about 'Potential-Dangerous-Situation-VRU-Perception' timely may serve as one effective preventive measure as some VRUs 116 (e.g., cyclist, pedestrians including adults, children, pets/dogs, etc.) may be able to take actions to eliminate the likelihood of such situations. As mentioned previously, messages concerning VRUs 116 (exchanged among vehicle stations, infrastructure stations, personal stations including VRUs, etc.) are referred to herein as VAMs and may include a V2X message carrying a 'Potential-Dangerous-Situation-VRU-Perception-Info' DE/IE. VRUs 116 may have battery constraints and some VRUs 116 may run power/battery saving schemes at their respective Radio/Access layers such as DRX [6]-[9]. Usually in power saving mode, a VRU's 116 radio will be sleeping with a small periodic wake-up period. These awake periods of VRUs 116 may not be aligned, creating problem that a VAM from a vehicle station or infrastructure station may not be received by all associated VRUs. Moreover, higher layer(s) (e.g., Facility layer or Application layer) may not be aware of VRU's power saving configuration at the radio access layer. Various embodiments may be implemented at the facilities layer without requiring radio access layer changes to ensure that VAM is conveyed to the VRUs 116 timely even if they are running device power saving scheme.

Any of the embodiments herein may utilize any suitable underlying RAT at the vehicle station, the VRU, and/or the RSU including, for example, D2D, V2X, and/or sidelink RATs based on, for example, 3GPP C-V2X (e.g., 4G/LTE and/or 5G/NR), IEEE 802.11p (ITS-G5/DSRC), and/or other RATs such as those discussed herein.

2.1. Embodiments for Preventative Measures to Enhance VRU Safety

Figure 14:
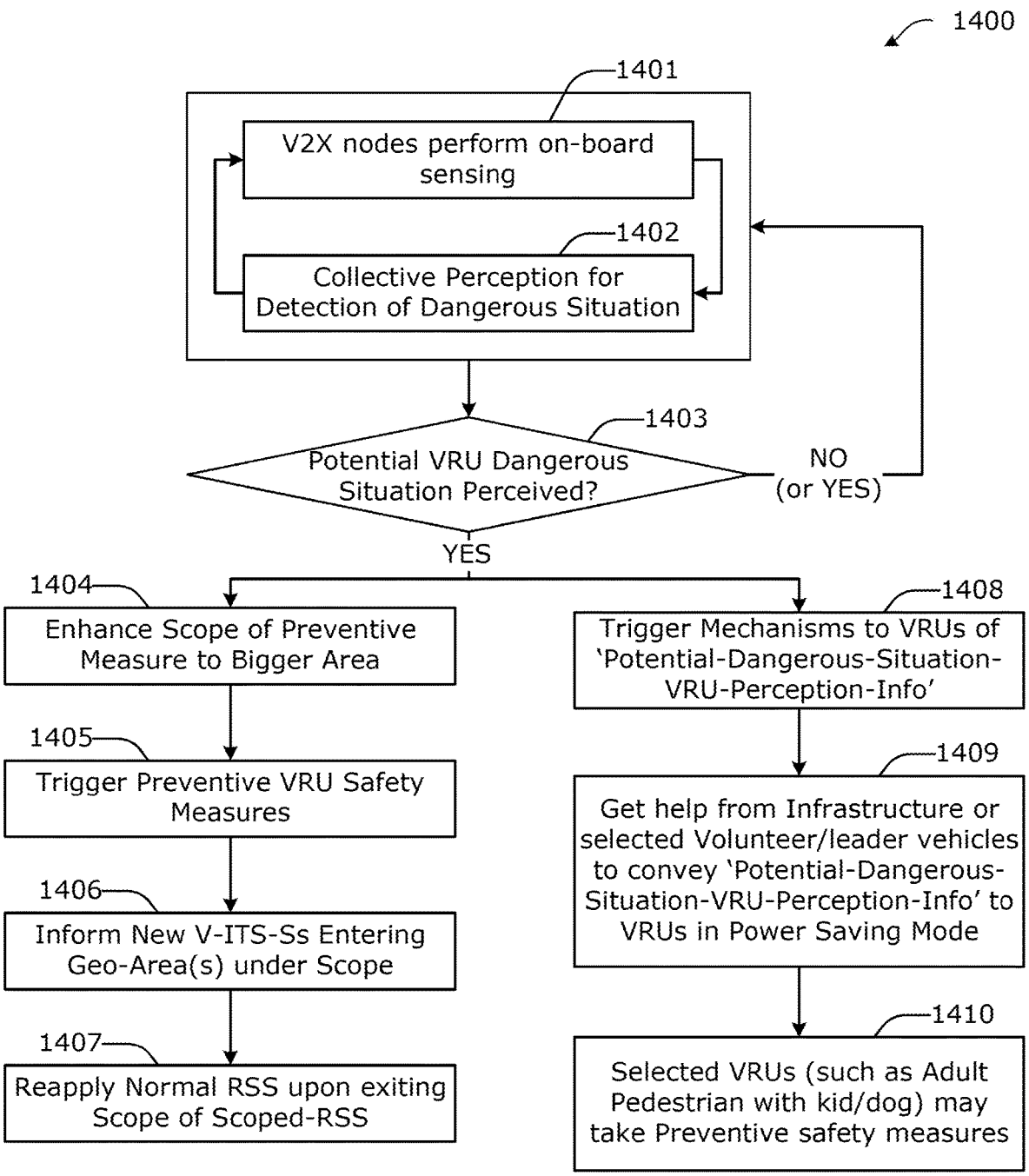
FIG. 14 illustrates an enhanced VRU safety procedure according to various embodiments.

FIG. 14 shows an enhanced VRU safety procedure 1400 according to various embodiments. Procedure 1400 begins at operation 1401 where various V2X nodes (e.g., V-ITS-Ss 110 and/or R-ITS-Ss 130) perform on-board sensing (e.g., using various on-board sensors), and at operation 1402 collective perception is performed for detection of VRU dangerous situation. Operation 1402 involves proximate V2X nodes (e.g., V-ITS-Ss 110 and/or R-ITS-Ss 130) sharing the on-board sensing data for robust and enhanced Collective Perception. The Collective Perception operations (e.g., operations 1401 and 1402) may continue whether or not a potential VRU dangerous situation is perceived at operation 1403.

When a potential VRU dangerous situation is perceived at operation 1403, then the scope of preventive measures is enhanced or expanded to a larger area at operation 1404. Operation 1404 may involve triggering mechanism(s) for Controlled Forwarding of 'Potential-Dangerous-Situation-VRU-Perception-Info' beyond a Direct Communication or broadcasting range. Then, preventative VRU safety measures are triggered at operation 1405. Based on danger level, scoped-RSS parameters are coordinated and negotiated among proximity (multi-hop) V-ITS-Ss 110. The coordinated scoped-RSS is scoped to one or more specific Geo-Area(s) for a specified period of time, or until the end of 'VRU Dangerous situation'. Further, operation 1405 may involve triggering 'VRU Safety Preventive Maneuver Coordination' in bigger/larger Proximity. Then, V-ITS-Ss 110 entering the coverage/service area (e.g., Geo-Area(s)) are informed of the dangerous situation at operation 1406. Operation 1406 involves one or more volunteer/leader V-ITS-Ss 110 tracking dynamic scope (e.g. changing Geo-Area(s) under scope) of the scoped-RSS specially in case of mobile detected-VRUs 106. Additionally, one or more volunteer/leader V-ITS-Ss 110 periodically broadcast Scoped-RSS parameters for new V-ITS-Ss 110 entering Geo-Area(s) with Scoped-RSS in effect. Then, normal (default) RSS mechanisms are reapplied upon exiting the scope of the scoped-RSS at operation 1407.

Meanwhile, at operation 1408 mechanisms to convey 'Potential-Dangerous-Situation-VRU-Perception-Info' to VRUs 106 are triggered, assistance is obtained from R-ITS-S(s) 130 and/or selected Volunteer/leader V-ITS-Ss 110 to convey 'Potential-Dangerous-Situation-VRU-Perception-Info' to VRUs in Power Saving Mode at operation 1409, and selected VRUs 106 (e.g., Adult Pedestrian with kid/dog) may take preventive safety measures at operation 1410.

2.2. Controlled Forwarding of VAMs Beyond Direct Communication Range of Origin Node In embodiments, any perceived objects (which can contribute to detection of 'A situation indicating possibility of VRUs getting in dangerous situation immediately or in future') are disseminated by the perceiving station (e.g., vehicle stations or infrastructure stations/RSUs) to a broader area, and the perceived objects are multi-hop forwarded to other stations. In some embodiments, perceived object information/data are carried in one or more Potential-Dangerous-Situation-VRU-Perception-Info DEs/IEs, and such perceived objects may be referred to herein as Potential-Dangerous-Situation-VRU-Perception-Info.

In some embodiments, intermediate nodes in the multi-hop forwarding path (e.g., nodes that are located between a source node and a destination node along a path there between) may encapsulate, combine, compress, aggregate, and/or modify packet/message contents before passing the packet/message to the next node in the multi-hop forwarding path. In this way, perceived object information and/or other sensed data from several nodes (e.g., multiple stations) can be combined, aggregated, and/or compressed before being passed to the next node in the path.

For example, usually most of the objects perceived by vehicle station are shared with 1-hop neighbors by transmitting a CPM to one or more of the 1-hop neighbors. As mentioned in [3], the sending of CPMs comprises the generation and transmission of CPMs. In the course of CPM generation, a CPS entity operated by the originating (source) node composes/generates the CPM, which is then delivered to the networking and transport layer for dissemination (see e.g., Figure X0 infra). CPMs are sent by the originating node to all nodes within a direct communication range of the origination node. Upon receipt of a CPM, the CPS entity makes the content of the CPM available to one or more ITS applications and/or to facilities within the receiving node, such as a Local Dynamic Map.

In various embodiments, Potential-Dangerous-Situation-VRU-Perception-Info are communicated beyond the direct communication range (1-hop) of a source node by allowing direct communication range neighbors to relay/forward the Potential-Dangerous-Situation-VRU-Perception-Info to their neighboring stations. Neighbors can include a 'Potential-Dangerous-Situation-VRU-Perception-Info' DE/DF/IE in a new V2X message or in a next CPM, CAM, MCM, or other like message(s) to be sent. This provides flexibility for preventative measures (such as conservative RSS Configuration) to be agreed in the VRU proximity well ahead in time in a broader area. Additionally, these embodiments ensure multi-hop dissemination of Potential-Dangerous-Situation-VRU-Perception-Info throughout the associated Geo-Areas.

Figure 20:
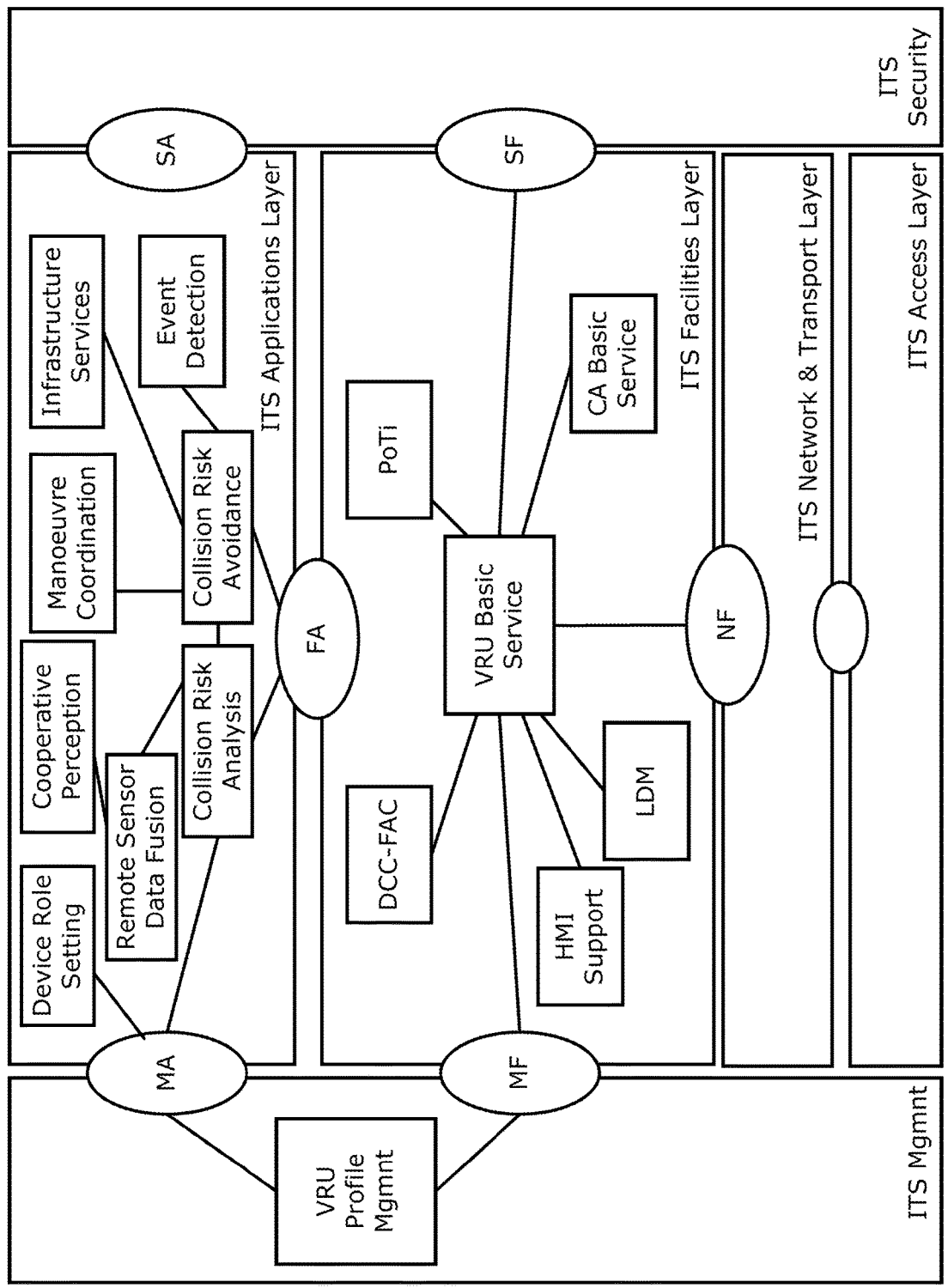
FIG. 20 shows an example ITS-S reference architecture according to various embodiments.

In these embodiments, the new V2X message or existing V2X/ITS messages may be generated by a suitable service or facility in the facilities layer (see e.g., FIG. 20 infra). For example, in some embodiments where the 'Potential-Dangerous-Situation-VRU-Perception-Info' may be a DE included in a cooperative awareness message (CAM) ((generated by a Cooperative Awareness Service (CAS) facility), collective perception message (CPM) (generated by a Collective Perception Service (CPS) facility), Maneuver Coordination Message (MCM) (generated by a Maneuver Coordination Service (MCS) facility), VRU awareness message (VAM) (generated by a VRU basic service (see e.g., FIG. 20), Decentralized Environmental Notification Message (DENM) (generated by a DENM facility), and/or other like facilities layer message, such as those discussed herein. In embodiments where the 'Potential-Dangerous-Situation-VRU-Perception-Info' is to be included in a new V2X message, the facilities layer of the station may operate a new facilities layer entity to generate the new message and pass the generated message to lower layers for transmission. The new facilities layer entity may also obtain and process the messages in the new format received from other stations, and assist in performing preventative measures including evasive maneuvers and the like.

The number of hops for forwarding 'Potential-Dangerous-Situation-VRU-Perception-Info' can be decided by the original transmitter (source node) based on the environment in which the originating station is located or traveling through. For example, a broader Geo-Area may be needed to be covered for a higher speed limit road. In some cases, only some sections of road need to be considered for forwarding. For example, in a one-way road, a longer section of the road may not need to be covered in the direction vehicles are moving away from the detected VRU location; while a relatively longer section of road in the direction vehicles are coming towards VRU may need to be covered for forwarding 'Potential-Dangerous-Situation-VRU-Perception-Info'.

As an example, an Xc meter (m) Geo-Area may be covered in a road section in a specific travel direction, and Xr is the radio communication range in the road section. A node can estimate a 1-hop radio coverage range (Xr) based on its neighbor list and location of the neighbors. The relative distance of farthest neighbor can be calculated to determine the radio range Xr. In another example, the relative distance from a node within which 90% of neighbors are located can be used to determine the radio range Xr. T transmitting node may also calculate number of forwarding hops using the following equation:

$$Nf = \text{Ceiling } (Xc/Xr) \text{ to cover } Xc \text{ m long Geo-area}$$

The number of forwarding hops can be included in the V2X message carrying the 'Potential-Dangerous-Situation-VRU-Perception-Info'. The Potential-Dangerous-Situation-VRU-Perception-Info IE/DE/DF can include a data element or field to include the number or hops, or the number of hops can be included in another IE, DF, or DE. Each intermediary node can reduce this value by one each time it forwards the message to a neighboring node. When the value of the number of forwarding hops reaches zero, no further forwarding is done.

However, if all or most nodes forward 'Potential-Dangerous-Situation-VRU-Perception-Info' to their neighboring stations, such signaling could unnecessarily flood the radio spectrum and/or otherwise waste radio resources. The stations may include controlled forwarding mechanisms to reduce the likelihood of such scenarios. In embodiments, the stations may implement one or both of the following controlled forwarding mechanisms.

2.2.1. Preselected or Preconfigured Controlled Forwarding Embodiments

For each node, one or more neighbors can be selected or configured as a forwarding/relay node in advance. Such selection can be done for each direction or all road segments around the location of detected VRU.

Figure 15:
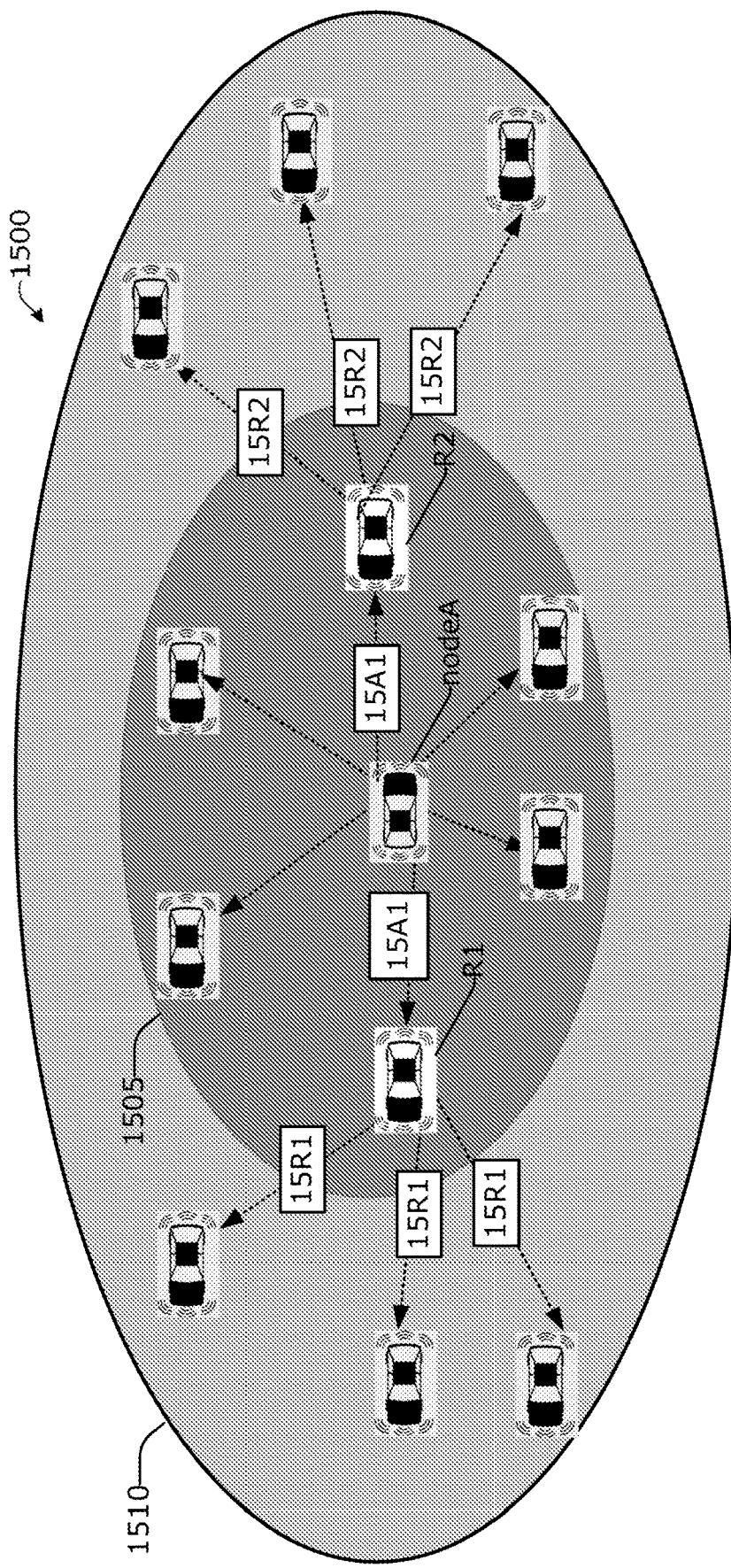
FIG. 15 illustrates a controlled message forwarding example according to various embodiments.

FIG. 15 shows a controlled forwarding example 1500 according to various embodiments. The example of FIG. 15 involves controlled forwarding of 'Potential-Dangerous-Situation-for-VRU-Info' from a Node A to Broader Area beyond node A's coverage area 1505 via one or more (pre-)selected relays. The coverage area 1505 is node A's communication range where any other nodes within this communication range should be able to communicate with node A. The nodes within the coverage area 1505 may be considered "proximate nodes," "nearby nodes," or "neighboring nodes."

In FIG. 15, node A perceives a potentially dangerous situation, generates a message 15A1 including a 'Potential-Dangerous-Situation-for-VRU' DE, and transmits or broadcasts the message 15A1 to inform neighboring nodes of the potentially dangerous situation. Simultaneous or subsequent to generating and/or transmitting the message 15A1, the 'Potential-Dangerous-Situation-for-VRU' Info Coverage is expanded or enhanced to coverage area 1510, which is wider than node A's coverage area 1505. The broader coverage area 1510 is used to relay the detected 'Potential-Dangerous-Situation-for-VRU' Info from node A beyond node A's direct communication range 1505. In this example, nodes R1 and R2 are preselected to act as relays for node A. Each of the designated relay nodes R1 and R2 forward the 'Potential-Dangerous-Situation-for-VRU' received from node A to various other nodes within the broader coverage area 1510, but outside of the coverage area 1505. In this example, relay node R1 transmits/broadcasts message 15R1 to one or more neighboring nodes (from the perspective of relay node R1), and relay node R2 transmits/broadcasts message 15R2 to one or more neighboring nodes (from the perspective of relay node R2).

In embodiments, a limited number of neighbors are selected in advance for each node to forward any 'Potential-Dangerous-Situation-VRU-Perception-Info' message 1520. As an example, with reference to FIG. 15, one or more neighbors of node A that have better link quality with node A, higher connection life (e.g., vehicles moving in same direction towards same destination have longer connection lifetime), located farther from node A (e.g., so that next-hop range will be larger), and/or the like can be selected as a relay node or forwarder. In this example, the selected immediate neighbors of node A constitute $1^{st}$-hop-Relays of node A.

More than one hop forwarding (multi-hop forwarding) may be needed to cover the intended broader range for forwarding Potential-Dangerous-Situation-VRU-Perception-Info. In some embodiments, for each 1st-hop-Relay, one or more 2nd-hop-Relays may be selected if an intended broader range for forwarding Potential-Dangerous-Situation-VRU-Perception-Info cannot be reached by controlled forwarding via the 1st-hop-Relays, and so on.

2.2.2. Distributed Timer Controlled Forwarding Embodiments

Figure 16:
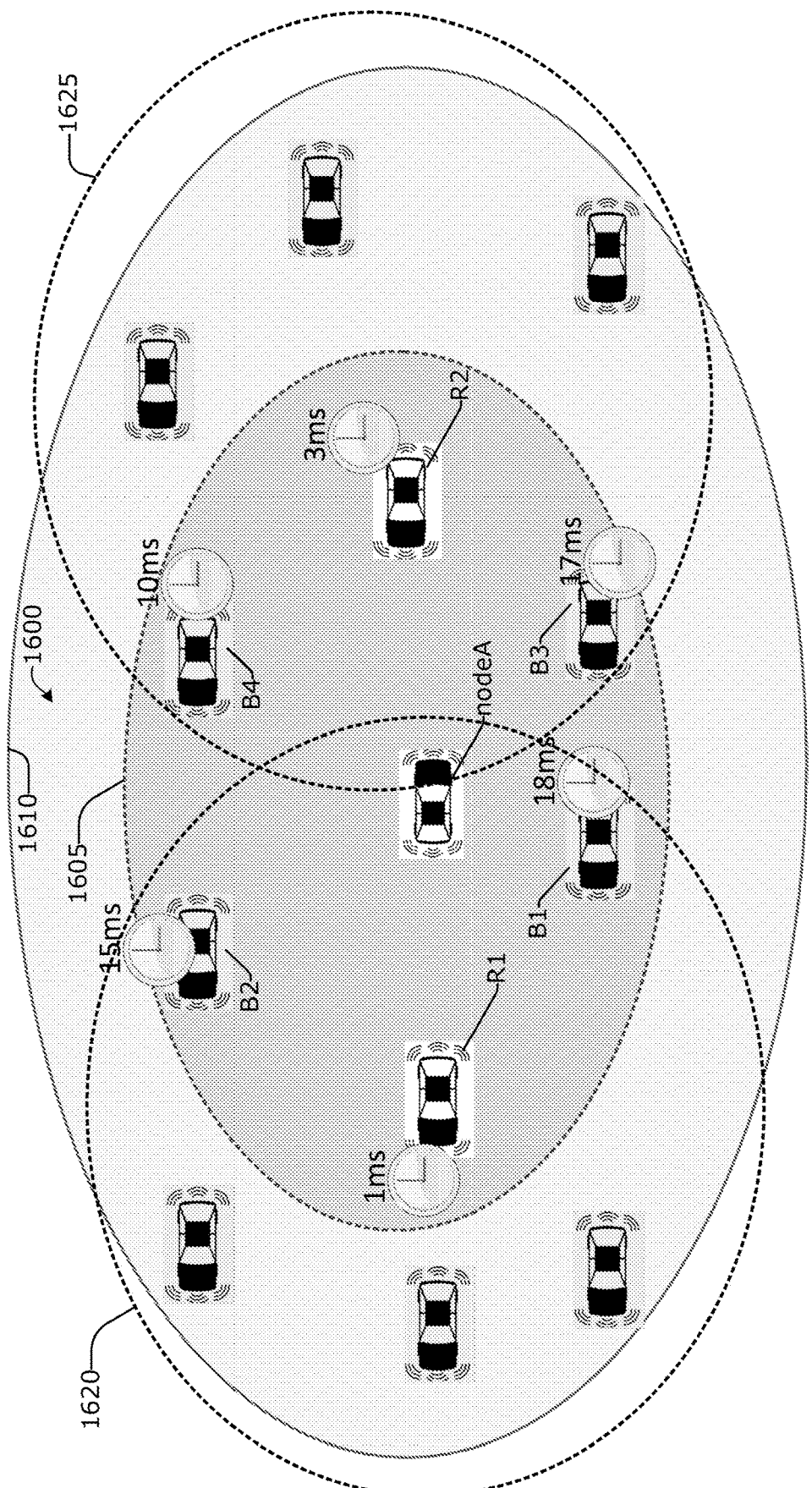
FIG. 16 illustrates a timer-based controlled message forwarding example according to various embodiments.

FIG. 16 shows another controlled forwarding example 1600 according to various embodiments. In this example, node A disseminates the 'Potential-Dangerous-Situation-for-VRU-Info' to a proposed Broader Area 1610 ('Potential-Dangerous-Situation-for-VRU' Info Coverage area 1610) beyond node A's Direct Communication Range 1605 by via relay nodes selected by distributed Forward-Wait-Timer implementation. First, node A perceives a potentially dangerous situation for a VRU (Potential-Dangerous-Situation-for-VRU) and generates a message 15A1 to inform one or more neighboring nodes.

After receiving 'Potential-Dangerous-Situation-VRU-Perception-Info' from a source node (e.g., node A in FIG. 16), neighboring node(s) run/initialize respective VRU-Info-Forwarding-Wait-Timers in a distributed manner at their respective facilities layers. In FIG. 16, these timers are represented by the clocks with the listed timer values. A neighboring node who's VRU-Info-Forwarding-Wait-Timer expires first, selects to forward the 'Potential-Dangerous-Situation-VRU-Perception-Info'. In the example of FIG. 16, node R1's Forward-Wait-Timer Expires before the expiration of other nodes' timers, and therefore, node R1 forwards Potential-Dangerous-Situation-for-VRU message (e.g., message 15R1 based on message 15A1 received from node A as discussed previously with respect to FIG. 15) within node R1's coverage area 1620. When the Potential-Dangerous-Situation-for-VRU message is sent by node A, nodes B1 and B1 cancel their Forward-Wait-Timers.

Most of the neighbors within direct communication range 1505, 1605 (e.g., nodes B1 and B2 closer to node R1 than node A in FIG. 16) may cancel their Timers and skip transmission of the 'Potential-Dangerous-Situation-VRU-Perception-Info' after overhearing a 'Potential-Dangerous-Situation-VRU-Perception-Info' transmission from R1 as shown in FIG. 16. Another neighbor, node R2, whose VRU-Info-Forwarding-Wait-Timer expires second (i.e., after expiration of node R1's VRU-Info-Forwarding-Wait-Timer) may still forward the 'Potential-Dangerous-Situation-VRU-Perception-Info' message (e.g., message 15R2 based on message 15A1 received from node A as discussed previously with respect to FIG. 15) within node R2's coverage area 1625 as it has not heard (received) the message from node R1. Other neighbors of node A, such as nodes B3 and B4, cancel their Timers after overhearing 'Potential-Dangerous-Situation-VRU-Perception-Info' from node R2 as shown in FIG. 16.

In FIGS. 15 and 16, the messages 15A1, 15R1, and 15R2 may have a format according to message format 1520 as shown by FIG. 15, where the node's node identifier (ID) is inserted into the data entity "[node ID]". The 'Potential-Dangerous-Situation-VRU-Perception-Info' message 15A1, 15R1, and 15R2 can be transmitted in a new message or as a new message. In other embodiments, the 'Potential-Dangerous-Situation-VRU-Perception-Info' can be a DE included in an existing V2X message such as a BSM, a CPM, a MCM, VAM, or other like message.

In some embodiments, limited forwarding redundancy is allowed so as to increase reliability of 'Potential-Dangerous-Situation-VRU-Perception-Info'. For example, in FIG. 16, even after hearing 'Potential-Dangerous-Situation-VRU-Perception-Info' from node R1, node B1 may still forward 'Potential-Dangerous-Situation-VRU-Perception-Info' after expiry of its VRU-Info-Forwarding-Wait-Timer if redundant transmission is allowed by two or more nodes.

In some embodiments, a VRU-Info-Forwarding-Wait-Timer value may be selected randomly from a range [Tmin, Tmax]. Tmax can be different for various neighbors. For example, Tmax can be chosen smaller for node with higher number of connectivity (e.g., higher number of neighbors in neighbor list). Alternately, nodes closer to detected VRU's location may get priority by selecting smaller Tmax. Tmax for a node may also be selected based on more than one factor such as node connectivity level, distance from the detected VRU, node type (e.g., an R-ITS-S 130 may get priority over a V-ITS-S 110), node direction (e.g., a node moving in direction of a detected VRU 116 may get a higher priority than other nodes), distance from the node reporting 'Potential-Dangerous-Situation-VRU-Perception-Info' (e.g., neighbors further away from a detected VRU 116 than other nodes may get higher priority to reach longer range after relaying), and/or the like.

2.2.3. Scoped-RSS Based Preventative Embodiments

In various embodiments, a facilities entity categorizes different potential VRU danger situations to define preventative measures more efficiently than using existing services/facilities. This allows the station (facility) to minimize costs in terms of road traffic efficiency, passenger comfort, and VRU safety enhancements. In one example, the station (facility) may categorize 'Potential-Dangerous-Situation-VRU-Perception' situations as follows:

Low Dangerous Situation (e.g., when the perceived potential VRU is determined to be an adult pedestrian, a motorcycle, a cyclist, and/or road workers, etc.);

Medium Dangerous Situation(e.g., when the perceived potential VRU is determined to be an adult pedestrian with one or more children, a cyclist with a dog, an adult pedestrian using a mobile device while waiting for pedestrian traffic signals, etc.); and High Dangerous Situation (e.g., when the perceived potential VRU is determined to be an child without an adult, a child with a ball or the like, a cyclist in slippery road and/or with limited visibility, etc.).

Scoped RSS Parameters can be configured differently based on the danger situation categorization. Scoped-RSS based preventive measure enables vehicles in the detected VRU area to adopt modified set of RSS parameters to enhance VRU safety. Modified RSS parameters may include increased longitudinal distance between vehicle stations, (e.g., between a V-ITS-S 110 and VRU 116); increased space clearance for lane changes, reduced speed for Right/Left Turn, maximum limit for acceleration, etc. If multiple types of VRUs 116 are detected, a suitable RSS configuration is selected for worst case scenario (e.g., stringent RSS requirement between different VRU types).

In some implementations, scoped-RSS implies that the modified RSS parameters are applicable only for specified Geo-Areas (Geo-Areas around detected a VRU's 116 location) and for limited time. Once V-ITS-Ss 110 are out of the specified Geo-Area(s) or after given time, V-ITS-Ss 110 go back to normal RSS parameters.

Scoped-RSS Parameters selection is temporary and scoped to a given Geo-Area for a given time, or until the end of 'The situation indicating possibility of VRUs getting in dangerous situation immediately or in near future'.

In some embodiments, the Geo-Areas and/or time periods for limiting scope of the scoped-RSS can be estimated based on an initial (e.g., common) ML/AI model obtained via online or offline training (e.g., based on past data and/or other like training datasets) at a service provider (e.g., including applications servers/cloud service 160 of FIG. 1, edge compute nodes 140 of FIG. 1, NANs 130 of FIG. 1, and/or the like). Such ML/AI models can be updated frequently offline in a distributed manner by the nodes and reported to the service provider platform. Then, the service provider may share the updated model to the V-ITS-Ss 110 periodically or asynchronously (e.g., on request or by pushing the updated models to the stations when available).

In some embodiments, the Geo-Areas and/or time periods for the scope limitation may be dependent on the environment. For example, larger Geo-Areas or effective time periods may be needed for difficult or hazardous road conditions (e.g., zigzags, uphill, downhill, switchbacks, etc.), adverse weather (e.g., limited visibility, foggy, slippery due to snow or spilled oil, wet conditions, etc.). In some embodiments, the Geo-Areas and/or time periods may also be dependent on the detected VRU type (e.g., kids with ball, cyclist/pedestrian with dog), types of V-ITS-Ss 110 in the proximity (e.g., truck needs longer distance to stop in case of sudden stop), presence of human driver vehicles in the proximity (as human driver response takes longer), etc. In some cases, detected/perceived VRUs 116 may be moving, which means the effective Geo-Area may also be moving requiring continuous (or nearly continuous) tracking of such moving VRU 116 once it is detected.

When the V-ITS-Ss 110 cross a scoped Geo-Area and/or enter a time-scope, or an updated collective perception shows end of 'The situation indicating possibility of VRUs getting in dangerous situation immediately or in near future', the V-ITS-Ss 110 regain their normal RSS parameters.

Group Coordination for selection of, negotiation for, and agreement on Scoped-RSS parameters is also performed in some embodiments. In these embodiments, a node detecting a VRU 116 first may initiate the scoped-RSS parameters coordination by sending a message (e.g., a Scoped-RSS-Coordination-Message, a "Scoped-RSS-Coordination-Message-Request", or the like) including a set of recommended RSS parameters. If the set of recommended RSS parameters contained in the Scoped-RSS-Coordination-Message is acceptable to the neighboring nodes, those values may be used automatically, or an updated Scoped-RSS-Coordination-Message including the same set of recommended RSS values/parameters as the first Scoped-RSS-Coordination-Message may be sent back to the origin node as an acknowledgement. The neighboring nodes may disagree on some or all the values in the set of recommended RSS values/parameters, and in this case the neighboring nodes send respective updated Scoped-RSS-Coordination-Messages (e.g., a "Scoped-RSS-Coordination-Message-Response") back to the origin node with updated RSS parameter values. In case of a conflict for a particular scoped RSS parameter/value, a majority voting or consensus algorithm may be applied to select one of the conflicting values. In these embodiments, majority voting involves each node providing RSS values/parameters (e.g., "votes") and the final set of scoped RSS values/parameters include the set of scoped RSS values/parameters that receives more than half of the votes and receives the most votes. Alternatively, individual RSS values/parameters may be voted on wherein each RSS value/parameter that receives more than half of the votes and receives the most votes are used. In other embodiments, plurality voting can be used, where an RSS value/parameter set (or individual RSS values/parameters) that receives the most votes is used even if that scoped RSS set (or individual scoped RSS value/parameter) does not receive more than 50% of the votes. In other embodiments, weighted voting may be used. In majority voting, each model has the same voting weight, whereas in weighted voting the importance of one or more of the scoped RSS sets (or individual scoped RSS values/parameters) can be increased or decreased using one or more weight factors. The weight factors may be selected based on VRU profile parameters, V-ITS-S parameters and/or capabilities, distance (e.g., LoD, LaD, and/or VD) to the VRU, and/or the like. The weight factors can also be chosen based on various design choices and/or using an optimization algorithm. In some embodiments, infrastructure equipment (e.g., R-ITS-Ss 130) may assist in handling RSS parameter conflicts by using such decision making mechanisms or some other suitable selection algorithm. Similarly, the scope of the Scoped RSS in terms of time and Geo-Areas in which Scoped-RSS is applicable can be determined collectively.

Since VRUs 116 may move slower compared to the V-ITS-Ss 110, new V-ITS-Ss 110 may be entering particular Geo-Area(s) with Scoped-RSS in effect. As a result, one or more volunteer nodes can be selected to periodically broadcast info about Scoped-RSS parameters and scope of the scoped-RSS (e.g., effective Geo-Areas and Time limit) for new entering V-ITS-Ss 110.

Maneuver coordination after selection of Scoped-RSS parameters may involve the V-ITS-Ss 110 applying the scoped-RSS parameters once they enter the effective Geo-Area(s) during Time duration scope of the scoped-RSS. Some V-ITS-Ss 110 may need to accelerate or decelerate to apply new RSS parameters (e.g., increased LoD) and behave more conservatively during lane change or right/left turns.

Figure 17:
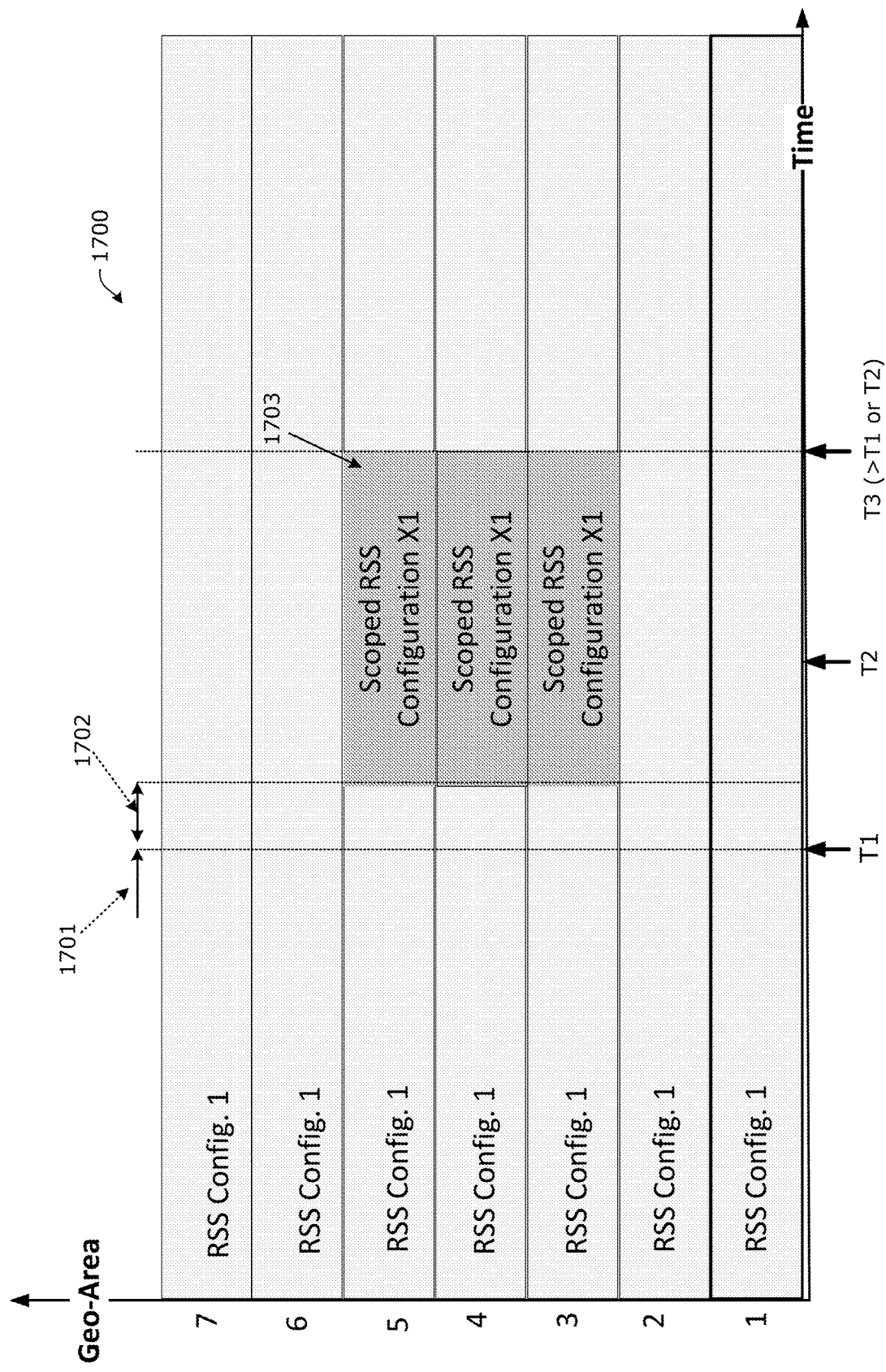
FIGS. 17 and 18 illustrate examples of scoped-RSS based preventative measures according to various embodiments.
Figure 18:
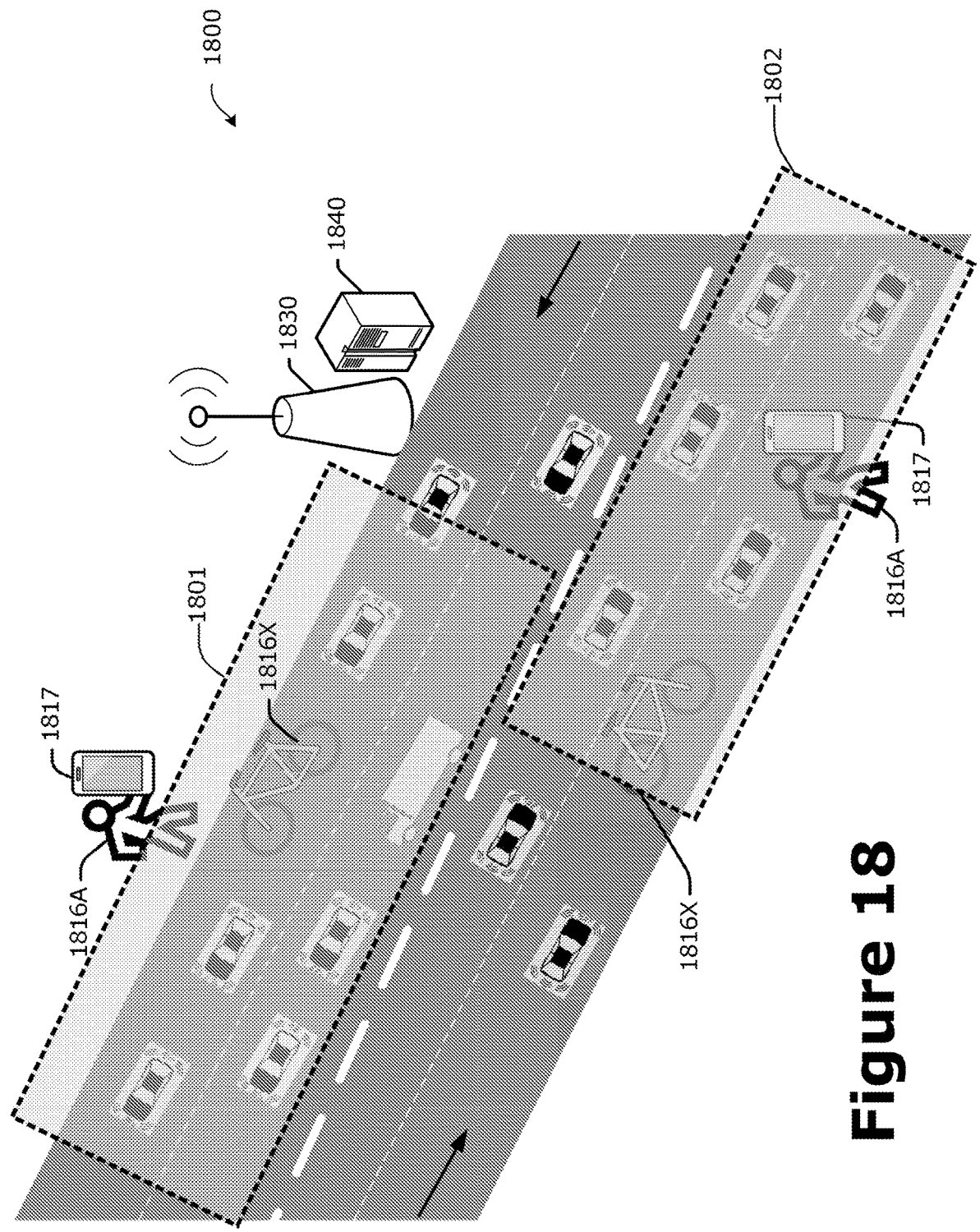

FIGS. 17 and 18 illustrate examples of scoped-RSS based preventative measures according to various embodiments. FIG. 17 shows a scoped-RSS example 1700 wherein the selection of values for RSS parameters and RSS scope (in terms of time and Geo-Areas 1 to 7) are used for traffic efficiency versus VRU safety enhancement trade-off determinations.

FIG. 17, continuous On-Board Sensing and Collective Perception among Proximity Nodes takes place at 1701, and negotiation of Scoped RSS Configuration (config.) among Proximity Nodes at 1702. The Scoped RSS config includes RSS parameter values and scope such as, for example, start time, end time, potential Geo-Areas, etc.

At time T1, a Potential-Dangerous-Situation-for-VRU Detected at time T1 for Geo-Areas 3, 4 and 5. It can be for near future time (e.g., Time T2 where T2>T1). At 1703, the scoped RSS Config. X1 can have increased longitudinal distance between AVs and/or VRUs; increase space clearance for Lane change, reduced speed for Right/Left Turn, Max. limit for acceleration and so on compared to RSS Config. 1. At time T3, the RSS Config. 1 is restored for Geo-Areas 3, 4 and 5.

FIG. 18 shows another scoped RSS example 1800 wherein the selection of values for the RSS parameters and RSS scope (in terms of time and Geo-Areas) are used for traffic efficiency versus VRU safety enhancement trade-off determinations. In FIG. 18, the VRUs 1816 (including VRUs 1816A and 1816X), VRU ITS-Ss 1817, NAN 1830, edge node 1840 may be the same or similar as VRU 116, VRU ITS-Ss 117, NAN 130, and edge node 140 of FIG. 1, respectively.

In the Geo-Area 1801, the scoped RSS Config. X1 is in effect. Scoped RSS Config. X1 can have increased longitudinal distance between vehicles and/or VRUs 1816; increased space clearance for lane changing, reduced speed for right/left turning, maximum limit for acceleration, and/or other like conditions, rules, parameters, etc. The scope of RSS Config. X1 is limited to the area shown at a particular time T1 (see e.g., FIG. 17). Two types of VRUs 1816 are detected including a pedestrian VRU 1816A and a cyclist VRU 1816X, so RSS config. is selected for worst case scenario (e.g., stringent RSS requirement between these two VRUs 1816). Since the perceived VRU 1816X is moving, the effective area 1801 will be moving requiring continuous tracking of such moving VRU once it is detected. In the Geo-Area 1802, the scoped RSS Config. X2 is also in effect.

2.2.4. VAM Transmissions/broadcasts to VRUs Embodiments

V-ITS-Ss 110 can take proper preventative actions to avoid accidents when detecting 'A situation indicating possibility of VRUs getting in dangerous situation immediately or in near future' message/DE without coordinating with VRUs 116. However, involving VRUs 116 could be beneficial in some situations. In embodiments, -ITS-Ss 110 may inform VRUs 116 of potential danger scenarios so that the VRUs 116 may also take preventive actions to avoid accidents.

In these embodiments, the vehicle stations (or a facilities layer entity, such as the VRU basic service, CPS, MCS, etc.) sends one or more VAMs including the 'Potential-Dangerous-Situation-VRU-Perception-Info' information to one or more VRUs 116 when a 'Potential-Dangerous-Situation-VRU-Perception' is detected. These embodiments assume that the VRUs 116 have V2X capabilities or other suitable RATs to monitor for VAMs. Additionally, most VRUs 116 may not have sufficient sensing capabilities to assist in cooperative perception.

In embodiments, a first vehicle station reporting a 'Potential-Dangerous-Situation-VRU-Perception-Info' to other vehicle stations also sends the same VAM or a VRU-specific VAM with the 'Potential-Dangerous-Situation-VRU-Perception-Info' to the relevant VRUs 116.

Repetition of VAM transmissions or broadcasts can be implemented to enhance reliability or to address other issues such as half-duplex radio at the VRUs 116 (in that case, the VRU is not able to receive VAM at the same time as transmitting). Repetition can be done either by same vehicle station that transmits the initial VAM or other neighboring vehicle stations or VRUs 116 closer to a location of the detected 'Potential-Dangerous-Situation-VRU-Perception'. For example, a distributed Repeat-Wait-Timer can be run at each vehicle station that receives the initial VAM transmission. A V-ITS-S 110 whose Repeat-Wait-Timer expires before expiration of the other Repeat-Wait-Timers implemented by the other vehicle stations repeats the VAM transmission a predefined number of times. After hearing a first repetition of the VAM, all other vehicle stations stop their Repeat-Wait-Timers or otherwise cancel their repeat VAM transmissions. The value of Repeat-Wait-Timers may be selected based on one or more predefined or configured factors such as a distance from the location of the 'Potential-Dangerous-Situation-VRU-Perception' (e.g., where a shorter timer value is used for shorter distances), station type (e.g., infrastructure may have priority over vehicle stations), hardware configurations and/or RAT capabilities, signal strength and/or signal quality measurements, and/or other factors.

Depending on VRU implementation, some VRUs 116 must have an active (of an awake) radio access layer in order to receive the VAM in time to take evasive measures. Even assuming that there are no battery constraints for V2X communications for the vehicle stations, the VRUs 116 may have battery/power constraints depending on the device implementation among many other factors. Additionally, some VRUs 116 may run power/battery saving schemes at their radio layers such as DRX in cellular systems. Usually in power saving mode, VRUs 116 radio will be sleeping with a small periodic wake up period. Moreover, the awake/active periods for some VRUs 116 may not be aligned with the active periods of other VRUs 116, which means that sometimes VAMs may not be received by all relevant VRUs 116.

To avoid these situations, if infrastructure equipment (e.g., base station, RSU, relay stations, access points, etc.) is/are available in the geo-areas under consideration (such as Geo-Areas around the detected VRUs 116), a vehicle station that detects one or more VRUs 116 before other vehicle stations may send a VAM with the 'Potential-Dangerous-Situation-VRU-Perception-Info' to the infrastructure equipment. In some cases, the infrastructure equipment may track the VRUs' 116 power saving mode and/or awake periodicity (e.g., DRX cycle periodicity). In these embodiments, the infrastructure equipment may frequently repeat/re-broadcast the VAM with the 'Potential-Dangerous-Situation-VRU-Perception-Info' so that VRUs 116 waking with different awake periodicities can get at least one copy of the VAM.

Additionally or alternatively, in embodiments (e.g., when the infrastructure equipment is a cellular base station), in response to receipt of a VAM from one or more vehicle stations, the infrastructure equipment may broadcast a paging message over a paging channel to cause the VRUs 116 to transition from an inactive state (e.g., RRC_IDLE or RRC_INACTIVE for 3GPP systems) to an active state (e.g., an RRC_CONNECTED for 3GPP systems). Once in the active state, the VRUs 116 may receive the VAMs either from the originating node (e.g., due to a repeated transmission), or from the infrastructure equipment or other neighboring nodes.

Figure 19:
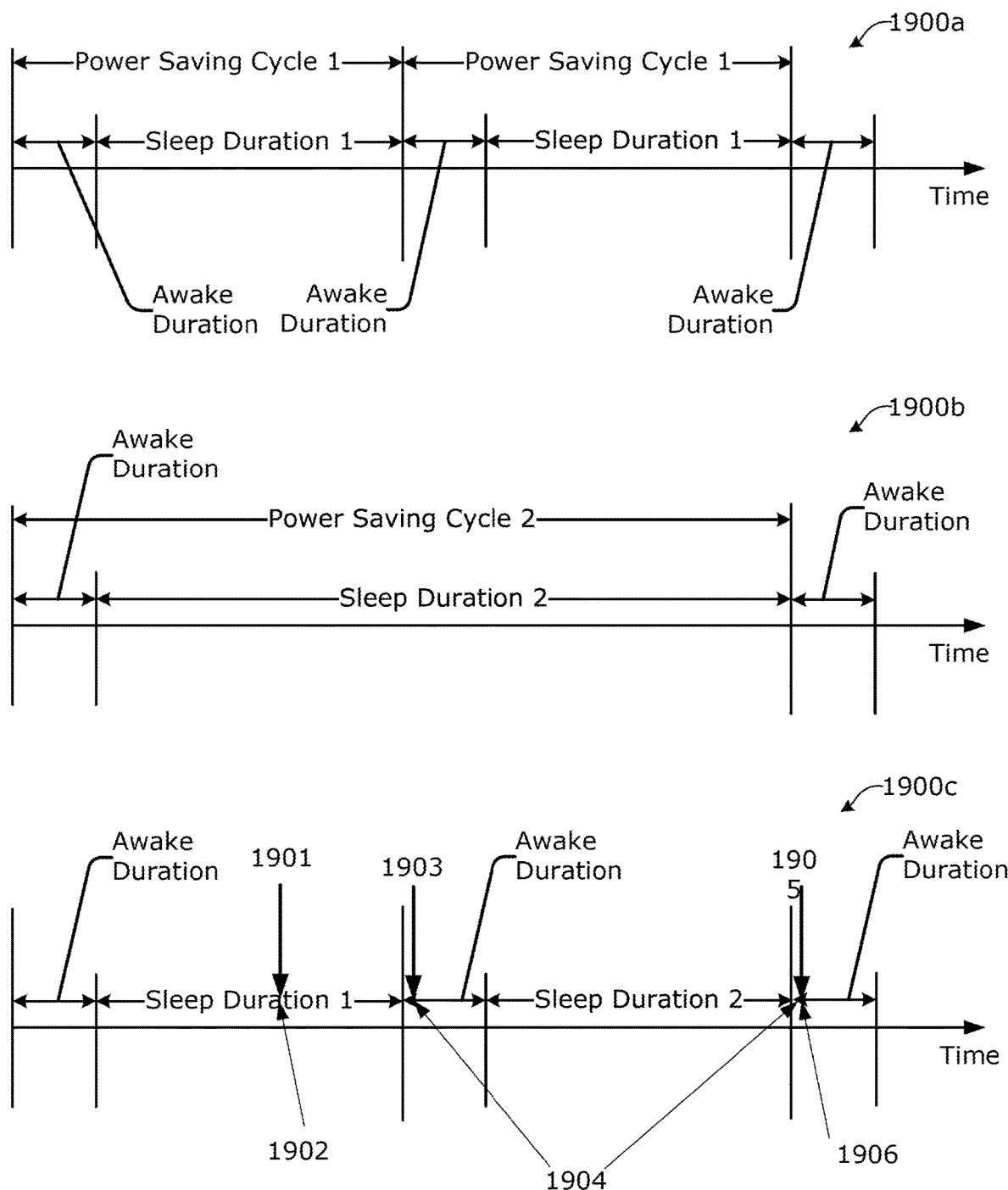
FIG. 19 illustrates an example VAM repetition scheme according to various embodiments.

FIG. 19 shows example VAM repetition scheme according to various embodiments. FIG. 19 includes a Power Saving Cycle Configuration 1 1900*a* which may be used for first VRUs 116 (e.g., VRUs X1, X2, X3, . . . ), and a Power Saving Cycle Configuration 1 1900*b* which may be used for second VRUs 116 (e.g., Y1, Y2, Y3,).

In the example of FIG. 19, the R-ITS-S 130 and/or a volunteer/leader V-ITS-S 110 assists in repeating transmission of a VAM carrying a 'Potential-Dangerous-Situation-VRU-Perception-Info' to increase the chances of VRUs 116 running power saving mechanisms to receive at least one copy of the VAM. Referring to graph 1900*c*, at 1901 a V-ITS-S 110 transmits a VAM msg1, and at 1902: the R-ITS-S 130 (and/or one or more other V-ITS-Ss 110) receive(s) the VAM msg1. At 1903, the R-ITS-S 130 (or V-ITS-S 110) repeats/relays the VAM msg 1 transmission by transmitting or broadcasting the VAM msg1. At 1904, the first VRUs 116 monitor for, and obtain the transmitted/broadcasted VAM msg1. At 1905, the R-ITS-S 130 (or V-ITS-S 110) repeats/relays the VAM msg 1 transmission by transmitting or broadcasting the VAM msg1, and at 1906, the second VRUs 116 monitor for, and obtain the transmitted/broadcasted VAM msg1.

In some cases, the R-ITS-S 130 may have capability to align with VRU 116 awake/active state periods when such VRUs 116 implement a power saving mechanism. In that case, the R-ITS-S 130 may need to transmit VAM with the 'Potential-Dangerous-Situation-VRU-Perception-Info' only once or a few limited times. For example, in cellular networks, a base station can enforce VRU awake period alignment by making VRU sleep cycles an integer multiple of each other with aligned start times/periods for the awake times/periods.

In some embodiments, one or more V-ITS-Ss 110 can be selected as volunteer/leader to handle communicating VAMs to VRUs 116 in power saving mode. In these embodiments, the volunteer/leader node repeats transmission of the VAM with the 'Potential-Dangerous-Situation-VRU-Perception-Info' frequently/periodically to increase the likelihood that VRUs 116 in power saving mode in the coverage area (geo-area) obtains at least one copy of the VAM. Such embodiments may be useful for scenarios with there are no deployed infrastructure equipment, where infrastructure equipment is far away from the VRUs 116, when the infrastructure equipment is experiencing overload conditions, and/or when the stations are in highly congested coverage areas.

If the facilities layer has an interface with the radio access layer (e.g., via the N&T layer as shown by FIG. 20 infra), the radio access layer of VRUs 116 in power saving mode may provide information about sleep/awake details to the facilities layer, which can then be shared among neighboring V-ITS-Ss 110 at their respective facilities layers. In these embodiments, the volunteer/leader node can then reduce number of VAM repetitions based on the sleep/awake periods of proximate VRUs 116.

In one embodiment, a node (e.g., a V-ITS-S 110) transmitting 'Potential-Dangerous-Situation-VRU-Perception-Info' to other nodes can self-select itself as volunteer/leader to take care of VRUs 116 in the power saving mode. In case of multi-hop effective Geo-Areas, the relays for forwarding the 'Potential-Dangerous-Situation-VRU-Perception-Info' beyond the original node's direct communication range (as described earlier) may act as volunteer/leader for VAM repetition in their coverage areas. In another embodiment, V-ITS-Ss 110 near or relatively close to the perceived 'Potential-Dangerous-Situation-VRU-Perception' location may be selected as candidates to act as volunteers/leaders, and a suitable voting or consensus algorithm may be used to select a suitable leader node.

3. its-Station Configurations and Arrangements

FIG. 20 depicts an example ITS-S reference architecture according to various embodiments. In ITS-based implementations, some or all of the components depicted by FIG. 20 may follow the ITSC protocol, which is based on the principles of the OSI model for layered communication protocols extended for ITS applications. The ITSC includes, inter alia, an access layer which corresponds with the OSI layers 1 and 2, a networking & transport (N&T) layer which corresponds with OSI layers 3 and 4, the facilities layer which corresponds with OSI layers 5, 6, and at least some functionality of OSI layer 7, and an applications layer which corresponds with some or all of OSI layer 7. Each of these layers are interconnected via respective interfaces, SAPs, APIs, and/or other like connectors or interfaces.

The applications layer provides ITS services, and ITS applications are defined within the application layer. An ITS application is an application layer entity that implements logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [EN302663]), ETSI TR 102 638 V1.1.1 (2009-06) (hereinafter "[TR102638]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location based services, and applications providing networking services (e.g., global Internet services and ITS-S lifecycle management services). A V-ITS-S provides ITS applications to vehicle drivers and/or passengers, and may require an interface for accessing in-vehicle data from the in-vehicle network or in-vehicle system. For deployment and performances needs, specific instances of a V-ITS-S may contain groupings of Applications and/or Facilities.

The facilities layer comprises middleware, software connectors, software glue, or the like, comprising multiple facility layer functions (or simply a "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. Example facilities include Cooperative Awareness Services, Collective Perception Services, Device Data Provider (DDP), Position and Time management (POTI), Local Dynamic Map (LDM), collaborative awareness basic service (CABS) and/or cooperative awareness basic service (CABS), signal phase and timing service (SPATS), vulnerable road user basic service (VRUBS), Decentralized Environmental Notification (DEN) basic service, maneuver coordination services (MCS), and/or the like. For a vehicle ITS-S, the DDP is connected with the in-vehicle network and provides the vehicle state information. The POTI entity provides the position of the ITS-S and time information. A list of the common facilities is given by ETSI TS 102 894-1 V1.1.1 (2013-08) (hereinafter "[TS102894-1]").

Each of the aforementioned interfaces/Service Access Points (SAPs) may provide the full duplex exchange of data with the facilities layer, and may implement suitable APIs to enable communication between the various entities/elements.

For a vehicle ITS-S, the facilities layer is connected to an in-vehicle network via an in-vehicle data gateway as shown and described in [TS102894-1]. The facilities and applications of a vehicle ITS-S receive required in-vehicle data from the data gateway in order to construct messages (e.g., CSMs, VAMs, CAMs, DENMs, MCMs, and/or CPMs) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity. The encode CAM/DENM entity constructs (encodes) CAMs/DENMs to include various, the object list may include a list of DEs and/or DFs included in an ITS data dictionary.

The ITS station type/capabilities facility provides information to describe a profile of an ITS-S to be used in the applications and facilities layers. This profile indicates the ITS-S type (e.g., vehicle ITS-S, road side ITS-S, personal ITS-S, or central ITS-S), a role of the ITS-S, and detection capabilities and status (e.g., the ITS-S's positioning capabilities, sensing capabilities, etc.). The station type/capabilities facility may store sensor capabilities of various connected/coupled sensors and sensor data obtained from such sensors.

The Position and Time management entity (PoTi) manages the position and time information for use by ITS applications, facility, network, management, and security layers. For this purpose, the PoTi gets information from sub-system entities such as GNSS, sensors and other sub-system of the ITS-S. The PoTi ensures ITS time synchronicity between ITS-Ss in an ITS constellation, maintains the data quality (e.g., by monitoring time deviation), and manages updates of the position (e.g., kinematic and attitude state) and time. An ITS constellation is a group of ITS-S's that are exchanging ITS data among themselves. The PoTi entity may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS application requirements in terms of position and time accuracy, PoTi may use augmentation services to improve the position and time accuracy. Various augmentation methods may be applied. PoTi may support these augmentation services by providing messages services broadcasting augmentation data. For instance, a roadside ITS-S may broadcast correction information for GNSS to oncoming vehicle ITS-S; ITS-Ss may exchange raw GPS data or may exchange terrestrial radio position and time relevant information. PoTi maintains and provides the position and time reference information according to the application and facility and other layer service requirements in the ITS-S. In the context of ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body. In addition to the kinematic and attitude state, PoTi should also maintain information on the confidence of the kinematic and attitude state variables.

FIG. 20 shows the VRU-specific functionality, including interfaces mapped to the ITS-S architecture. The VRU-specific functionality is centered around the VRU Basic Service (VRUBS) located in the facilities layer, which consumes data from other facility layer services such as the Position and Time management (POTI), Local Dynamic Map (LDM), Data Provider, etc. The POTI entity provides the position of the ITS-S and time information. The LDM is a database in the ITS-S, which in addition to on-board sensor data may be updated with received CAM and CPM data (see e.g., ETSI TR 102 863 v1.1.1 (2011-06)). Message dissemination-specific information related to the current channel utilization are received by interfacing with the DCC-Fac entity. The DCC-FAC provides access network congestion information to the VRU Basic Service.

The VRU Basic Service is also linked with other entities such as application support facilities including, for example, the collaborative/cooperative awareness basic service (CABS), signal phase and timing service (SPATS), Decentralized Environmental Notification (DEN) service, Collective Perception Service (CPS), Maneuver Coordination Service (MCS), Infrastructure service, etc. The VRU basic service is responsible for transmitting the VAMs, identifying whether the VRU is part of a cluster, and enabling the assessment of a potential risk of collision. The VRU Basic Service may also interact with a VRU profile management entity in the management layer to VRU-related purposes.

The VRUBS interfaces through the Network-Transport/Facilities (NF)-Service Access Point (SAP) with the N&T for exchanging of CPMs with other ITS-Ss. The VRUBS interfaces through the Security-Facilities (SF)-SAP with the Security entity to access security services for VAM transmission and VAM reception. The VRUBS interfaces through the Management-Facilities (MF)-SAP with the Management entity and through the Facilities-Application (FA)-SAP with the application layer if received VAM data is provided directly to the applications. Each of the aforementioned interfaces/SAPs may provide the full duplex exchange of data with the facilities layer, and may implement suitable APIs to enable communication between the various entities/elements.

In some embodiments, the embodiments discussed herein may be implemented in or by the VRUBS. In particular, the VRUBS module/entity may reside or operate in the facilities layer, generates VAMs, checks related services/messages to coordinate transmission of VAMs in conjunction with other ITS service messages generated by other facilities and/or other entities within the ITS-S, which are then passed to the N&T and access layers for transmission to other proximate ITS-Ss. In embodiments, the VAMs are included in ITS packets, which are facilities layer PDUs that may be passed to the access layer via the N&T layer or passed to the application layer for consumption by one or more ITS applications. In this way, VAM format is agnostic to the underlying access layer and is designed to allow VAMs to be shared regardless of the underlying access technology/RAT.

The application layer recommends a possible distribution of functional entities that would be involved in the protection of VRUs 116, based on the analysis of VRU use cases. The application layer also includes device role setting, infrastructure services, maneuver coordination, cooperative perception, remote sensor data fusion, collision risk analysis, collision risk avoidance, and event detection entities.

The device role setting module takes the configuration parameter settings and user preference settings and enables/disables different VRU profiles depending on the parameter settings, user preference settings, and/or other data (e.g., sensor data and the like). A VRU can be equipped with a portable device which needs to be initially configured and may evolve during its operation following context changes which need to be specified. This is particularly true for the setting-up of the VRU profile and type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx (a VRU only with the communication capability to broadcast messages complying with the channel congestion control rules); VRU-Rx (a VRU only communication capability to receive messages); and VRU-St (a VRU with full duplex (Tx and Rx) communication capabilities). During operation the VRU profile may also change due to some clustering or de-assembly. Consequently, the VRU device role will be able to evolve according to the VRU profile changes The infrastructure services module is responsible for launching new VRU instantiations, collecting usage data, and/or consuming services from infrastructure stations. Existing infrastructure services such as those described below can be used in the context of the VRU basic service:

The broadcast of the SPAT (Signal Phase And Timing) & MAP (SPAT relevance delimited area) is already standardized and used by vehicles at intersection level. In principle they protect VRUs 116 crossing. However, signal violation warnings may exist and can be detected and signaled using DENM. This signal violation indication using DENMs is very relevant to VRU devices as indicating an increase of the collision risk with the vehicle which violates the signal. If it uses local captors or detects and analyses VAMs, the traffic light controller may delay the red phase change to green and allow the VRU to safely terminate its road crossing.

The contextual speed limit using IVI (In Vehicle Information) can be adapted when a large cluster of VRUs 116 is detected (ex: limiting the vehicles' speed to 30 km/hour). At such reduced speed a vehicle may act efficiently when perceiving the VRUs 116 by means of its own local perception system Remote sensor data fusion and actuator applications/functions (including ML/AI) is also included in some implementations. The local perception data obtained by the computation of data collected by local sensors may be augmented by remote data collected by elements of the VRU system (e.g., vehicles 110, RSE 130) via the ITS-S. These remote data are transferred using standard services such as the CPS and/or the like. In such case it may be necessary to fuse these data. In some implementations, the data fusion may provide at least three possible results: (i) After a data consistency check, the received remote data are not coherent with the local data, wherein the system element has to decide which source of data can be trusted and ignore the other; (ii) only one input is available (e.g. the remote data) which means that the other source does not have the possibility to provide information, wherein the system element may trust the only available source; and (iii) after a data consistency check, the two sources are providing coherent data which augment the individual inputs provided. The use of ML/AI may be necessary to recognize and classify the detected objects (e.g., VRU, motorcycle, type of vehicle, etc.) but also their associated dynamics. The AI can be located in any element of the VRU system. The same approach is applicable to actuators, but in this case, the actuators are the destination of the data fusion.

Collective perception (CP) involves ITS-Ss sharing information about their current environments with one another. An ITS-S participating in CP broadcasts information about its current (e.g., driving) environment rather than about itself. For this purpose, CP involves different ITS-Ss actively exchanging locally perceived objects (e.g., other road participants and VRUs 116, obstacles, and the like) detected by local perception sensors by means of one or more V2X RATs. In some implementations, CP includes a perception chain that can be the fusion of results of several perception functions at predefined times. These perception functions may include local perception and remote perception functions The local perception is provided by the collection of information from the environment of the considered ITS element (e.g., VRU device, vehicle, infrastructure, etc.). This information collection is achieved using relevant sensors (optical camera, thermal camera, radar, LIDAR, etc.). The remote perception is provided by the provision of perception data via C-ITS (mainly V2X communication). Existing basic services like the Cooperative Awareness (CA) or more recent services such as the Collective Perception Service (CPS) can be used to transfer a remote perception.

Several perception sources may then be used to achieve the cooperative perception function. The consistency of these sources may be verified at predefined instants, and if not consistent, the CP function may select the best one according to the confidence level associated with each perception variable. The result of the CP should comply with the required level of accuracy as specified by PoTi. The associated confidence level may be necessary to build the CP resulting from the fusion in case of differences between the local perception and the remote perception. It may also be necessary for the exploitation by other functions (e.g. risk analysis) of the CP result.

The perception functions from the device local sensors processing to the end result at the cooperative perception level may present a significant latency time of several hundred milliseconds. For the characterization of a VRU trajectory and its velocity evolution, there is a need for a certain number of the vehicle position measurements and velocity measurements thus increasing the overall latency time of the perception. Consequently, it is necessary to estimate the overall latency time of this function to take it into account when selecting a collision avoidance strategy The collision risk analysis function analyses the motion dynamic prediction of the considered moving objects associated to their respective levels of confidence (reliability). The objective is to estimate the likelihood of a collision and then to identify as precisely as possible the Time To Collision (TTC) if the resulting likelihood is high. Other variables may be used to compute this estimation.

Two or more considered moving objects follow trajectories which intersect somewhere at a position which can be called "potential conflict point". If the moving objects maintain their motion dynamics (e.g., approaches, trajectories, speeds, etc.) it is possible to predict that they will collide at a given time which can be estimated through the computation of the time (referred to as Time To Collision (TTC)) necessary for them to arrive simultaneously at the level of the identified potential conflict point. The TTC is a calculated data element enabling the selection of the nature and urgency of a collision avoidance action to be undertaken.

A TTC prediction may only be reliably established when the VRU 116 enters a collision risk area. This is due to the uncertainty nature of the VRU pedestrian motion dynamic (mainly its trajectory) before deciding to cross the road. At the potential conflict point level, another measurement, the 'time difference for pedestrian and vehicle travelling to the potential conflict point' (TDTC) can be used to estimate the collision risk level. For example, if it is not acted on the motion dynamic of the pedestrian or/and on the motion dynamic of the vehicle, TDTC is equal to 0 and the collision is certain. Increasing the TDTC reduces the risk of collision between the VRU and the vehicle. The potential conflict point is in the middle of the collision risk area which can be defined according to the lane width (e.g. 3.5 m) and vehicle width (maximum 2 m for passenger cars).

The TTC is one of the variables that can be used to define a collision avoidance strategy and the operational collision avoidance actions to be undertaken. Other variables may be considered such as the road state, the weather conditions, the triple of {Longitudinal Distance (LoD), Lateral Distance (LaD), Vertical Distance (VD)} along with the corresponding threshold triple of {MSLaD, MSLoD, MSVD}, Trajectory Interception Indicator (TII), and the mobile objects capabilities to react to a collision risk and avoid a collision. The TII is an indicator of the likelihood that the VRU 116 and one or more other VRUs 116, non-VRUs, or even objects on the road are going to collide.

In various embodiments, the collision risk analysis function compares LaD, LoD and VD, with their respective predefined thresholds, MSLaD, MSLoD, MSVD, respectively, if all the three metrics are simultaneously less than their respective thresholds, that is LaD<MSLaD, LoD<MSLoD, VD<MSVD, then the collision avoidance actions would be initiated. Those thresholds could be set and updated periodically or dynamically depending on the speed, acceleration, type, and loading of the vehicles and VRUs 116, and environment and weather conditions. On the other hand, the TII reflects how likely is the ego-VRU ITS-S 117 trajectory going to be intercepted by the neighboring ITSs (other VRUs 116 and/or non-VRU ITSs such as vehicles 110).

The likelihood of a collision associated with the TTC may also be used as a triggering condition for the broadcast of messages (e.g. an infrastructure element getting a complete perception of the situation may broadcast DENM, IVI (contextual speed limit), CPM or MCM).

The collision risk avoidance function/application includes the collision avoidance strategy to be selected according to the TTC value. In the case of an autonomous vehicle, collision risk avoidance function may involve the identification of maneuver coordination/vehicle motion control to achieve the collision avoidance as per the likelihood of VRU trajectory interception with other road users captured by TII and Maneuver Identifier (MI) as discussed infra.

The collision avoidance strategy may consider several environmental conditions such as visibility conditions related to the local weather, vehicle stability conditions related to the road state (e.g. slippery), and vehicle braking capabilities. The vehicle collision avoidance strategy then needs to consider the action capabilities of the VRU according to its profile, the remaining TTC, the road and weather conditions as well as the vehicle autonomous action capabilities. The collision avoidance actions may be implemented using maneuver coordination (and related maneuver coordination message (MCM) exchange) as done in the French PAC V2X project or other like systems.

In one example, when in good conditions, it is possible to trigger a collision avoidance action when the TTC is greater than two seconds (one second for the driver reaction time and one second to achieve the collision avoidance action). Below two seconds, the vehicle can be considered to be in a "pre-crash" situation and so it needs to trigger a mitigation action to reduce the severity of the collision impact for the VRU.

Road infrastructure elements (e.g., RSE 130) may also include a collision risk analysis function as well as a collision risk avoidance function. In these embodiments, these functions may indicate collision avoidance actions to the neighboring VRUs 117 and vehicles 110. The road infrastructure may offer services to support the road crossing by VRU such as traffic lights. When a VRU starts crossing a road at a traffic light level authorizing him, the traffic light should not change of phase as long as the VRU has not completed its crossing. Accordingly, the VAM should contain data elements enabling the traffic light to determine the end of the road crossing by the VRU.

The maneuver coordination function executes the collision avoidance actions which are associated with the collision avoidance strategy that has been decided (and selected). This function should be present at the vehicle level, depending also on the vehicle level of automation (i.e. not present in non-automated vehicles), and may be present at the VRU device level according to the VRU profile. At the vehicle level, this function interfaces the vehicle electronics controlling the vehicle dynamic state in terms of heading and velocity. At the VRU device level, this function may interface the HMI support function, according to the VRU profile, to be able to issue a warning or alert to the VRU according to the TTC.

Maneuver coordination can be proposed to vehicles from an infrastructure element, which may be able to obtain a better perception of the motion dynamics of the involved moving objects, by means of its own sensors or by the fusion of their data with the remote perception obtained from standard messages such as CAMs.

The maneuver coordination at the VRU 116 may be enabled by sharing among the ego-VRU and the neighboring ITSs, first the TII reflecting how likely is the ego-VRU ITS-S trajectory going to be intercepted by the neighboring ITSs (other VRU or non-VRU ITSs such as vehicles), and second a Maneuver Identifier (MI) to indicate the type of VRU maneuvering needed. An MI is an identifier of a maneuver (to be) used in a maneuver coordination service (MCS). The choice of maneuver may be generated locally based on the available sensor data at the VRU ITS-S 117 and may be shared with neighboring ITS-S (e.g., other VRUs 116 and/or non-VRUs) in the vicinity of the ego VRU ITS-S 117 to initiate a joint maneuver coordination among VRUs 116.

Depending upon the analysis of the scene in terms of the sensory as well as shared inputs, simple TII ranges can be defined to indicate the likelihood of the ego-VRU's 116 path to be intercepted by another entity. Such indication helps to trigger timely maneuvering. For instance, TII could be defined in terms of TII index that may simply indicate the chances of potential trajectory interception (low, medium, high or very high) for collision risk analysis. If there are multiple other entities, the TII may be indicated for the specific entity differentiable via a simple ID which depends upon the simultaneous number of entities in the vicinity at that time. The vicinity could even be just one cluster that the current VRU is located in. For example, the minimum number of entities or users in a cluster is 50 per cluster (worst case). However, the set of users that may have the potential to collide with the VRU could be much less than 50 thus possible to indicate via few bits in say, VAM.

On the other hand, the MI parameter can be helpful in collision risk avoidance by triggering/suggesting the type of maneuver action needed at the VRUs. The number of such possible maneuver actions may be only a few. For simplicity, it could also define as the possible actions to choose from as {longitudinal trajectory change maneuvering, lateral trajectory change maneuvering, heading change maneuvering or emergency braking/deceleration} in order to avoid potential collision indicated by the TII. In various embodiments, the TII and MI parameters can also be exchanged via inclusion in part of VRU Awareness Message (VAM) data field structure.

The event detection function assists the VRU basic service during its operation when transitioning from one state to another. Examples of the events to be considered include: change of a VRU role when a road user becomes vulnerable (activation) or when a road user is not any more vulnerable (de-activation); change of a VRU profile when a VRU enters a cluster with other VRU(s) or with a new mechanical element (bicycle, scooter, moto, etc.), or when a VRU cluster is disassembling; risk of collision between one or several VRU(s) and at least one other VRU (using a VRU vehicle) or a vehicle (such event is detected via the perception capabilities of the VRU system); change of the VRU motion dynamic (trajectory or velocity) which will impact the TTC and the reliability of the previous prediction; and change of the status of a road infrastructure piece of equipment (e.g. a traffic light phase) impacting the VRU movements.

Figure 21:
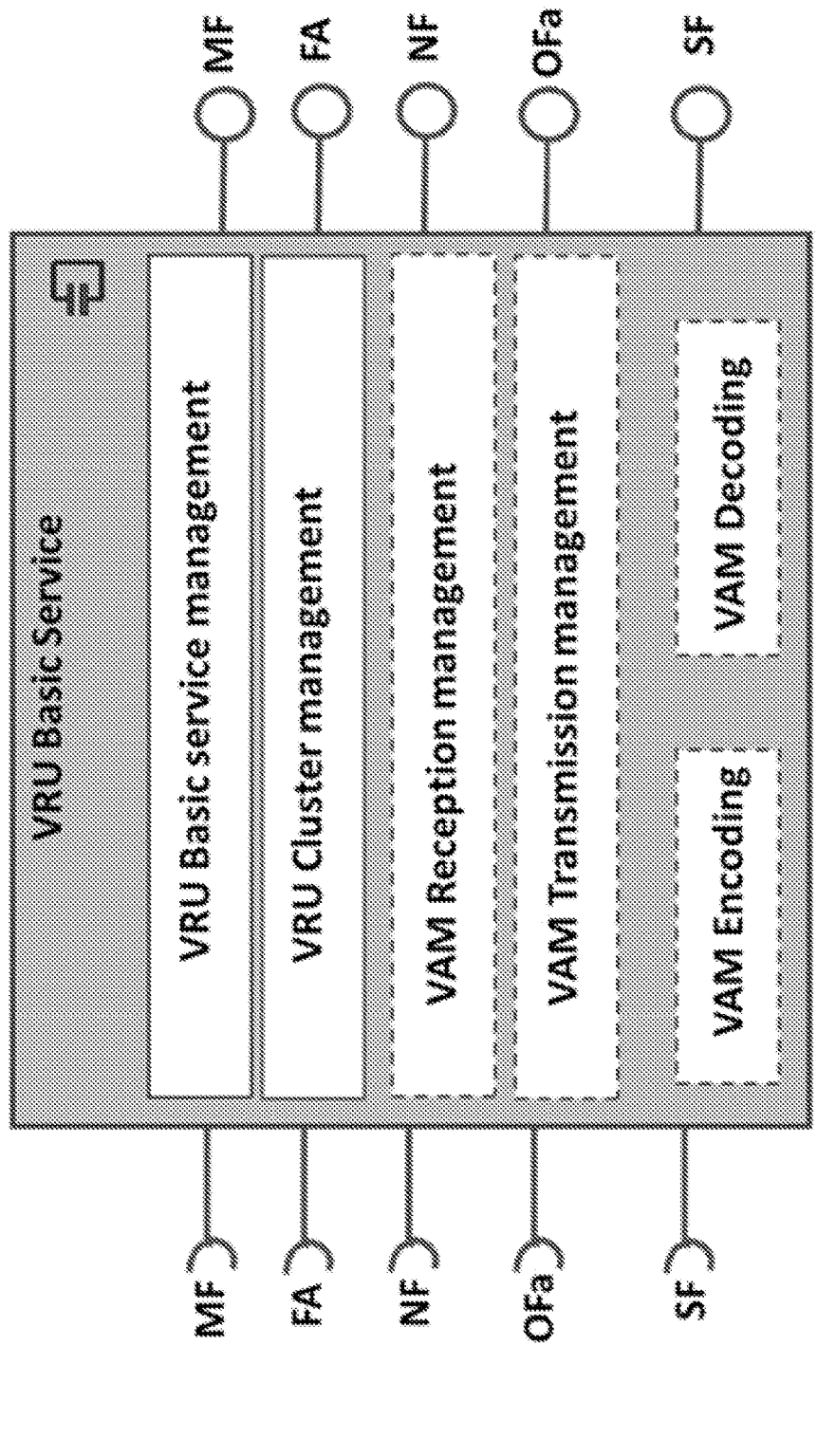
FIG. 21 depicts an example VRU basic service functional model according to various embodiments.

FIG. 21 shows an example VRU basic service functional model according to various embodiments, which includes a VRU basic service management function, a VRU cluster management function, a VAM reception management function, a VAM transmission management function, VAM encoding function, and VAM decoding function. The presence of some or all of these functions depends on the VRU equipment type (e.g., VRU-Tx, VRU-Rx, or VRU-St), and may vary from embodiment to embodiment.

The VRU basic service management function executes the following operations: store the assigned ITS AID and the assigned Network Port to use for the VRU Basic service; store the VRU configuration received at initialization time or updated later for the coding of VAM data elements; receive information from and transmit information to the HMI; activate/deactivate the VAM transmission service according to the device role parameter (for example, the service is deactivated when a pedestrian enters a bus); and manage the triggering conditions of VAM transmission in relation to the area or network congestion control. For example, after activation of a new cluster, it may be decided to stop the transmission of element(s) of the cluster.

The VRU cluster management function performs the following operations: detect if the associated VRU can be the leader of a cluster; compute and store the cluster parameters at activation time for the coding of VAM data elements specific to the cluster; manage the state machine associated to the VRU according to detected cluster events (see e.g., state machines examples provided in section 6.2.4 of [2]); and activate or de-activate the broadcasting of the VAMs or other standard messages (e.g., DENMs) according to the state and types of associated VRU.

The VAM reception management function performs the following operations after VAM messages decoding: check the relevance of the received message according to its current mobility characteristics and state; check the consistency, plausibility and integrity (see the liaison with security protocols) of the received message semantic; and destroy or store the received message data elements in the LDM according to previous operations results.

The VAM Transmission management function is only available at the VRU device level, not at the level of other ITS elements such as vehicle or RSE. Even at the VRU device level, this function may not be present depending on its initial configuration (see device role setting function). The VAM transmission management function performs the following operations upon request of the VRU basic service management function: assemble the message data elements in conformity to the message standard specification; and send the constructed VAM to the VAM encoding function. The VAM encoding function encodes the Data Elements provided by the VAM transmission management function in conformity with the VAM specification. The VAM encoding function is available only if the VAM transmission management function is available.

The VAM decoding function extracts the relevant Data Elements contained in the received message. These data elements are then communicated to the VAM reception management function. The VAM decoding function is available only if the VAM reception management function is available.

A VRU may be configured with a VRU profile. VRU profiles are the basis for the further definition of the VRU functional architecture. The profiles are derived from the various use cases discussed herein. VRUs usually refers to living beings. A living being is considered to be a VRU only when it is in the context of a safety related traffic environment. For example, a living being in a house is not a VRU until it is in the vicinity of a street (e.g., 2m or 3m), at which point, it is part of the safety related context. This allows the amount of communications to be limited, for example, a C-ITS communications device need only start to act as a VRU-ITS-S when the living being associated with it starts acting in the role of a VRU.

A VRU can be equipped with a portable device. The term "VRU" may be used to refer to both a VRU and its VRU device unless the context dictates otherwise. The VRU device may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

The following profile classification parameters may be used to classify different VRUs 116:

Maximum and average (e.g., typical) speed values (e.g., may be with its standard deviation).

Minimum and average (e.g., typical) communication range, The communication range may be calculated based on the assumption that an awareness time of 5 seconds is needed to warn/act on the traffic participants.

Environment or type of area (e.g., urban, sub-urban, rural, highway, etc.).

Average Weight and standard deviation.

directivity/trajectory ambiguity (give the level of confidence in the predictability of the behavior of the VRU in its movements).

Cluster size: Number of VRUs in the cluster. A VRU may be leading a cluster and then indicate its size. In such case, the leading VRU can be positioned as serving as the reference position of the cluster.

These profile parameters are not dynamic parameters maintained in internal tables, but indications of typical values to be used to classify the VRUs 116 and evaluate the behavior of a VRU 116 belonging to a specific profile. Example VRU profiles may be as follows:

VRU Profile 1—Pedestrian. VRUs in this profile may include any road users not using a mechanical device, and includes, for example, pedestrians on a pavement, children, prams, disabled persons, blind persons guided by a dog, elderly persons, riders off their bikes, and the like.

VRU Profile 2—Bicyclist. VRUs in this profile may include bicyclists and similar light vehicle riders, possibly with an electric engine. This VRU profile includes bicyclists, and also unicycles, wheelchair users, horses carrying a rider, skaters, e-scooters, Segway's, etc. It should be noted that the light vehicle itself does not represent a VRU, but only in combination with a person creates the VRU.

VRU Profile 3—Motorcyclist. VRUs in this profile may include motorcyclists, which are equipped with engines that allow them to move on the road. This profile includes users (e.g., driver and passengers, e.g., children and animals) of Powered Two Wheelers (PTW) such as mopeds (motorized scooters), motorcycles or side-cars, and may also include four-wheeled all-terrain vehicles (ATVs), snowmobiles (or snow machines), jet skis for marine environments, and/or other like powered vehicles.

VRU Profile 4—Animals presenting a safety risk to other road users. VRUs in this profile may include dogs, wild animals, horses, cows, sheep, etc. Some of these VRUs might have their own ITS-S (e.g., dog in a city or a horse) or some other type of device (e.g., GPS module in dog collar, implanted RFID tags, etc.), but most of the VRUs in this profile will only be indirectly detected (e.g., wild animals in rural areas and highway situations). Clusters of animal VRUs might be herds of animals, like a herd of sheep, cows, or wild boars. This profile has a lower priority when decisions have to be taken to protect a VRU.

Point-to-multipoint communication as discussed in ETSI EN 302 636-4-1 v 1.3.1 (2017-08) (hereinafter "[EN302634-4-1]"), ETSI EN 302 636-3 v1.1.2 (2014-03) (hereinafter "[EN302636-3]") may be used for transmitting VAMs, as specified in ETSI TS 103 300-3 V0.1.11 (2020-05) (hereinafter "PS103300-31").

Frequency/Periodicity range of VAMs. A VAM generation event results in the generation of one VAM. The minimum time elapsed between the start of consecutive VAM generation events are equal to or larger than T_GenVam. T_GenVam is limited to T_GenVamMin≤T_GenVam≤T_GenVamMax, where T_GenVamMin and T_GenVamMax are specified in Table 11 (Section 8). When a cluster VAM is transmitted, the T_GenVam could be smaller than that of individual VAM.

In case of ITS-G5, T_GenVam is managed according to the channel usage requirements of Decentralized Congestion Control (DCC) as specified in ETSI TS 103 175. The parameter T_GenVam is provided by the VBS management entity in the unit of milliseconds. If the management entity provides this parameter with a value above T_GenVamMax, T_GenVam is set to T_GenVamMax and if the value is below T_GenVamMin or if this parameter is not provided, the T_GenVam is set to T_GenVamMin. The parameter T_GenVam represents the currently valid lower limit for the time elapsed between consecutive VAM generation events.

In case of C-V2X PCS, T_GenVam is managed in accordance to the congestion control mechanism defined by the access layer in ETSI TS 103 574.

Triggering conditions. Individual VAM Transmission Management by VBS at VRU-ITS-S. First time individual VAM is generated immediately or at earliest time for transmission if any of the following conditions is satisfied and the individual VAM transmission does not subject to redundancy mitigation techniques:

1. A VRU 116 is in VRU-IDLE VBS State and has entered VRU-ACTIVE-STANDALONE
2. A VRU 116 is in VRU-PASSIVE VBS State; has decided to leave the cluster and enter VRU-ACTIVE-STANDALONE VBS State
3. A VRU 116 is in VRU-PASSIVE VBS State; VRU has determined that one or more new vehicles or other VRUs (e.g., VRU Profile 3—Motorcyclist) have come closer than minimum safe lateral distance (MSLaD) laterally, closer than minimum safe longitudinal distance (MSLoD) longitudinally and closer than minimum safe vertical distance (MSVD) vertically; and has determined to leave cluster and enter VRU-ACTIVE-STANDALONE VBS State in order to transmit immediate VAM
4. A VRU 116 is in VRU-PASSIVE VBS State; has determined that VRU Cluster leader is lost and has decided to enter VRU-ACTIVE-STANDALONE VBS State
5. A VRU 116 is in VRU-ACTIVE-CLUSTERLEADER VBS State; has determined breaking up the cluster and has transmitted VRU Cluster VAM with disband indication; and has decided to enter VRU-ACTIVE-STANDALONE VBS State Consecutive VAM Transmission is contingent to conditions as described here. Consecutive individual VAM generation events occurs at an interval equal to or larger than T_GenVam. An individual VAM is generated for transmission as part of a generation event if the originating VRU-ITS-S 117 is still in VBS VRU-ACTIVE-STANDALONE VBS State, any of the following conditions is satisfied and individual VAM transmission does not subject to redundancy mitigation techniques:

1. The time elapsed since the last time the individual VAM was transmitted exceeds T_GenVamMax
2. The Euclidian absolute distance between the current estimated position of the reference point of the VRU and the estimated position of the reference point lastly included in an individual VAM exceeds a pre-defined Threshold minReferencePointPositionChangeThreshold
3. The difference between the current estimated ground speed of the reference point of the VRU 116 and the estimated absolute speed of the reference point of the VRU lastly included in an individual VAM exceeds a pre-defined Threshold minGroundSpeedChangeThreshold
4. The difference between the orientation of the vector of the current estimated ground velocity of the reference point of the VRU 116 and the estimated orientation of the vector of the ground velocity of the reference point of the VRU 116 lastly included in an individual VAM exceeds a pre-defined Threshold minGroundVelocityOrientationChangeThreshold
5. The difference between the current estimated collision probability with vehicle(s) or other VRU(s) 116 (e.g., as measured by Trajectory Interception Probability) and the estimated collision probability with vehicle(s) or other VRU(s) 116 lastly reported in an individual VAM exceeds a pre-defined Threshold minCollisionProbabilityChangeThreshold
6. The originating ITS-S is a VRU in VRU-ACTIVE-STANDALONE VBS State and has decided to join a Cluster after its previous individual VAM transmission
7. A VRU 116 has determined that one or more new vehicles or other VRUs 116 have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically.

VRU cluster VAM transmission management by VBS at VRU-ITS-S. First time VRU cluster VAM is generated immediately or at earliest time for transmission if any of the following conditions is satisfied and the VRU cluster VAM transmission does not subject to redundancy mitigation techniques: A VRU 116 in VRU-ACTIVE-STANDALONE VBS State determines to form a VRU cluster.

Consecutive VRU cluster VAM Transmission is contingent to conditions as described here. Consecutive VRU cluster VAM generation events occurs at cluster leader at an interval equal to or larger than T_GenVam. A VRU cluster VAM is generated for transmission by the cluster leader as part of a generation event if any of the following conditions is satisfied and VRU cluster VAM transmission does not subject to redundancy mitigation techniques:

1. The time elapsed since the last time the VRU cluster VAM was transmitted exceeds T_GenVamMax.
2. The Euclidian absolute distance between the current estimated position of the reference point of the VRU cluster and the estimated position of the reference point lastly included in a VRU cluster VAM exceeds a pre-defined Threshold minReferencePointPositionChangeThreshold.
3. The difference between the current estimated Width of the cluster and the estimated Width included in the lastly transmitted VAM exceeds a pre-defined Threshold minClusterWidthChangeThreshold.
4. The difference between the current estimated Length of the cluster and the estimated Length included in the lastly transmitted VAM exceeds a pre-defined Threshold minClusterLengthChangeThreshold.
5. The difference between the current estimated ground speed of the reference point of the VRU cluster and the estimated absolute speed of the reference point lastly included a VRU cluster VAM exceeds a pre-defined Threshold minGroundSpeedChangeThreshold.
6. The difference between the orientation of the vector of the current estimated ground velocity of the reference point of the VRU cluster and the estimated orientation of the vector of the ground velocity of the reference point lastly included in a VRU cluster VAM exceeds a pre-defined Threshold minGroundVelocityOrientationChangeThreshold.
7. The difference between the current estimated probability of collision of the VRU cluster with vehicle(s) or other VRU(s) (e.g., as measured by Trajectory Interception Probability of other vehicles/VRUs with cluster Bounding Area) and the estimated collision probability with vehicle(s) or other VRU(s) lastly reported in a VAM exceeds minCollisionProbabilityChangeThreshold.
8. VRU cluster type has been changed (e.g. from homogeneous to heterogeneous cluster or vice versa) after previous VAM generation event.
9. Cluster leader has determined to break up the cluster after transmission of previous VRU cluster VAM.
10. More than a pre-defined number of new VRUs has joined the VRU cluster after transmission of previous VRU cluster VAM.
11. More than a pre-defined number of members has left the VRU cluster after transmission of previous VRU cluster VAM.
12. VRU in VRU-ACTIVE-CLUSTERLEADER VBS State has determined that one or more new vehicles or non-member VRUs (e.g., VRU Profile 3—Motorcyclist) have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically to the cluster bounding box.

VAM Redundancy Mitigation. A balance between Frequency of VAM generation at facilities layer and communication overhead at access layer is considered without impacting VRU safety and VRU awareness in the proximity. VAM transmission at a VAM generation event may subject to the following redundancy mitigation techniques:

An originating VRU-ITS-S 117 skips current individual VAM if all the following conditions are satisfied simultaneously. The time elapsed since the last time VAM was transmitted by originating VRU-ITS-S 117 does not exceed N (e.g., 4) times T_GenVamMax; The Euclidian absolute distance between the current estimated position of the reference point and the estimated position of the reference point in the received VAM is less than minReferencePointPositionChangeThreshold; The difference between the current estimated speed of the reference point and the estimated absolute speed of the reference point in received VAM is less than minGroundSpeedChangeThreshold; and The difference between the orientation of the vector of the current estimated ground velocity and the estimated orientation of the vector of the ground velocity of the reference point in the received VAM is less than minGroundVelocityOrientationChangeThreshold.

Or one of the following conditions are satisfied: VRU 116 consults appropriate maps to verify if the VRU 116 is in protected or non-drivable areas such as buildings, etc.; VRU is in a geographical area designated as a pedestrian only zone. Only VRU profiles 1 and 4 allowed in the area; VRU 116 considers itself as a member of a VRU cluster and cluster break up message has not been received from the cluster leader; the information about the ego-VRU 116 has been reported by another ITS-S within T_GenVam VAM generation time. Besides the VAM generation frequency, the time required for the VAM generation and the timeliness of the data taken for the message construction are decisive for the applicability of data in the receiving ITS-Ss. In order to ensure proper interpretation of received VAMs, each VAM is timestamped. An acceptable time synchronization between the different ITS-Ss is expected and it is out of scope for this specification. The time required for a VAM generation is less than T AssembleVAM. The time required for a VAM generation refers to the time difference between time at which a VAM generation is triggered and the time at which the VAM is delivered to the N&T layer.

VAM timestamp. The reference timestamp provided in a VAM disseminated by an ITS-S corresponds to the time at which the reference position provided in BasicContainer DF is determined by the originating ITS-S. The format and range of the timestamp is defined in clause B.3 of ETSI EN 302 637-2 V1.4.1 (2019-04) (hereinafter "[EN302637-2]"). The difference between VAM generation time and reference timestamp is less than 32 767 ms as in [EN302637-2]. This may help avoid timestamp wrap-around complications.

Transmitting VAMs. VRU-ITS-S 117 in VRU-ACTIVE-STANDALONE state sends 'individual VAMs', while VRU-ITS-S in VRU-ACTIVE-CLUSTERLEADER VBS state transmits 'Cluster VAMs' on behalf of the VRU cluster. Cluster member VRU-ITS-S 117 in VRU-PASSIVE VBS State sends individual VAMs containing VruClusterOperationContainer while leaving the VRU cluster. VRU-ITS-S 117 in VRU-ACTIVE-STANDALONE sends VAM as 'individual VAM' containing VruClusterOperationContainer while joining the VRU cluster Referring back to FIG. 20, the N&T layer provides functionality of the OSI network layer and the OSI transport layer and includes one or more networking protocols, one or more transport protocols, and network and transport layer management. Additionally, aspects of sensor interfaces and communication interfaces may be part of the N&T and access layers. The networking protocols may include, inter alia, IPv4, IPv6, IPv6 networking with mobility support, IPv6 over GeoNetworking, the CALM FAST protocol, and/ or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol.

The access layer includes a physical layer (PHY) connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used in various other embodiments.

Figure 24:
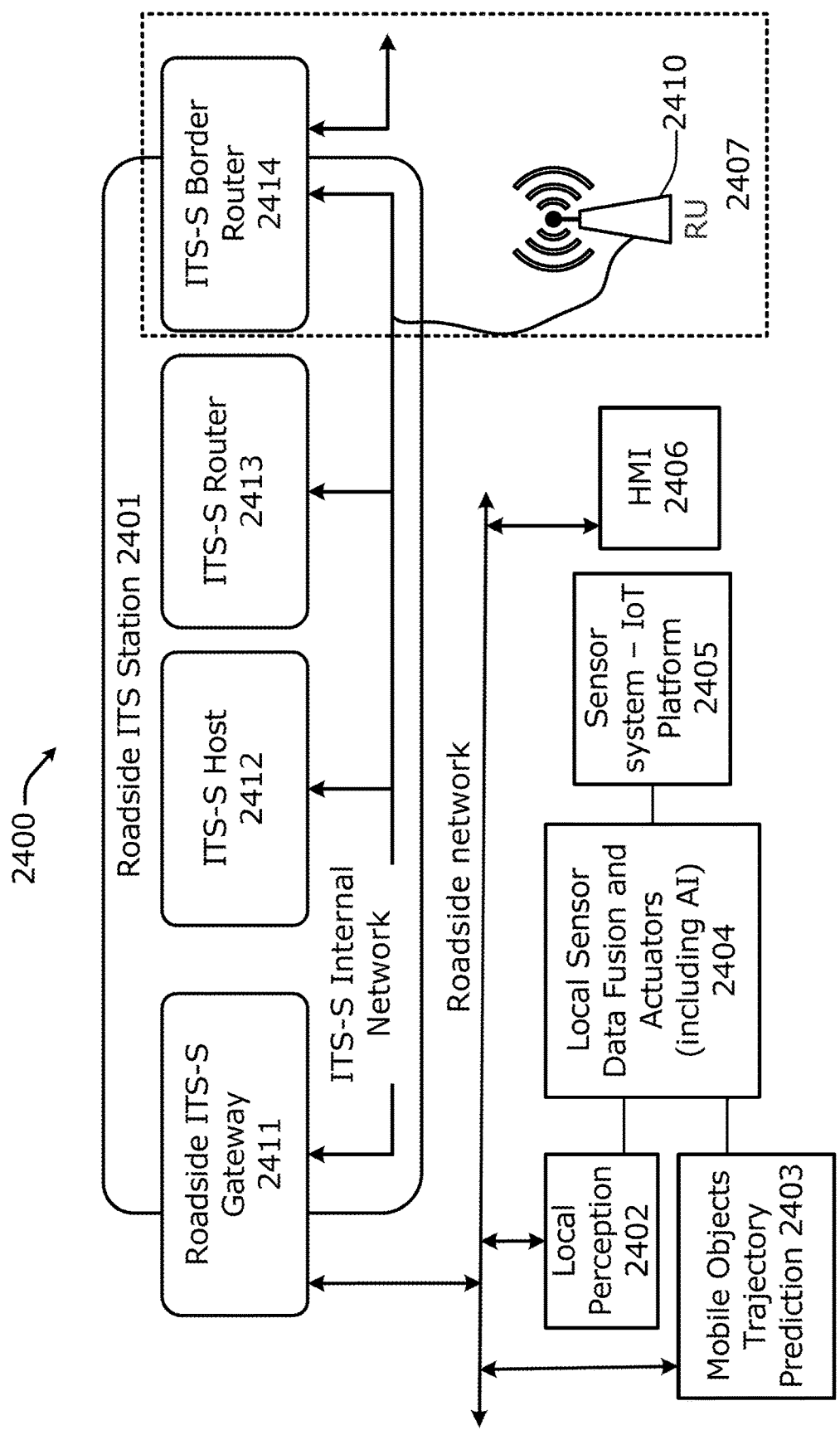
FIG. 24 depicts an example roadside ITS-S in a roadside infrastructure node according to various embodiments.

The ITS-S reference architecture 2000 may be applicable to the elements of FIGS. 22 and 24. The ITS-S gateway 2211, 2411 (see e.g., FIGS. 22 and 24) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 2211, 2411 (see e.g., FIGS. 22 and 24) is capable of converting protocols. This allows an ITS-S to communicate with external elements of the system in which it is implemented. The ITS-S router 2211, 2411 provides the functionality the ITS-S reference architecture 2000 excluding the Applications and Facilities layers. The ITS-S router 2211, 2411 interconnects two different ITS protocol stacks at layer 3. The ITS-S router 2211, 2411 may be capable to convert protocols. One of these protocol stacks typically is connected to the ITS station-internal network. The ITS-S border router 2414 (see e.g., FIG. 24) provides the same functionality as the ITS-S router 2211, 2411, but includes a protocol stack related to an external network that may not follow the management and security principles of ITS (e.g., the ITS Mgmnt and ITS Security layers in FIG. 20).

Additionally, other entities that operate at the same level but are not included in the ITS-S include the relevant users at that level, the relevant HMI (e.g., audio devices, display/touchscreen devices, etc.); when the ITS-S is a vehicle, vehicle motion control for computer-assisted and/or automated vehicles (both HMI and vehicle motion control entities may be triggered by the ITS-S applications); a local device sensor system and IoT Platform that collects and shares IoT data; local device sensor fusion and actuator application(s), which may contain ML/AI and aggregates the data flow issued by the sensor system; local perception and trajectory prediction applications that consume the output of the fusion application and feed the ITS-S applications; and the relevant ITS-S. The sensor system can include one or more cameras, radars, LIDARs, etc., in a V-ITS-S or R-ITS-S. In the central station, the sensor system includes sensors that may be located on the side of the road, but directly report their data to the central station, without the involvement of a V-ITS-S or an R-ITS-S. In some cases, the sensor system may additionally include gyroscope(s), accelerometer(s), and the like (see e.g., sensor circuitry 3072 of FIG. 30). Aspects of these elements are discussed infra with respect to FIGS. 22, 23, and 24

FIG. 22 depicts an example vehicle computing system 2200 according to various embodiments. In this example, the vehicle computing system 2200 includes a V-ITS-S 2201 and Electronic Control Units (ECUs) 2205. The V-ITS-S 2201 includes a V-ITS-S gateway 2211, an ITS-S host 2212, and an ITS-S router 2213. The vehicle ITS-S gateway 2211 provides functionality to connect the components at the in-vehicle network (e.g., ECUs 2205) to the ITS station-internal network. The interface to the in-vehicle components (e.g., ECUs 2205) may be the same or similar as those discussed herein (see e.g., IX 3056 of FIG. 30) and/or may be a proprietary interface/interconnect. Access to components (e.g., ECUs 2205) may be implementation specific. The ECUs 2205 may be the same or similar to the driving control units (DCUs) 174 discussed infra with respect to FIG. 1. The ITS station connects to ITS ad hoc networks via the ITS-S router 2213.

Figure 23:
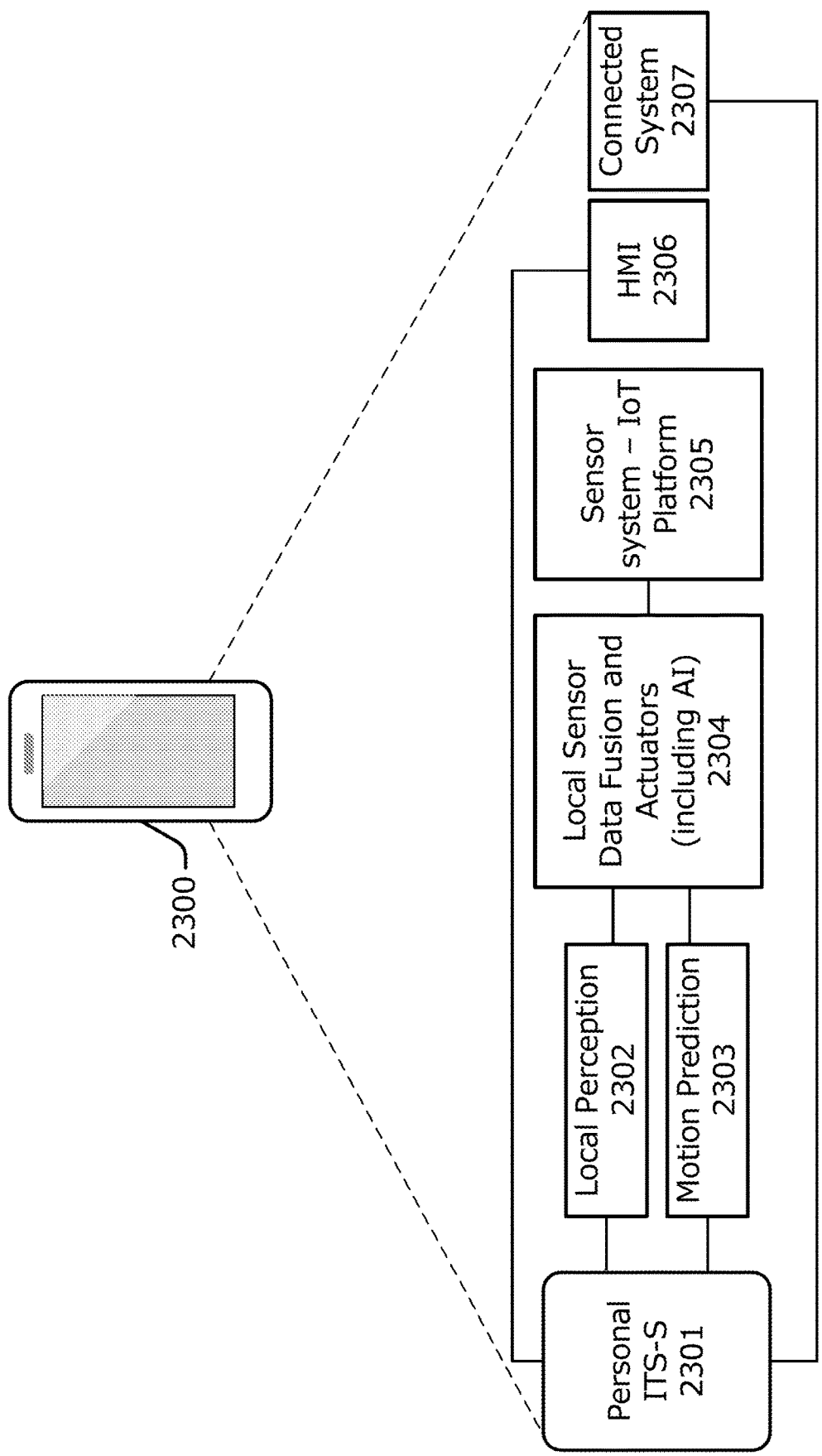
FIG. 23 depicts an example personal ITS station (P-ITS-S), which may be used as a VRU ITS-S according to various embodiments.

FIG. 23 depicts an example personal computing system 2300 according to various embodiments. The personal ITS sub-system 2300 provides the application and communication functionality of ITSC in mobile devices, such as smartphones, tablet computers, wearable devices, PDAs, portable media players, laptops, and/or other mobile devices. The personal ITS sub-system 2300 contains a personal ITS station (P-ITS-S) 2301 and various other entities not included in the P-ITS-S 2301, which are discussed in more detail infra. The device used as a personal ITS station may also perform HMI functionality as part of another ITS sub-system, connecting to the other ITS sub-system via the ITS station-internal network (not shown). For purposes of the present disclosure, the personal ITS sub-system 2300 may be used as a VRU ITS-S 117.

FIG. 24 depicts an example roadside infrastructure system 2400 according to various embodiments. In this example, the roadside infrastructure system 2400 includes an R-ITS-S 2401, output device(s) 2405, sensor(s) 2408, and one or more radio units (RUs) 2410. The R-ITS-S 2401 includes a R-ITS-S gateway 2411, an ITS-S host 2412, an ITS-S router 2413, and an ITS-S border router 2414. The ITS station connects to ITS ad hoc networks and/or ITS access networks via the ITS-S router 2413. The R-ITS-S gateway 2211 provides functionality to connect the components of the roadside system (e.g., output devices 2405 and sensors 2408) at the roadside network to the ITS station-internal network. The interface to the in-vehicle components (e.g., ECUs 2205) may be the same or similar as those discussed herein (see e.g., IX 2906 of FIG. 29, and IX 3056 of FIG. 30) and/or may be a proprietary interface/interconnect. Access to components (e.g., ECUs 2205) may be implementation specific. The sensor(s) 2408 may be inductive loops and/or sensors that are the same or similar to the sensors 172 discussed infra with respect to FIG. 1 and/or sensor circuitry 3072 discussed infra with respect to FIG. 30.

The actuators 2413 are devices that are responsible for moving and controlling a mechanism or system. In various embodiments, the actuators 2413 are used to change the operational state (e.g., on/off, zoom or focus, etc.), position, and/or orientation of the sensors 2408. In some embodiments, the actuators 322 are used to change the operational state of some other roadside equipment, such as gates, traffic lights, digital signage or variable message signs (VMS), etc. The actuators 2413 are configured to receive control signals from the R-ITS-S 2401 via the roadside network, and convert the signal energy (or some other energy) into an electrical and/or mechanical motion. The control signals may be relatively low energy electric voltage or current. In embodiments, the actuators 2413 comprise electromechanical relays and/or solid state relays, which are configured to switch electronic devices on/off and/or control motors, and/or may be that same or similar or actuators 3074 discussed infra with respect to FIG. 30.

Each of FIGS. 22, 23, and 24 also show entities which operate at the same level but are not included in the ITS-S including the relevant HMI 2206, 2306, and 2406; vehicle motion control 2208 (only at the vehicle level); local device sensor system and IoT Platform 2205, 2305, and 2405; local device sensor fusion and actuator application 2204, 2304, and 2404; local perception and trajectory prediction applications 2202, 2302, and 2402; motion prediction 2203 and 2303, or mobile objects trajectory prediction 2403 (at the RSU level); and connected system 2207, 2307, and 2407.

The local device sensor system and IoT Platform 2205, 2305, and 2405 collects and shares IoT data. The VRU sensor system and IoT Platform 2305 is at least composed of the PoTi management function present in each ITS-S of the system. The PoTi entity provides the global time common to all system elements and the real time position of the mobile elements. Local sensors may also be embedded in other mobile elements as well as in the road infrastructure (e.g., camera in a smart traffic light, electronic signage, etc.). An IoT platform, which can be distributed over the system elements, may contribute to provide additional information related to the environment surrounding the VRU system 2300. The sensor system can include one or more cameras, radars, LiDARs, and/or other sensors (see e.g., 3022 of FIG. 30), in a V-ITS-S 110 or R-ITS-S 130. In the VRU device 117/2300, the sensor system may include gyroscope(s), accelerometer(s), and the like (see e.g., 3022 of FIG. 30). In a central station (not shown), the sensor system includes sensors that may be located on the side of the road, but directly report their data to the central station, without the involvement of a V-ITS-S 110 or an R-ITS-S 130.

The (local) sensor data fusion function and/or actuator applications 2204, 2304, and 2404 provides the fusion of local perception data obtained from the VRU sensor system and/or different local sensors. This may include aggregating data flows issued by the sensor system and/or different local sensors. The local sensor fusion and actuator application(s) may contain machine learning (ML)/Artificial Intelligence (AI) algorithms and/or models. Various ML/AI techniques can be used to carry out the sensor data fusion. Sensor data fusion usually relies on the consistency of its inputs and then to their timestamping, which correspond to a common given time.

For any of the embodiments discussed herein, any suitable data fusion or data integration technique(s) may be used to generate the composite information. For example, the data fusion technique may be a direct fusion technique or an indirect fusion technique. Direct fusion combines data acquired directly from multiple vUEs or sensors, which may be the same or similar (e.g., all vUEs or sensors perform the same type of measurement) or different (e.g., different vUE or sensor types, historical data, etc.). Indirect fusion utilizes historical data and/or known properties of the environment and/or human inputs to produce a refined data set. Additionally, the data fusion technique may include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at a particular geolocation coordinate)). As examples, the data fusion algorithm may be or include a structured-based algorithm (e.g., tree-based (e.g., Minimum Spanning Tree (MST)), cluster-based, grid and/or centralized-based), a structure-free data fusion algorithm, a Kalman filter algorithm and/or Extended Kalman Filtering, a fuzzy-based data fusion algorithm, an Ant Colony Optimization (ACO) algorithm, a fault detection algorithm, a Dempster-Shafer (D-S) argumentation-based algorithm, a Gaussian Mixture Model algorithm, a triangulation based fusion algorithm, and/or any other like data fusion algorithm A local perception function (which may or may not include trajectory prediction application(s)) 2202, 2302, and 2402 is provided by the local processing of information collected by local sensor(s) associated to the system element. The local perception (and trajectory prediction) function 2202, 2302, and 2402 consumes the output of the sensor data fusion application/function 2204, 2304, and 2404 and feeds ITS-S applications with the perception data (and/or trajectory predictions). The local perception (and trajectory prediction) function 2202, 2302, and 2402 detects and characterize objects (static and mobile) which are likely to cross the trajectory of the considered moving objects. The infrastructure, and particularly the road infrastructure 2400, may offer services relevant to the VRU support service. The infrastructure may have its own sensors detecting VRUs evolutions and then computing a risk of collision if also detecting local vehicles' evolutions, either directly via its own sensors or remotely via a cooperative perception supporting services such as the CPS (see e.g., ETSI TR 103 562). Additionally, road marking (e.g., zebra areas or crosswalks) and vertical signs may be considered to increase the confidence level associated with the VRU detection and mobility since VRUs 116 usually have to respect these marking/signs.

The motion dynamic prediction function 2203 and 2303, and the mobile objects trajectory prediction 2403 (at the RSU level), are related to the behavior prediction of the considered moving objects. In some embodiments, the motion dynamic prediction function 2203 and 2303 predict the trajectory of the vehicle 110 and the VRU 116, respectively. In some embodiments, the motion dynamic prediction function 2203 may be part of the VRU Trajectory and Behavioral Modeling module 812 and trajectory interception module 813 of the V-ITS-S 110 (see e.g., FIG. 8). In some embodiments, the motion dynamic prediction function 2303 may be part of the dead reckoning module 822 and/or the movement detection module 822 of the VRU ITS-S 117 (see e.g., FIG. 8). Alternatively, the motion dynamic prediction functions 2203 and 2303 may provide motion/movement predictions to the aforementioned modules. Additionally or alternatively, the mobile objects trajectory prediction 2403 predict respective trajectories of corresponding vehicles 110 and VRUs 116, which may be used to assist the VRU ITS-S 117 in performing dead reckoning 822 and/or assist the V-ITS-S 110 with VRU Trajectory and Behavioral Modeling 812 (see e.g., FIG. 8).

Motion dynamic prediction includes a moving object trajectory resulting from evolution of the successive mobile positions. A change of the moving object trajectory or of the moving object velocity (acceleration/deceleration) impacts the motion dynamic prediction. In most cases, when VRUs 116 are moving, they still have a large amount of possible motion dynamics in terms of possible trajectories and velocities. This means that motion dynamic prediction 2203, 2303, 2403 is used to identify which motion dynamic will be selected by the VRU 116 as quickly as possible, and if this selected motion dynamic is subject to a risk of collision with another VRU or a vehicle.

The motion dynamic prediction functions 2203, 2303, 2403 analyze the evolution of mobile objects and the potential trajectories that may meet at a given time to determine a risk of collision between them. The motion dynamic prediction works on the output of cooperative perception considering the current trajectories of considered device (e.g., VRU device 117) for the computation of the path prediction; the current velocities and their past evolutions for the considered mobiles for the computation of the velocity evolution prediction; and the reliability level which can be associated to these variables. The output of this function is provided to the risk analysis function (see e.g., FIG. 20).

In many cases, working only on the output of the cooperative perception is not sufficient to make a reliable prediction because of the uncertainty which exists in terms of VRU trajectory selection and its velocity. However, complementary functions may assist in increasing consistently the reliability of the prediction. For example, the use of the device (e.g., VRU device 117) navigation system, which provides assistance to the user (e.g., VRU 116) to select the best trajectory for reaching its planned destination. With the development of Mobility as a Service (MaaS), multimodal itinerary computation may also indicate to the VRU 116 dangerous areas and then assist to the motion dynamic prediction at the level of the multimodal itinerary provided by the system. In another example, the knowledge of the user (e.g., VRU 116) habits and behaviors may be additionally or alternatively used to improve the consistency and the reliability of the motion predictions. Some users (e.g., VRUs 116) follow the same itineraries, using similar motion dynamics, for example when going to the main Point of Interest (POI), which is related to their main activities (e.g., going to school, going to work, doing some shopping, going to the nearest public transport station from their home, going to sport center, etc.). The device (e.g., VRU device 117) or a remote service center may learn and memorize these habits. In another example, the indication by the user (e.g., VRU 116) itself of its selected trajectory in particular when changing it (e.g., using a right turn or left turn signal similar to vehicles when indicating a change of direction).

The vehicle motion control 2208 may be included for computer-assisted and/or automated vehicles 110. Both the HMI entity 2206 and vehicle motion control entity 2208 may be triggered by one or more ITS-S applications. The vehicle motion control entity 2208 may be a function under the responsibility of a human driver or of the vehicle if it is able to drive in automated mode.

The Human Machine Interface (HMI) 2206, 2306, and 2406, when present, enables the configuration of initial data (parameters) in the management entities (e.g. VRU profile management) and in other functions (e.g. VRU Basic service management). The HMI 2206, 2306, and 2406 enables communication of external events related to the VRU Basic service to the device owner (user), including the alerting about an immediate risk of collision (TTC<2 s) detected by at least one element of the system and signaling a risk of collision (e.g., TTC>2 seconds) being detected by at least one element of the system. For a VRU system 117 (e.g., personal computing system 2300), similar to a vehicle driver, the HMI provides the information to the VRU 116, considering its profile (e.g. for a blind person, the information is presented with a clear sound level using accessibility capabilities of the particular platform of the personal computing system 2300). In various implementations, the HMI 2206, 2306, and 2406 may be part of the alerting system 815, 825, and 835, respectively (see e.g., FIG. 8).

The connected systems 2207, 2307, and 2407 refer to components/devices used to connect a system with one or more other systems. As examples, the connected systems 2207, 2307, and 2407 may include communication circuitry and/or radio units. The VRU system 2300 may be a connected system made of up to 4 different levels of equipment. The VRU system 2300 may also be an information system which collects, in real time, information resulting from events, processes the collected information and stores them together with processed results. At each level of the VRU system 2300, the information collection, processing and storage is related to the functional and data distribution scenario which is implemented.

4. Computing System and Hardware Configurations

Figure 25:
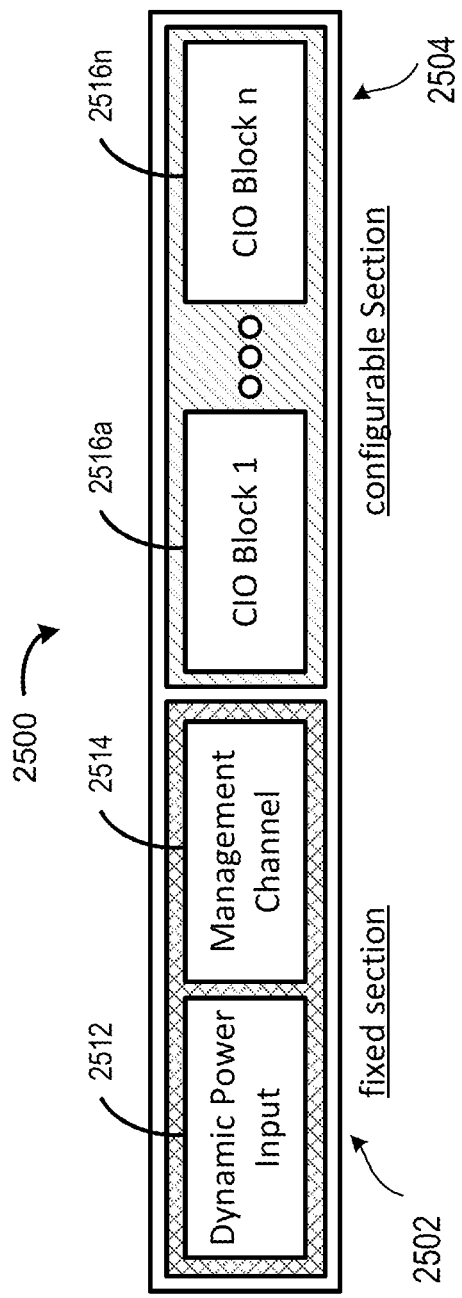
FIG. 25 illustrates an example Upgradeable Vehicular Compute System (UVCS) interface according to various embodiments.

FIG. 25 illustrates an example UVCS interface 2500 according to various embodiments. UVCS interface 2500 is a modular system interface designed to couple a pluggable compute module (having compute elements such as CPU, memory, storage, radios, etc.) to an in-vehicle compute hub or subsystem (having peripheral components, such as power supplies, management, I/O devices, automotive interfaces, thermal solution, etc.) pre-disposed in a vehicle to form an instance of a UVCS for the vehicle. Different pluggable compute modules having different compute elements, or compute elements of different functionalities or capabilities, may be employed to mate with an in-vehicle compute hub/subsystem pre-disposed in the vehicle, forming different instances of UVCS. Accordingly, the computing capability of a vehicle having a pre-disposed in-vehicle compute hub/subsystem may be upgraded by having a newer, more function or more capable pluggable compute module be mated with the pre-disposed in-vehicle compute hub/subsystem, replacing a prior older, less function or less capable pluggable compute module.

In the example of FIG. 25, UVCS 2500 includes a fixed section 2502 and a configurable section 2504. Fixed section 2502 includes a dynamic power input interface 2512 (also referred to as dynamic power delivery interface), and a management channel interface 2514. Configuration section 2504 includes a number of configurable I/O (CIO) blocks 2516a-2516n.

Dynamic power input interface 2512 is arranged to deliver power from the in-vehicle compute hub/subsystem to the compute elements of a pluggable compute module plugged into UVCS interface 2500 to mate with the in-vehicle compute hub to form an instance of an UVCS. Management channel interface 2514 is arranged to facilitate the in-vehicle compute hub in managing/coordinating the operations of itself and the pluggable compute module plugged into UVCS interface 2500 to form the instance of an UVCS. CIO blocks 2516a-2516n are arranged to facilitate various I/O between various compute elements of the pluggable compute module and the peripheral components of the in-vehicle compute hub/subsystem mated to each other through UVCS interface 2500 to form the instance of an UVCS. The I/O between the compute elements of the pluggable compute module and the peripheral components of the mated in-vehicle compute hub/subsystem vary from instance to instance, depending on the compute elements of the pluggable compute module used to mate with the in-vehicle compute hub to form a particular instance of the UVCS. At least some of CIO blocks 2516a-2516a are arranged to facilitate high-speed interfaces.

The CIO blocks 2516a-2516n represent a set of electrically similar high speed, differential serial interfaces, allowing a configuration of the actually used interface type and standard on a case-by-case basis. This way, different UVCS compute hubs can connect different peripherals to the same UVCS interface 2500, and allow the different peripherals to perform I/O operations in different I/O protocols with compute elements of a UVCS module.

The number of CIO blocks 2516a-2516n may vary from embodiments to embodiments for different market segments. For example, there may be few CIO blocks 2516a-2516n (e.g., 2 to 4) for an embodiment designed for the lower end markets. On the other hand, in another example, there may be many more CIO blocks 2516-2516n (e.g., 8 to 16) for an embodiment designed for the higher end markets. However, to achieve the highest possible interoperability and upgradeability, for a given UVCS generation, the number and functionality/configurability of the number of CIO blocks may be kept the same.

Figure 26:
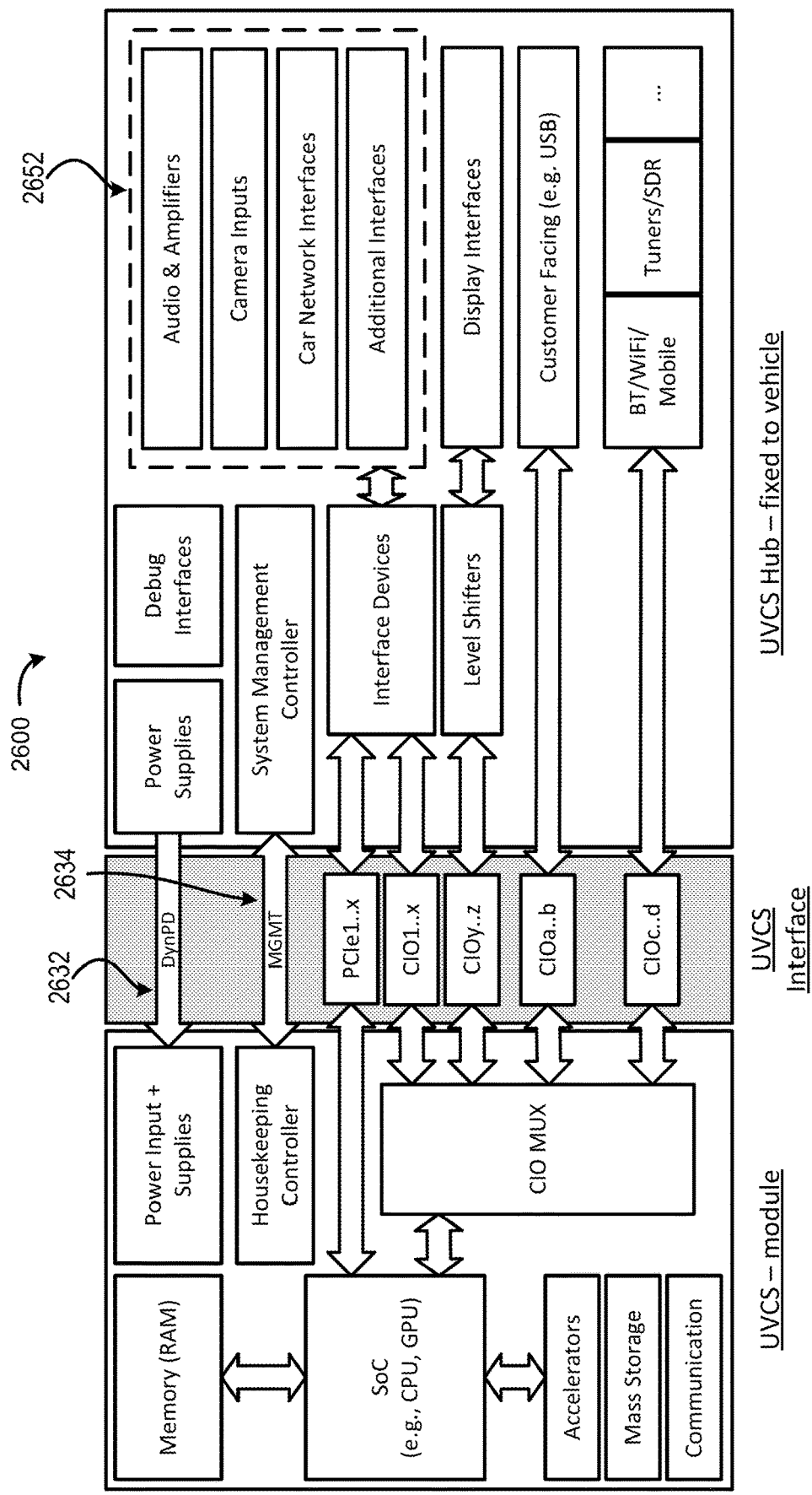
FIG. 26 illustrates an example UVCS formed using a UVCS interface according to various embodiments.

FIG. 26 illustrates an example UVCS 2600 formed using a UVCS interface according to various embodiments. As shown, UVCS interface, which may be UVCS interface 2500, is used to facilitate mating of pluggable UVCS module with UVCS hub pre-disposed in a vehicle, to form UVCS 2600 for the vehicle, which may be one of the one or more UVCS of in-vehicle system PT100 of Figure PT1. UVCS interface, as UVCS interface 2500, includes a fixed section and a configurable section. The fixed section includes a dynamic power delivery interface (DynPD) 2632 and a management channel (MGMT) interface 2634. The configurable section includes a number of configurable I/O interfaces (CIOs), PCIe1..x, CIO1..x, CIOy..z, CIOa..b, CIOc..d.

Pre-disposed UVCS hub includes power supplies and system management controller. Further, UVCS hub includes debug interfaces 2644, interface devices, level shifters, and a number of peripheral components 2652, such as audio and amplifiers, camera interface, car network interfaces, other interfaces, display interfaces, customer facing interfaces (e.g., a USB interface), and communication interfaces (e.g., Bluetooth®\BLE, WiFi, other mobile interfaces, tuners, software define radio (SDR)), coupled to power supplies, system management controller, and each other as shown. In other embodiments, UVCS hub may include more or less, or different peripheral elements.

Pluggable UVCS module 2606 includes an SoC (e.g., CPU, GPU, FPGA, or other circuitry), memory, power input+supplies circuitry, housekeeping controller and CIO multiplexer(s) (MUX). Further, UVCS module includes hardware accelerators, persistent mass storage, and communication modules (e.g., BT, WiFi, 5G/NR, LTE, and/or other like interfaces), coupled to the earlier enumerated elements and each other as shown. In other embodiments, UVCS module may include more or less, or different compute elements.

Power Supplies of UVCS hub delivers power to compute elements of UVCS module, via DynPD 2632 of UVCS interface and Power Input+Supplies circuitry of UVCS module. System management controller of UVCS hub manages and coordinates its operations and the operations of the compute elements of UVCS module via the management channel 2634 of UVCS interface and housekeeping controller of UVCS module. CIO MUX is configurable or operable to provide a plurality of I/O channels of different I/O protocols between the compute elements of UVCS module and the peripheral components of UVCS hub, via the configurable I/O blocks of UVCS interface, interface devices and level shifters of UVCS hub. For example, one of the I/O channels may provide for I/O between the compute elements of UVCS module and the peripheral components of UVCS hub in accordance with PCIe I/O protocol. Another I/O channel may provide for I/O between the compute elements of UVCS module and the peripheral components of UVCS hub in accordance with USB I/O protocol. Still other I/O channels provide for I/O between the compute elements of UVCS module and the peripheral components of UVCS hub in accordance with other high speed serial or parallel I/O protocols.

Housekeeping controller is configurable or operable to control power supply in its delivery of power to static and dynamic loads, as well as the consumption of power by static and dynamic loads, based on the operating context of the vehicle (e.g., whether the vehicle is in a "cold crank" or "cold start" scenario). Housekeeping controller is configurable or operable to control power consumption of static and dynamic loads by selectively initiating sleep states, lowering clock frequencies, or powering off the static and dynamic loads.

Management channel 2634 may be a small low pin count serial interface, a Universal Asynchronous Receiver-Transmitter (UART) interface, a Universal Synchronous and Asynchronous Receiver-Transmitter (USART) interface, a USB interface, or some other suitable interface (including any of the other IX technologies discussed herein). In alternate embodiments, management channel may be a parallel interface such as an IEEE 1284 interface.

CIO blocks of UVCS interface represent a set of electrically similar high speed interfaces (e.g., high speed differential serial interfaces) allowing a configuration of the actually used interface type and standard on a case-by-case basis. In particular, housekeeping controller is arranged to configure CIO MUX to provide a plurality of I/O channels through the various CIO blocks to facilitate I/O operations in different I/O protocols. For the illustrated embodiments, the plurality of I/O channels include a USB I/O channel, a PCIe I/O channel, a HDMI and DP (DDI) I/O channel, and a Thunderbolt (TBT) I/O channel. The plurality of I/O channels may also include other I/O channel types (xyz [1..r]) beside the enumerated I/O channel types.

In various embodiments, CIO multiplexer comprises sufficient circuit paths to be configurable to multiplex any given combination of I/O interfaces exposed by the SoC to any of the connected CIO blocks. In alternate embodiments, CIO MUX may support a limited multiplexing scheme, such as when the CIO blocks support a limited number of I/O protocols (e.g., supporting display interfaces and Thunderbolt, while not offering PCIe support). In some implementations, the CIO MUX may be integrated as part of the SoC.

System management controller of UVCS hub and housekeeping controller of UVCS module are configurable or operable to negotiate, during an initial pairing of the UVCS hub and UVCS module a power budget or contract. In various embodiments, the power budget/contract may provide for minimum and maximum voltages, current/power needs of UVCS module and the current power delivery limitation of UVCS interface, if any. This allows for the assessments of the compatibility of a given pair of UCS hub and module, as well as for operational benefits.

Figure 27:
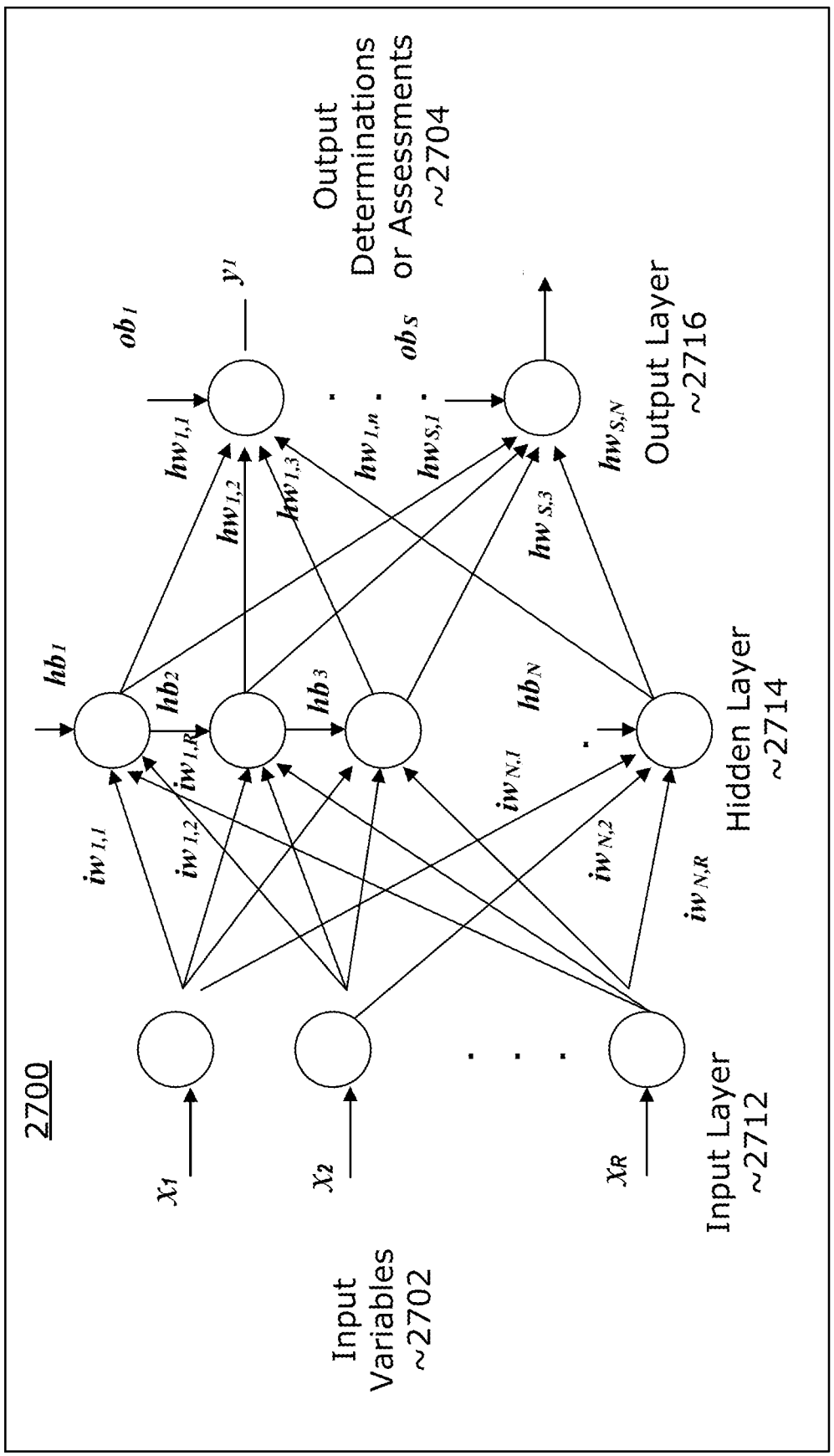
FIG. 27 illustrates an example neural network suitable for practicing the various embodiments discussed herein.

FIG. 27 illustrates an example NN 2700 suitable for use by a UVCS and/or an ITS-S (such as those discussed previously), in accordance with various embodiments. NN 2700 may be suitable for use by one or more of the subsystems and/or the various embodiments discussed herein, implemented in part by a hardware accelerator of a UVCS module. As shown, example NN 2700 may be a multi-layer feedforward NN (FNN) comprising an input layer 2712, one or more hidden layers 2714 and an output layer 2716. Input layer 2712 receives data of input variables ($x_i$) 2702. Hidden layer(s) 2714 processes the inputs, and eventually, output layer 2716 outputs the determinations or assessments ($y_i$) 2704. In one example implementation the input variables ($x_i$) 2702 of the NN are set as a vector containing the relevant variable data, while the output determination or assessment ($y_i$) 2704 of the NN are also as a vector. As an example, the multi-layer FNN may be expressed through the following equations:

$$ho_i = f(\Sigma_{j=1}^{R}(iw_{i,j} x_j) + hb_i), \text{ for } i=1, \ldots, N$$

$$y_i = f(\Sigma_{k=1}^{N}(hw_{i,k} ho_k) + ob_i), \text{ for } i=1, \ldots, S$$

In these equations, $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{s}(t_{kp} - y_{kp})^2$$

In this equation, $y_{kp}$ and $t_{kp}$ are the predicted and the target values of $p^{th}$ output unit for sample k, respectively, and m is the number of samples.

In embodiments, the NN 2700 is used for one or more ITS-S subsystems, such as the VRU Trajectory and Behavioral Modeling 812, VRU/V-ITS-S Trajectory Prediction and Behavioral Modeling 832, and/or trajectory interception 813, 833 (see e.g., FIG. 8). The input variables ($x_i$) 2702 may include various sensor data collected by various embedded or accessible sensors, data obtained via the message exchanges 819, 829 (see e.g., FIG. 8), as well as data describing relevant factors to a decision. The output variables ($y_i$) 2704 may include determined response (e.g., adjusting speed, braking, changing lane(s), and so forth). The network variables of the hidden layer(s) for the NN 2700, are determined by the training data.

In one example, the NN 2700 is used for the motion detection, which is used to determine the motion/activity of objects such as VRUs 116 and/or V-ITS-Ss 110 based on the y sensor data obtained from the one or more sensors (e.g., image capture devices, LiDAR, Radar, etc.). In another example, the NN 2700 is used for object detection/classification, such as identifying or predicting different VRU types/classes. The object detection or recognition models may include an enrollment phase and an evaluation phase. During the enrollment phase, one or more features are extracted from the sensor data (e.g., image or video data). A feature is an individual measureable property or characteristic. In the context of object detection, an object feature may include an object size, color, shape, relationship to other objects, and/or any region or portion of an image, such as edges, ridges, corners, blobs, and/or some defined regions of interest (ROI), and/or the like. The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

In another example, the NN 2700 is used for object tracking, for example, tracking/monitoring movements of VRUs 116 and/or V-ITS-Ss 110 (e.g., for the VRU Trajectory and Behavioral Modeling 812 and/or trajectory interception 813 of FIG. 8). The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), etc.), a deep learning object detection technique (e.g., fully convolutional neural network (FCNN), region proposal convolution neural network (R-CNN), single shot multibox detector, 'you only look once' (YOLO) algorithm, etc.), and/or the like.

In the example of FIG. 27, for simplicity of illustration, there is only one hidden layer in the NN. In some other embodiments, there can be many hidden layers. Furthermore, the NN can be in some other types of topology, such as Convolution NN (CNN), Recurrent NN (RNN), a Long Short Term Memory (LSTM) algorithm, a deep CNN (DCN), a Deconvolutional NN (DNN), a gated recurrent unit (GRU), a deep belief NN, a feed forward NN (FFN), a deep FNN (DFF), a deep stacking network, a Markov chain, a perception NN, a Bayesian Network (BN), a Dynamic BN (DBN), a Linear Dynamical Systems (LDS), a Switching LDS (SLDS), and so forth.

Figure 28:
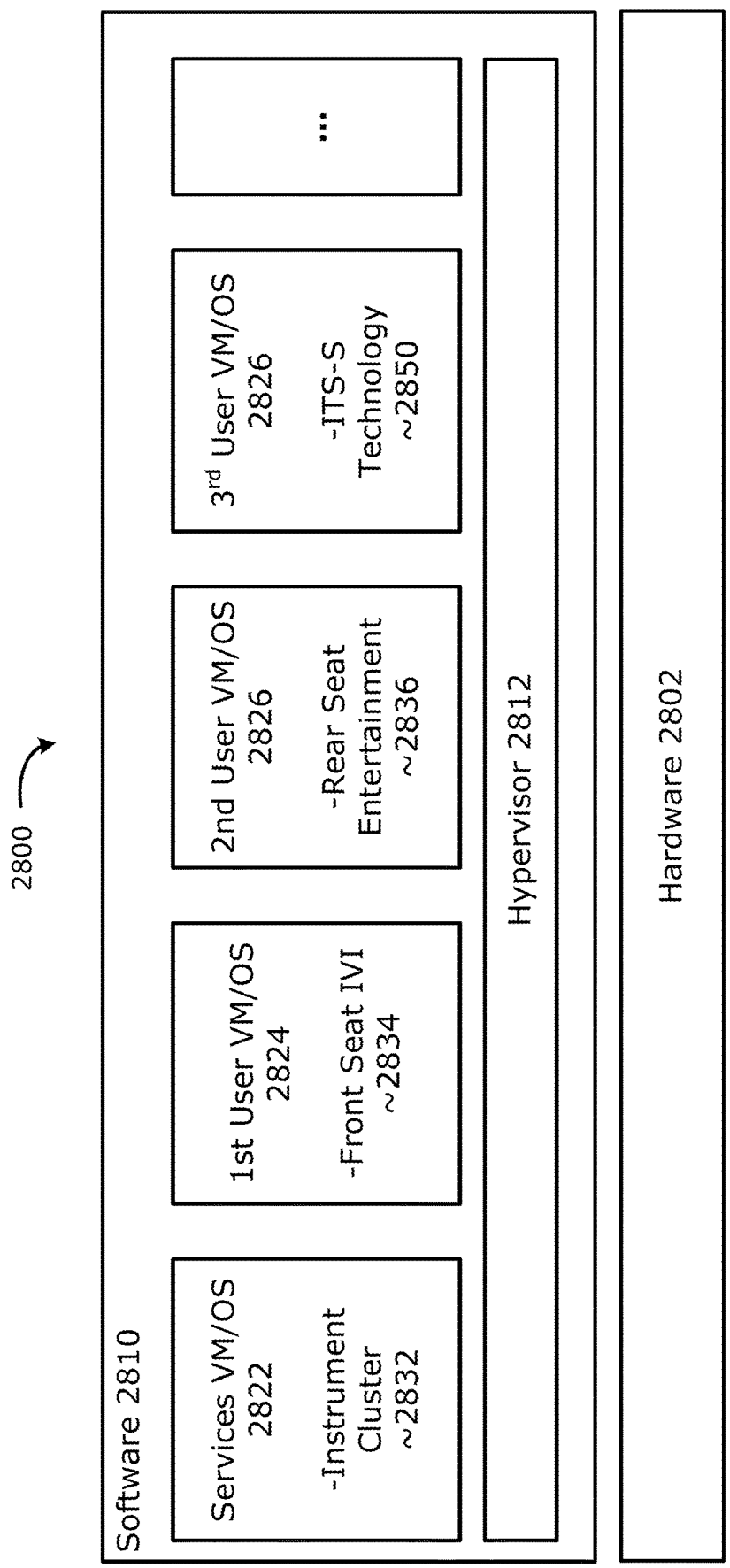
FIG. 28 illustrates a software component view of an example in-vehicle system formed with a UVCS, according to various embodiments.

FIG. 28 shows a software component view of an example in-vehicle system formed with a UVCS, according to various embodiments. As shown, in-vehicle system 2800, which could be formed with UVCS 2600, includes hardware 2802 and software 2810. Software 2810 includes hypervisor 2812 hosting a number of virtual machines (VMs) 2822-2828. Hypervisor 2812 is configurable or operable to host execution of VMs 2822-2828. Hypervisor 2812 may also implement some or all of the functions described earlier for a system management controller of a UVCS module. As examples, hypervisor 2812 may be a KVM hypervisor, Xen provided by Citrix Inc., VMware provided by VMware Inc., and/or any other suitable hypervisor or VM manager (VMM) technologies such as those discussed herein. The VMs 2822-2828 include a service VM 2822 and a number of user VMs 2824-2828. Service machine 2822 includes a service OS hosting execution of a number of instrument cluster applications 2832. As examples, service OS of service VM 2822 and user OS of user VMs 2824-2828 may be Linux, available e.g., from Red Hat Enterprise of Raleigh, N.C., Android, available from Google of Mountain View, Calif., and/or any other suitable OS such as those discussed herein.

User VMs 2824-2828 may include a first user VM 2824 having a first user OS hosting execution of front seat infotainment applications 2834, a second user VM 2826 having a second user OS hosting execution of rear seat infotainment applications 2836, a third user VM 2828 having a third user OS hosting execution of ITS-S subsystem 2850, incorporated with the various embodiment discussed herein, and/or any other suitable OS/applications such as those discussed herein. In some implementations, the VMs 2822-2826 may be, or may include isolated user-space instances such as containers, partitions, virtual environments (VEs), etc., which may be implemented using a suitable OS-level virtualization technology.

FIGS. 29 and 30 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

FIG. 29 illustrates an example of infrastructure equipment 2900 in accordance with various embodiments. The infrastructure equipment 2900 (or "system 2900") may be implemented as a base station, road side unit (RSU), roadside ITS-S (R-ITS-S), radio head, relay station, server, gateway, and/or any other element/device discussed herein.

The system 2900 includes application circuitry 2905, baseband circuitry 2910, one or more radio front end modules (RFEMs) 2915, memory circuitry 2920, power management integrated circuitry (PMIC) 2925, power tee circuitry 2930, network controller circuitry 2935, network interface connector 2940, positioning circuitry 2945, and user interface 2950. In some embodiments, the device 2900 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 2905 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 2905 may be coupled with or may include memory/storage elements and may be configured to execute instructions stored in the memory/storage to enable various applications or operating systems to run on the system 2900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2905 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 2905 may comprise, or may be, a special-purpose processor/controller to operate according to the various embodiments herein. As examples, the processor(s) of application circuitry 2905 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 2900 may not utilize application circuitry 2905, and instead may include a special-purpose processor/controller to process IP data received from an EPC or SGC, for example.

In some implementations, the application circuitry 2905 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 2905 may comprise logic blocks or logic fabric, and other interconnected resources that may be programmed to perform various functions, such as the procedures, methods, functions, etc. of the various embodiments discussed herein. In such embodiments, the circuitry of application circuitry 2905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 130, intermediate nodes 120, and/or endpoints 110 of Figure XS1 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 2905 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 2910 may be implemented, for example, as a solder-down substrate including one or more integrated circuits, a single packaged integrated circuit soldered to a main circuit board or a multi-chip module containing two or more integrated circuits. The baseband circuitry 2910 includes one or more processing devices (e.g., baseband processors) to carry out various protocol and radio control functions. Baseband circuitry 2910 may interface with application circuitry of system 2900 for generation and processing of baseband signals and for controlling operations of the RFEMs 2915. The baseband circuitry 2910 may handle various radio control functions that enable communication with one or more radio networks via the RFEMs 2915. The baseband circuitry 2910 may include circuitry such as, but not limited to, one or more single-core or multi-core processors (e.g., one or more baseband processors) or control logic to process baseband signals received from a receive signal path of the RFEMs 2915, and to generate baseband signals to be provided to the RFEMs 2915 via a transmit signal path. In various embodiments, the baseband circuitry 2910 may implement a real-time OS (RTOS) to manage resources of the baseband circuitry 2910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 29, in one embodiment, the baseband circuitry 2910 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 2915 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 2915 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 2910 and/or RFEMs 2915. The baseband circuitry 2910 may also support radio communications for more than one wireless protocol.

Continuing with the aforementioned embodiment, the baseband circuitry 2910 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 2950 may include one or more user interfaces designed to enable user interaction with the system 2900 or peripheral component interfaces designed to enable peripheral component interaction with the system 2900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 2915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 2915, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 2910 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 2920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 2920 may be implemented as one or more of solder down packaged integrated circuits, socketed memory modules and plug-in memory cards.

The memory circuitry 2920 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 2900, an operating system of infrastructure equipment 2900, one or more applications, and/or for carrying out the embodiments discussed herein. The computational logic may be stored or loaded into memory circuitry 2920 as instructions for execution by the processors of the application circuitry 2905 to provide or perform the functions described herein. The various elements may be implemented by assembler instructions supported by processors of the application circuitry 2905 or high-level languages that may be compiled into such instructions. The permanent copy of the programming instructions may be placed into persistent storage devices of memory circuitry 2920 in the factory during manufacture, or in the field through, for example, a distribution medium (not shown), through a communication interface (e.g., from a distribution server), and/or over-the-air (OTA).

As discussed in more detail infra, infrastructure equipment 2900 may be configured to support a particular V2X RAT based on the number of vUEs 121 that support (or are capable to communicate) the particular V2X RAT. In embodiments, the memory circuitry 2920 may store a RAT configuration control module to control the (re)configuration of the infrastructure equipment 2900 to support a particular RAT and/or V2X RAT. The configuration control module provides an interface for triggering (re)configuration actions. In some embodiments, the memory circuitry 2920 may also store a RAT software (SW) management module to implement SW loading or provisioning procedures, and (de)activation SW in the infrastructure equipment 2900. In either of these embodiments, the memory circuitry 2920 may store a plurality of V2X RAT software components, each of which include program code, instructions, modules, assemblies, packages, protocol stacks, software engine(s), etc., for operating the infrastructure equipment 2900 or components thereof (e.g., RFEMs 2915) according to a corresponding V2X RAT. When a V2X RAT component is configured or executed by the application circuitry 2905 and/or the baseband circuitry 2910, the infrastructure equipment 2900 operates according to the V2X RAT component.

In a first example, a first V2X RAT component may be an C-V2X component, which includes LTE and/or C-V2X protocol stacks that allow the infrastructure equipment 2900 to support C-V2X and/or provide radio time/frequency resources according to LTE and/or C-V2X standards. Such protocol stacks may include a control plane protocol stack including a Non-Access Stratum (NAS), Radio Resource Control (RRC), Packet Data Convergence Protocol (PDCP), Radio Link Control (RLC), Media Access Control (MAC), and Physical (PHY) layer entities; and a user plane protocol stack including General Packet Radio Service (GPRS) Tunneling Protocol for the user plane layer (GTP-U), User Datagram Protocol (UDP), Internet Protocol (IP), PDCP, RLC, MAC, and PHY layer entities. These control plane and user plane protocol entities are discussed in more detail in 3GPP TS 36.300 and/or 3GPP TS 38.300, as well as other 3GPP specifications. In some embodiments, the IP layer entity may be replaced with an Allocation and Retention Priority (ARP) layer entity or some other non-IP protocol layer entity. Some or all of the aforementioned protocol layer entities may be "relay" versions depending on whether the infrastructure equipment 2900 is acting as a relay. In some embodiments, the user plane protocol stack may be the PC5 user plane (PC5-U) protocol stack discussed in 3GPP TS 23.303 v15.1.0 (2018-06).

In a second example, a second V2X RAT component may be a ITS-G5 component, which includes ITS-G5 (IEEE 802.11p) and/or Wireless Access in Vehicular Environments (WAVE) (IEEE 1609.4) protocol stacks, among others, that allow the infrastructure equipment to support ITS-G5 communications and/or provide radio time-frequency resources according to ITS-G5 and/or other WiFi standards. The ITS-G5 and WAVE protocol stacks include, inter alia, a DSRC/WAVE PHY and MAC layer entities that are based on the IEEE 802.11p protocol. The DSRC/WAVE PHY layer is responsible for obtaining data for transmitting over ITS-G5 channels from higher layers, as well as receiving raw data over the ITS-G5 channels and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The ITS-G5 component may also include a logical link control (LLC) layer entity to perform layer 3 (L3) multiplexing and demultiplexing operations. The LLC layer (e.g., IEEE 802.2) allows multiple network L3 protocols to communicate over the same physical link by allowing the L3 protocols to be specified in LLC fields.

In addition to the V2X RAT components, the memory circuitry 2920 may also store a RAT translation component, which is a software engine, API, library, object(s), engine(s), or other functional unit for providing translation services to vUEs 121 that are equipped with different V2X capabilities. For example, the RAT translation component, when configured or executed, may cause the infrastructure equipment 2900 to convert or translate a first message obtained according to the first V2X RAT (e.g., C-V2X) into a second message for transmission using a second V2X RAT (e.g., ITS-G5). In one example, the RAT translation component may perform the translation or conversion by extracting data from one or more fields of the first message and inserting the extracted data into corresponding fields of the second message. Other translation/conversion methods may also be used in other embodiments. In some embodiments, the RAT translation component may employ a suitable translator for translating one or more source messages in a source format into one or more target messages in a target format, and may utilize any suitable compilation strategies for the translation. The translator may also have different implementations depending on the type of V2X RATs that are supported by the infrastructure equipment 2900 (e.g., memory map, instruction set, programming model, etc.).

The PMIC 2925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 2900 using a single cable.

The network controller circuitry 2935 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 2900 via network interface connector 2940 using a physical connection, which may be electrical (commonly referred to as a "copper interconnect"), optical, or wireless. The network controller circuitry 2935 may include one or more dedicated processors and/or FPGAs to communicate using one or more of the aforementioned protocols. In some implementations, the network controller circuitry 2935 may include multiple controllers to provide connectivity to other networks using the same or different protocols. In various embodiments, the network controller circuitry 2935 enables communication with associated equipment and/or with a backend system (e.g., server(s), core network, cloud service, etc.), which may take place via a suitable gateway device.

The positioning circuitry 2945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The positioning circuitry 2945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2945 may include a Micro-Technology for Positioning, Navigation, and Timing (Micro-PNT) IC that uses a master timing clock to perform position tracking/estimation without GNSS assistance. The positioning circuitry 2945 may also be part of, or interact with, the baseband circuitry 2910 and/or RFEMs 2915 to communicate with the nodes and components of the positioning network. The positioning circuitry 2945 may also provide position data and/or time data to the application circuitry 2905, which may use the data to synchronize operations with various other infrastructure equipment, or the like.

The components shown by FIG. 3 may communicate with one another using interface circuitry 306 or interconnect (IX) 2906, which may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

FIG. 30 illustrates an example of components that may be present in an edge computing node 3050 for implementing the techniques (e.g., operations, processes, methods, and methodologies) described herein. This edge computing node 3050 provides a closer view of the respective components of node 140 when implemented as or as part of a computing device (e.g., as a mobile device, a base station, server, gateway, etc.). The edge computing node 3050 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 3050, or as components otherwise incorporated within a chassis of a larger system.

The edge computing node 3050 includes processing circuitry in the form of one or more processors 3052. The processor circuitry 3052 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 3052 may include one or more hardware accelerators (e.g., same or similar to acceleration circuitry 3064), which may be microprocessors, programmable processing devices (e.g., FPGA, ASIC, etc.), or the like. The one or more accelerators may include, for example, computer vision and/or deep learning accelerators. In some implementations, the processor circuitry 3052 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 3052 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 3052 may be coupled with or may include memory/storage and may be configured to execute instructions stored in the memory/storage to enable various applications or operating systems to run on the node 3050. The processors (or cores) 3052 is configured to operate application software to provide a specific service to a user of the node 3050. In some embodiments, the processor(s) 3052 may be a special-purpose processor(s)/controller(s) configured (or configurable) to operate according to the various embodiments herein.

As examples, the processor(s) 3052 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, Calif. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 3052 may be a part of a system on a chip (SoC), System-in-Package (SiP), a multi-chip package (MCP), and/or the like, in which the processor(s) 3052 and other components are formed into a single integrated circuit, or a single package, such as the Edison™ or Galileo™ SoC boards from Intel® Corporation. Other examples of the processor(s) 3052 are mentioned elsewhere in the present disclosure.

The processor(s) 3052 may communicate with system memory 3054 over an interconnect (IX) 3056. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 3058 may also couple to the processor 3052 via the IX 3056. In an example, the storage 3058 may be implemented via a solid-state disk drive (SSDD) and/or high-speed electrically erasable memory (commonly referred to as "flash memory"). Other devices that may be used for the storage 3058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 3054 and/or storage circuitry 3058 may also incorporate three-dimensional (3D) cross-point (XPOINT) memories from Intel® and Micron®.

In low power implementations, the storage 3058 may be on-die memory or registers associated with the processor 3052. However, in some examples, the storage 2958 may be implemented using a micro hard disk drive (HDD). Further, any number of new technologies may be used for the storage 3058 in addition to, or instead of, the technologies described, such resistance change memories, phase change memories, holographic memories, or chemical memories, among others.

The storage circuitry 3058 store computational logic 3082 (or "modules 3082") in the form of software, firmware, or hardware commands to implement the techniques described herein. The computational logic 3082 may be employed to store working copies and/or permanent copies of computer programs, or data to create the computer programs, for the operation of various components of node 3050 (e.g., drivers, etc.), an OS of node 3050 and/or one or more applications for carrying out the embodiments discussed herein. The computational logic 3082 may be stored or loaded into memory circuitry 3054 as instructions 3082, or data to create the instructions 3088, for execution by the processor circuitry 3052 to provide the functions described herein. The various elements may be implemented by assembler instructions supported by processor circuitry 3052 or high-level languages that may be compiled into such instructions (e.g., instructions 3088, or data to create the instructions 3088). The permanent copy of the programming instructions may be placed into persistent storage devices of storage circuitry 3058 in the factory or in the field through, for example, a distribution medium (not shown), through a communication interface (e.g., from a distribution server (not shown)), or over-the-air (OTA).

In an example, the instructions 3088 provided via the memory circuitry 3054 and/or the storage circuitry 3058 of FIG. 30 are embodied as one or more non-transitory computer readable storage media (see e.g., NTCRSM 3060) including program code, a computer program product or data to create the computer program, with the computer program or data, to direct the processor circuitry 3058 of node 3050 to perform electronic operations in the node 3050, and/or to perform a specific sequence or flow of actions, for example, as described with respect to the flowchart(s) and block diagram(s) of operations and functionality depicted previously. The processor circuitry 3052 accesses the one or more non-transitory computer readable storage media over the interconnect 3056.

In alternate embodiments, programming instructions (or data to create the instructions) may be disposed on multiple NTCRSM 3060. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 3060 may be embodied by devices described for the storage circuitry 3058 and/or memory circuitry 3054. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 3082, instructions 3082, instructions 3088 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 3050, partly on the system 3050, as a stand-alone software package, partly on the system 3050 and partly on a remote computer or entirely on the remote computer or server. In the latter scenario, the remote computer may be connected to the system 3050 through any type of network, including a LAN or WAN, or the connection may be made to an external computer (e.g., through the Internet using an Internet Service Provider).

In an example, the instructions 3088 on the processor circuitry 3052 (separately, or in combination with the instructions 3082 and/or logic/modules 3082 stored in computer-readable storage media) may configure execution or operation of a trusted execution environment (TEE) 3090. The TEE 3090 operates as a protected area accessible to the processor circuitry 3052 to enable secure access to data and secure execution of instructions. In some embodiments, the TEE 3090 may be a physical hardware device that is separate from other components of the system 3050 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (C SE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 3090 may be implemented as secure enclaves, which are isolated regions of code and/or data within the processor and/or memory/storage circuitry of the system 3050. Only code executed within a secure enclave may access data within the same secure enclave, and the secure enclave may only be accessible using the secure application (which may be implemented by an application processor or a tamper-resistant microcontroller). Various implementations of the TEE 3050, and an accompanying secure area in the processor circuitry 3052 or the memory circuitry 3054 and/or storage circuitry 3058 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 3050 through the TEE 3090 and the processor circuitry 3052.

In some embodiments, the memory circuitry 3054 and/or storage circuitry 3058 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 3054 and/or storage circuitry 3058 may be divided into one or more trusted memory regions for storing applications or software modules of the TEE 3090.

Although the instructions 3082 are shown as code blocks included in the memory circuitry 3054 and the computational logic 3082 is shown as code blocks in the storage circuitry 3058, it should be understood that any of the code blocks may be replaced with hardwired circuits, for example, built into an FPGA, ASIC, or some other suitable circuitry. For example, where processor circuitry 3052 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 3054 and/or storage circuitry 3058 may store program code of an operating system (OS), which may be a general purpose OS or an OS specifically written for and tailored to the computing node 3050. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AGO, Android Things® provided by Google Inc.®, QNXO RTOS provided by BlackBerry Ltd., or any other suitable RTOS, such as those discussed herein.

The OS may include one or more drivers that operate to control particular devices that are embedded in the node 3050, attached to the node 3050, or otherwise communicatively coupled with the node 3050. The drivers may include individual drivers allowing other components of the node 3050 to interact or control various I/O devices that may be present within, or connected to, the node 3050. For example, the drivers may include a display driver to control and allow access to a display device, a touchscreen driver to control and allow access to a touchscreen interface of the node 3050, sensor drivers to obtain sensor readings of sensor circuitry 3072 and control and allow access to sensor circuitry 3072, actuator drivers to obtain actuator positions of the actuators 3074 and/or control and allow access to the actuators 3074, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the node 3050 (not shown).

The components of edge computing device 3050 may communicate over the IX 3056. The IX 3056 may include any number of technologies, including ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 3056 may be a proprietary bus, for example, used in a SoC based system.

The IX 3056 couples the processor 3052 to communication circuitry 3066 for communications with other devices, such as a remote server (not shown) and/or the connected edge devices 3062. The communication circuitry 3066 is a hardware element, or collection of hardware elements, used to communicate over one or more networks (e.g., cloud 3063) and/or with other devices (e.g., edge devices 3062).

The transceiver 3066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 3062. For example, a wireless local area network (WLAN) unit may be used to implement WiFi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 3066 (or multiple transceivers) may communicate using multiple standards or radios for communications at a different range. For example, the edge computing node 3050 may communicate with close devices, e.g., within about 10 meters, using a local transceiver based on BLE, or another low power radio, to save power. More distant connected edge devices 3062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 3066 (e.g., a radio transceiver) may be included to communicate with devices or services in the edge cloud 3063 via local or wide area network protocols. The wireless network transceiver 3066 may be an LPWA transceiver that follows the IEEE 802.15.4, or IEEE 802.15.4g standards, among others. The edge computing node 3063 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 3066, as described herein. For example, the transceiver 3066 may include a cellular transceiver that uses spread spectrum (SPA/SAS) communications for implementing high-speed communications. Further, any number of other protocols may be used, such as WiFi® networks for medium speed communications and provision of network communications. The transceiver 3066 may include radios that are compatible with any number of 3GPP specifications, such as LTE and 5G/NR communication systems, discussed in further detail at the end of the present disclosure. A network interface controller (NIC) 3068 may be included to provide a wired communication to nodes of the edge cloud 3063 or to other devices, such as the connected edge devices 3062 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 3068 may be included to enable connecting to a second network, for example, a first NIC 3068 providing communications to the cloud over Ethernet, and a second NIC 3068 providing communications to other devices over another type of network.

Given the variety of types of applicable communications from the device to another component or network, applicable communications circuitry used by the device may include or be embodied by any one or more of components 3064, 3066, 302968, or 3070. Accordingly, in various examples, applicable means for communicating (e.g., receiving, transmitting, etc.) may be embodied by such communications circuitry.

The edge computing node 3050 may include or be coupled to acceleration circuitry 3064, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 3064 may comprise logic blocks or logic fabric and other interconnected resources that may be programmed (configured) to perform various functions, such as the procedures, methods, functions, etc. of the various embodiments discussed herein. In such implementations, the acceleration circuitry 3064 may also include memory cells (e.g., EPROM, EEPROM, flash memory, static memory (e.g., SRAM, anti-fuses, etc.) used to store logic blocks, logic fabric, data, etc. in LUTs and the like.

The IX 3056 also couples the processor 3052 to a sensor hub or external interface 3070 that is used to connect additional devices or subsystems. The additional/external devices may include sensors 3072, actuators 3074, and positioning circuitry 3045.

The sensor circuitry 3072 includes devices, modules, or subsystems whose purpose is to detect events or changes in its environment and send the information (sensor data) about the detected events to some other a device, module, subsystem, etc. Examples of such sensors 3072 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

Additionally or alternatively, some of the sensors 172 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 172 may include other sensors such as an accelerator pedal position sensor (APP), accelerometers, magnetometers, level sensors, flow/fluid sensors, barometric pressure sensors, and the like. Sensor data from sensors 172 of the host vehicle may include engine sensor data collected by various engine sensors (e.g., engine temperature, oil pressure, and so forth).

The actuators 3074, allow node 3050 to change its state, position, and/or orientation, or move or control a mechanism or system. The actuators 3074 comprise electrical and/or mechanical devices for moving or controlling a mechanism or system, and converts energy (e.g., electric current or moving air and/or liquid) into some kind of motion. The actuators 3074 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 3074 may include one or more electro-mechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The node 3050 may be configured to operate one or more actuators 3074 based on one or more captured events and/or instructions or control signals received from a service provider and/or various client systems In embodiments, the actuators 3074 may be driving control units (e.g., DCUs 174 of FIG. 1), Examples of DCUs 3074 include a Drivetrain Control Unit, an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System, a Portable Emissions Measurement Systems (PEMS), an evasive maneuver assist (EMA) module/system, and/or any other entity or node in a vehicle system. Examples of the CSD that may be generated by the DCUs 174 may include, but are not limited to, real-time calculated engine load values from an engine control module (ECM), such as engine revolutions per minute (RPM) of an engine of the vehicle; fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the ECM by a transmission control unit (TCU)); and/or the like.

In vehicular embodiments, the actuators/DCUs 3074 may be provisioned with control system configurations (CSCs), which are collections of software modules, software components, logic blocks, parameters, calibrations, variants, etc. used to control and/or monitor various systems implemented by node 3050 (e.g., when node 3050 is a CA/AD vehicle 110). The CSCs define how the DCUs 3074 are to interpret sensor data of sensors 3072 and/or CSD of other DCUs 3074 using multidimensional performance maps or lookup tables, and define how actuators/components are to be adjust/modified based on the sensor data. The CSCs and/or the software components to be executed by individual DCUs 3074 may be developed using any suitable object-oriented programming language (e.g., C, C++, Java, etc.), schema language (e.g., XML schema, AUTomotive Open System Architecture (AUTOSAR) XML schema, etc.), scripting language (VBScript, JavaScript, etc.), or the like. the CSCs and software components may be defined using a hardware description language (HDL), such as register-transfer logic (RTL), very high speed integrated circuit (VHSIC) HDL (VHDL), Verilog, etc. for DCUs 3074 that are implemented as field-programmable devices (FPDs). The CSCs and software components may be generated using a modeling environment or model-based development tools. According to various embodiments, the CSCs may be generated or updated by one or more autonomous software agents and/or AI agents based on learnt experiences, ODDs, and/or other like parameters. In another example, in embodiments where one or more DCUs 3074.

The IVS 101 and/or the DCUs 3074 is configurable or operable to operate one or more actuators based on one or more captured events (as indicated by sensor data captured by sensors 3072) and/or instructions or control signals received from user inputs, signals received over-the-air from a service provider, or the like. Additionally, one or more DCUs 3074 may be configurable or operable to operate one or more actuators by transmitting/sending instructions or control signals to the actuators based on detected events (as indicated by sensor data captured by sensors 3072). One or more DCUs 3074 may be capable of reading or otherwise obtaining sensor data from one or more sensors 3072, processing the sensor data to generate control system data (or CSCs), and providing the control system data to one or more actuators to control various systems of the vehicle 110. An embedded device/system acting as a central controller or hub may also access the control system data for processing using a suitable driver, API, ABI, library, middleware, firmware, and/or the like; and/or the DCUs 3074 may be configurable or operable to provide the control system data to a central hub and/or other devices/components on a periodic or aperiodic basis, and/or when triggered.

The various subsystems, including sensors 3072 and/or DCUs 3074, may be operated and/or controlled by one or more AI agents. The AI agents is/are autonomous entities configurable or operable to observe environmental conditions and determine actions to be taken in furtherance of a particular goal. The particular environmental conditions to be observed and the actions to take may be based on an operational design domain (ODD). An ODD includes the operating conditions under which a given AI agent or feature thereof is specifically designed to function. An ODD may include operational restrictions, such as environmental, geographical, and time-of-day restrictions, and/or the requisite presence or absence of certain traffic or roadway characteristics.

In embodiments, individual AI agents are configurable or operable to control respective control systems of the host vehicle, some of which may involve the use of one or more DCUs 3074 and/or one or more sensors 3072. In these embodiments, the actions to be taken and the particular goals to be achieved may be specific or individualized based on the control system itself.

Additionally, some of the actions or goals may be dynamic driving tasks (DDT), object and event detection and response (OEDR) tasks, or other non-vehicle operation related tasks depending on the particular context in which an AI agent is implemented. DDTs include all real-time operational and tactical functions required to operate a vehicle 110 in on-road traffic, excluding the strategic functions (e.g., trip scheduling and selection of destinations and waypoints. DDTs include tactical and operational tasks such as lateral vehicle motion control via steering (operational); longitudinal vehicle motion control via acceleration and deceleration (operational); monitoring the driving environment via object and event detection, recognition, classification, and response preparation (operational and tactical); object and event response execution (operational and tactical); maneuver planning (tactical); and enhancing conspicuity via lighting, signaling and gesturing, etc. (tactical). OEDR tasks may be subtasks of DDTs that include monitoring the driving environment (e.g., detecting, recognizing, and classifying objects and events and preparing to respond as needed) and executing an appropriate response to such objects and events, for example, as needed to complete the DDT or fallback task.

To observe environmental conditions, the AI agents is/are configurable or operable to receive, or monitor for, sensor data from one or more sensors 3072 and receive control system data (CSD) from one or more DCUs 3074 of the host vehicle 110. The act of monitoring may include capturing CSD and/or sensor data from individual sensors 172 and DCUs 3074. Monitoring may include polling (e.g., periodic polling, sequential (roll call) polling, etc.) one or more sensors 3072 for sensor data and/or one or more DCUs 3074 for CSD for a specified/selected period of time. In other embodiments, monitoring may include sending a request or command for sensor data/CSD in response to an external request for sensor data/CSD. In some embodiments, monitoring may include waiting for sensor data/CSD from various sensors/modules based on triggers or events, such as when the host vehicle reaches predetermined speeds and/or distances in a predetermined amount of time (with or without intermitted stops). The events/triggers may be AI agent specific, and may vary depending of a particular embodiment. In some embodiments, the monitoring may be triggered or activated by an application or subsystem of the IVS 101 or by a remote device, such as compute node 140 and/or server(s) 160.

In some embodiments, one or more of the AI agents may be configurable or operable to process the sensor data and CSD to identify internal and/or external environmental conditions upon which to act. Examples of the sensor data may include, but are not limited to, image data from one or more cameras of the vehicle providing frontal, rearward, and/or side views looking out of the vehicle; sensor data from accelerometers, inertia measurement units (IMU), and/or gyroscopes of the vehicle providing speed, acceleration, and tilt data of the host vehicle; audio data provided by microphones; and control system sensor data provided by one or more control system sensors. In an example, one or more of the AI agents may be configurable or operable to process images captured by sensors 3072 (image capture devices) and/or assess conditions identified by some other subsystem (e.g., an EMA subsystem, CAS and/or CPS entities, and/or the like) to determine a state or condition of the surrounding area (e.g., existence of potholes, fallen trees/utility poles, damages to road side barriers, vehicle debris, and so forth). In another example, one or more of the AI agents may be configurable or operable to process CSD provided by one or more DCUs 3074 to determine a current amount of emissions or fuel economy of the host vehicle. The AI agents may also be configurable or operable to compare the sensor data and/or CSDs with training set data to determine or contribute to determining environmental conditions for controlling corresponding control systems of the vehicle.

To determine actions to be taken in furtherance of a particular goal, each of the AI agents are configurable or operable to identify a current state of the IVS 101, the host vehicles 110, and/or the AI agent itself, identify or obtain one or more models (e.g., ML models), identify or obtain goal information, and predict a result of taking one or more actions based on the current state/context, the one or more models, and the goal information. The one or more models may be any algorithms or objects created after an AI agent is trained with one or more training datasets, and the one or more models may indicate the possible actions that may be taken based on the current state. The one or more models may be based on the ODD defined for a particular AI agent. The current state is a configuration or set of information in the IVS 101 and/or one or more other systems of the host vehicle 110, or a measure of various conditions in the IVS 101 and/or one or more other systems of the host vehicle 110. The current state is stored inside an AI agent and is maintained in a suitable data structure. The AI agents are configurable or operable to predict possible outcomes as a result of taking certain actions defined by the models. The goal information describes desired outcomes (or goal states) that are desirable given the current state. Each of the AI agents may select an outcome from among the predict possible outcomes that reaches a particular goal state, and provide signals or commands to various other subsystems of the vehicle 110 to perform one or more actions determined to lead to the selected outcome. The AI agents may also include a learning module configurable or operable to learn from an experience with respect to the selected outcome and some performance measure(s). The experience may include sensor data and/or new state data collected after performance of the one or more actions of the selected outcome. The learnt experience may be used to produce new or updated models for determining future actions to take.

The positioning circuitry 3045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 3045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 3045 may include a Micro-Technology for Positioning, Navigation, and Timing (Micro-PNT) IC that uses a master timing clock to perform position tracking/estimation without GNSS assistance. The positioning circuitry 3045 may also be part of, or interact with, the communication circuitry 3066 to communicate with the nodes and components of the positioning network. The positioning circuitry 3045 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 3045 is, or includes an INS, which is a system or device that uses sensor circuitry 3072 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 3050 without the need for external references.

In some optional examples, various input/output (I/O) devices may be present within or connected to, the edge computing node 3050, which are referred to as input circuitry 3086 and output circuitry 3084 in FIG. 30. The input circuitry 302986 and output circuitry 3084 include one or more user interfaces designed to enable user interaction with the node 3050 and/or peripheral component interfaces designed to enable peripheral component interaction with the node 3050. Input circuitry 3086 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 3084 may be included to show information or otherwise convey information, such as sensor readings, actuator position(s), or other like information. Data and/or graphics may be displayed on one or more user interface components of the output circuitry 3084. Output circuitry 3084 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the node 3050. The output circuitry 3084 may also include speakers or other audio emitting devices, printer(s), and/or the like. In some embodiments, the sensor circuitry 3072 may be used as the input circuitry 3084 (e.g., an image capture device, motion capture device, or the like) and one or more actuators 3074 may be used as the output device circuitry 3084 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 3076 may power the edge computing node 3050, although, in examples in which the edge computing node 3050 is mounted in a fixed location, it may have a power supply coupled to an electrical grid, or the battery may be used as a backup or for temporary capabilities. The battery 3076 may be a lithium ion battery, or a metal-air battery, such as a zinc-air battery, an aluminum-air battery, a lithium-air battery, and the like.

A battery monitor/charger 3078 may be included in the edge computing node 3050 to track the state of charge (SoCh) of the battery 3076, if included. The battery monitor/charger 3078 may be used to monitor other parameters of the battery 3076 to provide failure predictions, such as the state of health (SoH) and the state of function (SoF) of the battery 3076. The battery monitor/charger 3078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 3078 may communicate the information on the battery 3076 to the processor 3052 over the IX 3056. The battery monitor/charger3078 may also include an analog-to-digital (ADC) converter that enables the processor 3052 to directly monitor the voltage of the battery 3076 or the current flow from the battery 3076. The battery parameters may be used to determine actions that the edge computing node 3050 may perform, such as transmission frequency, mesh network operation, sensing frequency, and the like.

A power block 3080, or other power supply coupled to a grid, may be coupled with the battery monitor/charger 3078 to charge the battery 3076. In some examples, the power block 3080 may be replaced with a wireless power receiver to obtain the power wirelessly, for example, through a loop antenna in the edge computing node 3050. A wireless battery charging circuit, such as an LTC4020 chip from Linear Technologies of Milpitas, Calif., among others, may be included in the battery monitor/charger 3078. The specific charging circuits may be selected based on the size of the battery 3076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 3058 may include instructions 3082 in the form of software, firmware, or hardware commands to implement the techniques described herein. Although such instructions 3082 are shown as code blocks included in the memory 3054 and the storage 3058, it may be understood that any of the code blocks may be replaced with hardwired circuits, for example, built into an application specific integrated circuit (ASIC).

In an example, the instructions 2982 provided via the memory 3054, the storage 3058, or the processor 3052 may be embodied as a non-transitory, machine-readable medium 3060 including code to direct the processor 3052 to perform electronic operations in the edge computing node 3050. The processor 3052 may access the non-transitory, machine-readable medium 3060 over the IX 3056. For instance, the non-transitory, machine-readable medium 3060 may be embodied by devices described for the storage 3058 or may include specific storage units such as optical disks, flash drives, or any number of other hardware devices. The non-transitory, machine-readable medium 3060 may include instructions to direct the processor 3052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 29 and 30 are intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The respective compute platforms of FIGS. 29 and 30 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations 5. Example Implementations Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 includes a method to be performed by a vehicular Intelligent Transport System Station, "V-ITS-S", the method comprising: obtaining a notification indicating a perceived Vulnerable Road User, "VRU", in a current trajectory of the V-ITS-S or moving toward the trajectory of the V-ITS-S; triggering a collision risk analysis function in response to receipt of the notification, the collision risk analysis function for determining each of a Lateral Distance, "LaD", a Longitudinal Distance, "LoD", and a Vertical Distance, "VD", between the V-ITS-S and the VRU; and triggering a collision avoidance action when one or more of the LaD, the LoD, and the VD are within a minimum safe LaD, "MSLaD", a minimum safe LoD, "MSLoD", and a minimum safe VD, "MSVD", respectively.

Example 2 includes the method of example 1 and/or some other example(s) herein, wherein the triggering the collision avoidance action comprises triggering the collision avoidance action when the LaD, the LoD, and the VD are simultaneously less than the MSLaD, the MSLoD, and the MSVD, respectively Example 3 includes the method of examples 1-2 and/or some other example(s) herein, wherein the LaD is an estimated distance between the VRU and the V-ITS-S perpendicular to the direction of the V-ITS-S heading, the LoD is an estimated distance between the VRU and the V-ITS-S along the direction of the V-ITS-S heading, and the VD is an estimated distance in vertical direction between the VRU and the V-ITS-S; and the MSLaD is a minimum lateral separation between the VRU and V-ITS-S to be considered safe, the MSLoD is a minimum longitudinal separation between the VRU and the V-ITS-S to be considered safe, and the MSVD is a minimum vertical separation between the VRU and the V-ITS-S to be considered safe.

Example 4 includes the method of examples 1-3 and/or some other example(s) herein, further comprising: generating a VRU Awareness Message, "VAM", to include one or more of: a VRU identifier, "ID", field to include an ID of the VRU; a VRU profile type field to include a known or estimated VRU profile type of the VRU; a location field to include a known or estimated location data of the VRU; a speed field to include a known or estimated speed of the VRU; a heading field to include a known or estimated heading of the VRU; one or more VRU time feature data fields to include time feature data of the VRU; and a vehicle-VRU trajectory interception indicator to include a predicted point and time at which the V-ITS-S and the VRU are likely to intercept one another.

Example 5 includes the method of example 4 and/or some other example(s) herein, further comprising: generating the VAM to include: an LaD field to include the determined LaD; an LoD field to include the determined LoD; a VD field to include the determined VD; an MSLaD field to include the determined MSLaD; an MSLoD field to include the determined MSLoD; and an MSVD field to include the determined MSVD.

Example 6 includes the method of examples 4-5 and/or some other example(s) herein, further comprising: connecting with the VRU to periodically receive feature data when a direct connection with the VRU is detected.

Example 7 includes the method of example 6 and/or some other example(s) herein, wherein the behavioral feature data of the VRU comprises a VRU ID of the VRU, a VRU profile of the VRU, and time-series feature data of the VRU, the time-series feature data of the VRU including one or more timestamps and corresponding statistical time-series evolution data regarding VRU speed, heading, and position Example 8 includes the method of examples 6-7 and/or some other example(s) herein, wherein the feature data is first feature data, and the method further comprises: connecting with one or more non-VRU Intelligent Transport System Stations, "ITS-Ss", to periodically receive second feature data regardless of whether a direct connection with the VRU is detected.

Example 9 includes the method of example 8 and/or some other example(s) herein, wherein the first feature data and the second feature data includes one or more of a location of the VRU, a travel direction of the VRU, a speed of the VRU, and behavioral data of the VRU.

Example 10 includes the method of example 9 and/or some other example(s) herein, wherein the first feature data is determined by a VRU ITS-S of the VRU, and the second feature data is determined by respective ones of the one or more non-VRU ITS-Ss.

Example 12 includes the method of examples 8-10 and/or some other example(s) herein, further comprising: predicting a VRU trajectory based on the one or both of the first feature data and the second feature data; and generating or updating a VRU behavioral model based on the predicted VRU trajectory.

Example 13 includes the method of example 12 and/or some other example(s) herein, wherein the collision risk analysis function comprises a Responsibility Sensitive Safety, "RSS", check.

Example 14 includes the method of example 13 and/or some other example(s) herein, further comprising: determining whether one or more RSS rules have been violated based on the predicted VRU trajectory or the VRU behavioral model.

Example 15 includes the method of example 14 and/or some other example(s) herein, further comprising: generating a warning alert; transmitting or broadcasting the warning alert to one or more ITS-Ss within a communication range of the V-ITS-S; and executing one or more control actions to avoid a collision.

Example 16 includes the method of example 15 and/or some other example(s) herein, further comprising: outputting the warning alert via one or more user interface devices of the V-ITS-S.

Example 17 includes the method of examples 15-16 and/or some other example(s) herein, wherein generating the warning alert comprises: generating the warning alert to include one of a high danger alert, a moderate danger alert, and a low danger alert based on an estimated trajectory interception of the VRU and the V-ITS-S and a distance between the V-ITS-S and the VRU.

Example 18 includes the method of example 17 and/or some other example(s) herein, wherein generating the warning alert comprises: generating the warning alert to include the high danger alert when the LaD, the LoD, and the VD are equal to or less than the MSLaD, the MSLoD, and the MSVD, respectively; generating the warning alert to include the moderate danger alert when the LaD is a first LaD value larger than the MSLaD, the LoD is a first LoD value larger than the MSLoD, and the VD is a VD value larger than the MSVD; and generating the warning alert to include the low danger alert when the LaD is a second LaD value larger than the first LaD value, the LoD is a second LoD value larger than the first LoD value, and the VD is a second VD value larger than the first VD value.

Example 19 includes the method of example 18 and/or some other example(s) herein, wherein the first LaD value, the first LoD value, and the first VD value are based on a first scaling factor applied to the MSLaD, the MSLoD, and the VD, respectively, and the second LaD value, the second LoD value, and the second VD value are based on a second scaling factor applied to the MSLaD, the MSLoD, and the VD, respectively, wherein the first scaling factor is smaller than the second scaling factor.

Example 20 includes the method of examples 15-19 and/or some other example(s) herein, wherein generating the warning alert comprises: generating the warning message to include instructions to cause the one or more ITS-Ss to output the warning alert.

Example 21 includes the method of example 20 and/or some other example(s) herein, wherein the warning alert comprises one or more of an audio alert, a visual alert, or a physical alert.

Example 22 includes the method of examples 1-21 and/or some other example(s) herein, wherein the obtained notification indicating the perceived VRU is a 'Potential-Dangerous-Situation-VRU-Perception-Info' message, and the method further comprises: transmitting or broadcasting the 'Potential-Dangerous-Situation-VRU-Perception-Info' message to one or more ITS-Ss in a communication range of the V-ITS-S.

Example 23 includes the method of example 22 and/or some other example(s) herein, wherein the transmitting or broadcasting comprises: initializing a forward-wait timer in response to receipt of the 'Potential-Dangerous-Situation-VRU-Perception-Info' message; transmitting or broadcasting the 'Potential-Dangerous-Situation-VRU-Perception-Info' message upon expiration of the forward-wait timer; and preventing the transmitting or broadcasting when the 'Potential-Dangerous-Situation-VRU-Perception-Info' message is obtained from another ITS-S before expiration of the forward-wait timer.

Example 24 includes the method of examples 1-23 and/or some other example(s) herein, further comprising: operating the V-ITS-S according to a default set of RSS parameters; and in response to obtaining the notification indicating the perceived VRU, operating the V-ITS-S according to a scoped set of RSS parameters within a geographic area the perceived VRU and for a period of time, the scoped set of RSS parameters including one or more of an increased LoD, LaD, and VD, increased space clearance for lane changes, reduced speed for left or right turns, a reduced maximum speed limit, and a reduced maximum acceleration limit.

Example 25 includes the method of example 24 and/or some other example(s) herein, wherein, when the notification indicating the perceived VRU is obtained from sensor circuitry of the V-ITS-S, the method further comprises: generating a Scoped-RSS-Coordination-Message including a proposed set of scoped RSS parameters; and transmitting or broadcasting the Scoped-RSS-Coordination-Message to the one or more ITS-Ss in a communication range of the V-ITS-S.

Example 26 includes the method of example 25 and/or some other example(s) herein, further comprising: receiving respective updated Scoped-RSS-Coordination-Messages from the one or more ITS-Ss, wherein at least one of the respective updated Scoped-RSS-Coordination-Messages includes at least one scoped RSS value different than a corresponding scoped RSS value in the proposed set of scoped RSS parameters; and applying a voting algorithm or a consensus algorithm to select one of the at least one scoped RSS value or the corresponding scoped RSS value in the proposed set of scoped RSS parameters.

Example 27 includes a method for operating a Vulnerable Road User, "VRU", Intelligent Transport System Station, "ITS-S", the method comprising: detecting a direct connection with a vehicle ITS-S, "V-ITS-S"; determining feature data of the VRU ITS-S, the feature data including behavioral data of the VRU ITS-S and a current location of the VRU ITS-S, a travel speed of the VRU ITS-S, and a travel direction of the VRU ITS-S based on sensor data obtained from one or more sensors of the VRU ITS-S or position data obtained from positioning circuitry of the VRU ITS-S; and transmitting the determined feature data to the V-ITS-S.

Example 28 includes the method of example 27 and/or some other example(s) herein, wherein the behavioral data comprises a VRU profile indicating a VRU class of the VRU ITS-S, a VRU identifier, "ID", of the VRU ITS-S, and time-series feature data, the time-series feature data including timestamps and corresponding statistical time-series evolution data indicating travel speed, travel direction, position of the VRU ITS-S.

Example 29 includes the method of example 28 and/or some other example(s) herein, further comprising: generating a VRU Awareness Message, "VAM", to include the determined feature data; and the transmitting comprises transmitting the generated VAM to the V-ITS-S.

Example 30 includes the method of examples 27-29 and/or some other example(s) herein, wherein the one or more sensors include an accelerometer, a gyroscope, and a magnetometer.

Example 31 includes the method of examples 27-30 and/or some other example(s) herein, further comprising: receiving, during an awake period of a sleep-awake cycle, a VRU Awareness Message, "VAM", including a 'Potential-Dangerous-Situation-VRU-Perception-Info' data element from a roadside ITS-S, "R-ITS-S".

Example 32 includes the method of examples 27-31 and/or some other example(s) herein, further comprising: while in an inactive state, an idle state, or a sleep state, receiving a paging message from an R-ITS-S over a paging channel to cause the VRU to transition to an active state from the inactive state, the idle state, or the sleep state; and receiving, in the active state, a VAM including a 'Potential-Dangerous-Situation-VRU-Perception-Info' data element from the R-ITS-S.

Example 33 includes the method of examples 31-32 and/or some other example(s) herein, wherein the VAM originates from the V-ITS-S or another V-ITS-S.

Example 34 includes a method for operating a first Intelligent Transport System Station, "ITS-S", the method comprising: receiving a 'Potential-Dangerous-Situation-VRU-Perception-Info' message from a second ITS-S; and transmitting or broadcasting the 'Potential-Dangerous-Situation-VRU-Perception-Info' message to one or more other ITS-Ss in a communication range of the first ITS-S.

Example 35 includes the method of example 34 and/or some other example(s) herein, further comprising: initializing a forward-wait timer in response to receipt of the 'Potential-Dangerous-Situation-VRU-Perception-Info' message; transmitting or broadcasting the 'Potential-Dangerous-Situation-VRU-Perception-Info' message upon expiration of the forward-wait timer; and not transmitting or broadcasting when the 'Potential-Dangerous-Situation-VRU-Perception-Info' message is obtained from a third ITS-S before expiration of the forward-wait timer.

Example 36 includes method of examples 34-35, wherein the ITS-S is one of a VRU ITS-S, a vehicle ITS-S, "V-ITS-S", or a roadside ITS-S, "R-ITS-S".

Example 37 includes the method of example 36 and/or some other example(s) herein, wherein, when the ITS-S is an R-ITS-S, the method comprises: detecting a VRU and a V-ITS-S; predicting, based on the detecting, a trajectory interception between the VRU and the V-ITS-S and/or a potential conflict point and time to collision, "TTC", for the VRU and the V-ITS-S; and transmitting or broadcasting the predicted trajectory interception and/or the predicted potential conflict point with TTC to the one or more other ITS-Ss.

Example 38 includes one or more computer readable storage media comprising instructions, wherein execution of the instructions by processor circuitry is to cause a computing system to perform the method of examples 1-26, examples 27-33, and/or examples 34-37.

Example 39 includes a computing system, comprising: communication circuitry; the processor circuitry of example 38 communicatively coupled with the communication circuitry; and the one or more computer readable storage media of example 39 communicatively coupled with the processor circuitry.

Example 40 includes a computing system, comprising: communication circuitry; processor circuitry communicatively coupled with the communication circuitry and the memory circuitry, wherein the processor circuitry is arranged execute program code stored by the memory circuitry for performing the method of examples 1-26, examples 27-33, and/or examples 34-37.

Example Z01 may include an apparatus comprising means to perform one or more elements of a method described in or related to any of examples 1-37, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples 1-37, or any other method or process described herein. Example Z03 may include an apparatus comprising logic, modules, or circuitry to perform one or more elements of a method described in or related to any of examples 1-37, or any other method or process described herein. Example Z04 may include a method, technique, or process as described in or related to any of examples 1-37, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples 1-37, or portions thereof. Example Z06 may include a signal as described in or related to any of examples 1-37, or portions or parts thereof. Example Z07 may include a datagram, packet, frame, segment, protocol data unit (PDU), or message as described in or related to any of examples 1-37, or portions or parts thereof, or otherwise described in the present disclosure.

Example Z08 may include a signal encoded with data as described in or related to any of examples 1-37, or portions or parts thereof, or otherwise described in the present disclosure. Example Z09 may include a signal encoded with a datagram, packet, frame, segment, protocol data unit (PDU), or message as described in or related to any of examples 1-37, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples 1-37, or portions thereof. Example Z11 may include a computer program comprising instructions, wherein execution of the program by a processing element is to cause the processing element to carry out the method, techniques, or process as described in or related to any of examples 1-37, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein. Any of the above-described examples may be combined with any other example (or combination of examples), unless explicitly stated otherwise.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

6. Terminology

The terminology used herein is for the purpose of describing particular embodiments only and is not intended to be limiting of the disclosure. The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

The term "ego" used with respect to an element or entity, such as "ego ITS-S" or the like, refers to an ITS-S that is under consideration, the term "ego vehicle" refers to a vehicle embedding an ITS-S being considered, and the term "neighbors" or "proximity" used to describe elements or entities refers to other ITS-Ss different than the ego ITS-S and/or ego vehicle.

The term "Interoperability" refers to the ability of vehicle ITS-Ss (V-ITS-Ss) (also referred to as vehicle UEs (vUEs)) and roadside ITS-Ss (R-ITS-Ss) (also referred to as roadside equipment or Road Side Units (RSUs)) utilizing one vehicular communication system to communicate with vUEs and roadside equipment utilizing the other vehicular communication system. The term "Coexistence" refers to sharing or allocating radiofrequency resources among vUEs and roadside equipment using either vehicular communication system.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A first Intelligent Transport System Station (ITS-S), comprising:
   memory circuitry to store instructions; and
   processor circuitry connected to the memory circuitry, wherein execution of the instructions by the processor circuitry is to cause the first ITS-S to:
      execute a collision risk analysis function based on detection of a perceived Vulnerable Road User (VRU) relative to a current trajectory of a second ITS-S, wherein the first ITS-S is associated with a first computer-assisted or autonomous driving (CA/AD) vehicle, and wherein the second ITS-S is associated with a second CA/AD vehicle,
      wherein the collision risk analysis function is to determine each of a Lateral Distance (LaD), a Longitudinal Distance (LoD), and a Vertical Distance (VD) between the second CA/AD vehicle and the VRU based on sensor data collected with the first CA/AD vehicle, wherein the LaD is an estimated distance between the VRU and the second CA/AD vehicle that is perpendicular to a direction of a heading of the second CA/AD vehicle, the LoD is an estimated distance between the VRU and the second CA/AD vehicle along the direction of the heading of the second CA/AD vehicle, and the VD is an estimated distance in a vertical direction between the VRU and the second CA/AD vehicle; and
      transmit at least one intelligent transport system (ITS) message to trigger a collision avoidance action in the second CA/AD vehicle from automated control or movement of the second CA/AD vehicle, wherein the collision avoidance action is triggered when one or more of the LaD, the LoD, and the VD are less than a minimum safe LaD (MSLaD), a minimum safe LoD (MSLoD), and a minimum safe VD (MSVD), respectively,
      wherein the collision avoidance action in the second CA/AD vehicle changes the current trajectory, in response to the at least one ITS message, to cause the LaD, the LoD, and the VD to exceed the MSLaD, the MSLOD, and the MSVD, and
      wherein the MSLaD is a minimum lateral separation between the VRU and the second CA/AD vehicle to be considered safe, the MSLoD is a minimum longitudinal separation between the VRU and the second CA/AD vehicle to be considered safe, and the MSVD is a minimum vertical separation between the VRU and the second CA/AD vehicle to be considered safe.

2. The first ITS-S of claim 1, wherein execution of the instructions is to cause the first ITS-S to:
   transmit the at least one ITS message to trigger the collision avoidance action when the LaD, the LoD, and the VD are simultaneously less than the MSLaD, the MSLOD, and the MSVD, respectively.

3. The first ITS-S of claim 1, wherein execution of the instructions is to cause the first ITS-S to execute a motion dynamic prediction function to:
   generate a motion dynamic prediction of the VRU; and
   provide the motion dynamic prediction to the collision risk analysis function.

4. The first ITS-S of claim 3, wherein execution of the instructions is to cause the first ITS-S to execute the collision risk analysis function to:
   analyze the motion dynamic prediction of the VRU;
   estimate a likelihood of collision of the second CA/AD vehicle with the VRU; and
   identify a time to collision (TTC) based on the analysis and the likelihood of collision of the second CA/AD vehicle with the VRU.

5. The first ITS-S of claim 4, wherein execution of the instructions is to cause the first ITS-S to:
   generate an ITS message of the at least one ITS message based on the TTC; and
   cause transmission or broadcast of the generated ITS message.

6. The first ITS-S of claim 5, wherein the generated ITS message includes the collision avoidance action.

7. The first ITS-S of claim 5, wherein execution of the instructions is to cause the first ITS-S to execute the collision risk analysis function to:
   determine a trajectory interception of the VRU with the second CA/AD vehicle; and
   generate a trajectory interception indicator (TII) based on the determined trajectory interception, wherein the TII indicates the likelihood that the VRU and the second CA/AD vehicle will encounter the collision, wherein the generated ITS message includes the TII, and wherein the collision avoidance action is triggered based on the TII.

8. The first ITS-S of claim 4, wherein execution of the instructions is to cause the first ITS-S to:
   trigger the collision avoidance action when the TTC is greater than a threshold.

9. The first ITS-S of claim 4, wherein execution of the instructions is to cause the first ITS-S to execute a maneuver coordination function to:
   select the collision avoidance action based on the TTC; and
   execute the selected collision avoidance action.

10. The first ITS-S of claim 9, wherein execution of the instructions is to cause the first ITS-S to execute the selected collision avoidance action to:
    generate a warning alert to include instructions that cause output of the warning alert;
    generate a warning alert message to include the generated warning alert; and
    cause transmission or broadcast of the warning alert message to one or more neighboring ITS-Ss within a communication range of the first ITS-S.

11. The first ITS-S of claim 10, the execution of the instructions is to cause the first ITS-S to:

execute the instructions of the warning alert to cause output of the warning alert via one or more user interfaces of the first ITS-S.

12. The first ITS-S of claim 10, wherein the warning alert is one or more of an audio alert, a visual alert, and a physical alert.

13. The first ITS-S of claim 1, wherein the first ITS-S is a vehicle ITS-S.

14. The first ITS-S of claim 1, wherein the first ITS-S is a roadside ITS-S and the second ITS-S is a vehicle ITS-S or another VRU ITS-S.

15. One or more non-transitory computer readable storage media (NTCRM) comprising instructions, wherein execution of the instructions by one or more processors of a first Intelligent Transport System Station (ITS-S) is to cause the first ITS-S to:

execute a collision risk analysis function based on a perceived Vulnerable Road User (VRU) relative to a current trajectory of a second ITS-S, wherein the first ITS-S is associated with a first computer-assisted or autonomous driving (CA/AD) vehicle, and wherein the second ITS-S is associated with a second CA/AD vehicle, wherein the collision risk analysis function is to generate a trajectory interception indicator (TII) based on a determined trajectory interception of the VRU with the second CA/AD vehicle, wherein the TII is a likelihood that the VRU and the second CA/AD vehicle will encounter a collision;

determine each of a Lateral Distance (LaD), a Longitudinal Distance (LoD), and a Vertical Distance (VD) between the second CA/AD vehicle and the VRU, wherein the LaD is an estimated distance between the VRU and the second CA/AD vehicle that is perpendicular to a direction of a heading of the second CA/AD vehicle, the LoD is an estimated distance between the VRU and the second CA/AD vehicle along the direction of the heading of the second CA/AD vehicle, and the VD is an estimated distance in a vertical direction between the VRU and the second CA/AD vehicle;

compare the LaD with a minimum safe LaD (MSLaD), wherein the MSLaD is a minimum lateral separation between the VRU and the second CA/AD vehicle to be considered safe;

compare the LoD with a minimum safe LoD (MSLoD), wherein the MSLoD is a minimum longitudinal separation between the VRU and the second CA/AD vehicle to be considered safe;

compare the VD with a minimum safe VD (MSVD), wherein the MSVD is a minimum vertical separation between the VRU and the second CA/AD vehicle to be considered safe; and transmit at least one intelligent transport system (ITS) message to trigger a collision avoidance action in the second CA/AD vehicle from automated control or movement of the CA/AD vehicle, wherein the collision avoidance action in the second CA/AD vehicle changes the current trajectory, in response to the at least one ITS message, to cause the LaD, the LoD, and the VD to exceed the MSLaD, the MSLOD, and the MSVD, and wherein the collision avoidance action is triggered based on the TII and when one or more of the LaD, the LoD, and the VD are less than the MSLaD, the MSLOD, and the MSVD, respectively.

16. The one or more NTCRM of claim 15, wherein execution of the collision risk analysis function is to cause the first ITS-S to:

trigger the collision avoidance action when one or more of the LaD, the LoD, and the VD are less than a minimum safe LaD (MSLaD), a minimum safe LoD (MSLoD), and a minimum safe VD (MSVD), respectively.

17. The one or more NTCRM of claim 15, wherein execution of the instructions is to cause the first ITS-S to execute a motion dynamic prediction function to:

generate a motion dynamic prediction of the VRU based on perception data representative of the VRU; and provide the motion dynamic prediction to the collision risk analysis function.

18. The one or more NTCRM of claim 17, wherein execution of the instructions is to cause the first ITS-S to execute the collision risk analysis function to:

analyze the motion dynamic prediction of the VRU;

estimate the likelihood of collision of the second ITS-S with the VRU;

identify a time to collision (TTC) based on the analysis and the likelihood of collision of the second ITS-S with the VRU; and trigger the collision avoidance action when the TTC is greater than a threshold.

19. The one or more NTCRM of claim 18, wherein execution of the instructions is to cause the first ITS-S to:

generate an ITS message of the at least one ITS message based on the TTC, wherein the generated ITS message includes the collision avoidance action or the TII; and cause transmission or broadcast of the generated ITS message.

20. The one or more NTCRM of claim 18, wherein execution of the instructions is to cause the first ITS-S to execute a maneuver coordination function to:

select the collision avoidance action based on the TTC or the TII; and execute the selected collision avoidance action.

21. The one or more NTCRM of claim 20, wherein execution of the instructions is to cause the first ITS-S to execute to the selected collision avoidance action to:

generate a warning alert to include instructions that cause output of the warning alert;

generate a warning message to include the generated warning alert; and cause transmission or broadcast of the warning alert message to one or more neighboring ITS-Ss within a communication range of the first ITS-S.

22. The one or more NTCRM of claim 21, wherein execution of the instructions is to cause the first ITS-S to:

execute the instructions of the warning alert to cause output of the warning alert via one or more user interfaces of the first ITS-S.

23. The one or more NTCRM of claim 21, wherein the warning alert is one or more of an audio alert, a visual alert, or a physical alert.

24. The one or more NTCRM of claim 15, wherein:

the first ITS-S is a vehicle ITS-S; or the first ITS-S is a roadside ITS-S and the second ITS-S is a vehicle ITS-S or another VRU ITS-S.

25. A method of operating a first Intelligent Transport System Station (ITS-S), the method comprising:

identifying a perceived Vulnerable Road User (VRU), wherein the VRU is moving or stationary with respect to a current trajectory of a second ITS-S, wherein the first ITS-S is associated with a first computer-assisted or autonomous driving (CA/AD) vehicle, and wherein the second ITS-S is associated with a second CA/AD vehicle;

executing a collision risk analysis function based on the perceived VRU, the collision risk analysis including:
  determining a trajectory interception indicator (TII) based on a determined trajectory interception of the VRU with the second ITS-S, wherein the TII is a likelihood that the VRU and the second CA/AD vehicle will encounter a collision,
  determining each of a Lateral Distance (LaD), a Longitudinal Distance (LoD), and a Vertical Distance (VD) between the second CA/AD vehicle and the VRU based on sensor data collected with the first CA/AD vehicle, wherein the LaD is an estimated distance between the VRU and the second CA/AD vehicle that is perpendicular to a direction of a heading of the second CA/AD vehicle, the LoD is an estimated distance between the VRU and the second CA/AD vehicle along the direction of the heading of the second CA/AD vehicle, and the VD is an estimated distance in a vertical direction between the VRU and the second CA/AD vehicle,
  comparing the LaD with a minimum safe LaD (MSLaD), wherein the MSLaD is a minimum lateral separation between the VRU and the second CA/AD vehicle to be considered safe,
  comparing the LoD with a minimum safe LoD (MSLoD), wherein the MSLoD is a minimum longitudinal separation between the VRU and the second CA/AD vehicle to be considered safe, and
  comparing the VD with a minimum safe VD (MSVD), wherein the MSVD is a minimum vertical separation between the VRU and the second CA/AD vehicle to be considered safe; and
transmitting at least one intelligent transport system (ITS) message to trigger a collision avoidance action in the second CA/AD vehicle from automated control or movement of the second CA/AD vehicle,
wherein the collision avoidance action in the second CA/AD vehicle changes the current trajectory, in response to at least one ITS message, to cause the LaD, the LoD, and the VD to exceed the MSLaD, the MSLOD, and the MSVD, and
wherein the collision avoidance action is triggered based on the TII and when one or more of the LaD, the LoD, and the VD are less than the MSLaD, the MSLOD, and the MSVD, respectively.

26. The method of claim 25, further comprising:
executing a motion dynamic prediction function including:
  generating a motion dynamic prediction of the VRU based on perception data representative of the VRU, and
  providing the motion dynamic prediction to the collision risk analysis function; and
executing the collision risk analysis function including:
  estimating the likelihood of collision of the second CA/AD vehicle with the VRU based on an analysis of the motion dynamic prediction of the VRU;
  identifying a time to collision (TTC) based on the analysis and the likelihood of collision of the second ITS-S with the VRU; and
triggering the collision avoidance action when the TTC is greater than a threshold.

27. The method of claim 26, further comprising:
generating an intelligent transport system (ITS) message based on the TTC, wherein the generated ITS message includes the collision avoidance action or the TII; and
transmitting or broadcasting the generated ITS message.

28. The method of claim 27, further comprising:
executing a maneuver coordination function to:
  select the collision avoidance action based on the TTC or the TII; and
  execute the selected collision avoidance action.

29. The method of claim 28, further comprising executing the selected collision avoidance action including:
generating a warning alert to include instructions that cause output of the warning alert, wherein the warning alert is one or more of an audio alert, a visual alert, or a physical alert;
generating a warning message to include the generated warning alert;
transmitting or broadcasting the warning alert message to one or more neighboring ITS-Ss within a communication range of the first ITS-S; and
executing the instructions of the warning alert to cause output of the warning alert via one or more user interfaces of the first ITS-S.

30. The method of claim 25, wherein:
the first ITS-S is a vehicle ITS-S; or
the first ITS-S is a roadside ITS-S and the second ITS-S is a vehicle ITS-S or another VRU ITS-S.

* * * * *